US010880535B2

(12) United States Patent
Oh et al.

(10) Patent No.: US 10,880,535 B2
(45) Date of Patent: Dec. 29, 2020

(54) METHOD FOR TRANSMITTING 360 VIDEO, METHOD FOR RECEIVING 360 VIDEO, APPARATUS FOR TRANSMITTING 360 VIDEO, AND APPARATUS FOR RECEIVING 360 VIDEO

(71) Applicant: LG ELECTRONICS INC., Seoul (KR)

(72) Inventors: Sejin Oh, Seoul (KR); Jangwon Lee, Seoul (KR); Junwoo Lee, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 16/076,268

(22) PCT Filed: Feb. 17, 2017

(86) PCT No.: PCT/KR2017/001789
§ 371 (c)(1),
(2) Date: Aug. 7, 2018

(87) PCT Pub. No.: WO2017/142353
PCT Pub. Date: Aug. 24, 2017

(65) Prior Publication Data
US 2020/0084428 A1 Mar. 12, 2020

Related U.S. Application Data

(60) Provisional application No. 62/296,534, filed on Feb. 17, 2016, provisional application No. 62/296,535, (Continued)

(51) Int. Cl.
*H04N 13/194* (2018.01)
*H04N 19/46* (2014.01)
*H04N 19/597* (2014.01)

(52) U.S. Cl.
CPC .......... *H04N 13/194* (2018.05); *H04N 19/46* (2014.11); *H04N 19/597* (2014.11)

(58) Field of Classification Search
None
See application file for complete search history.

(56) References Cited

U.S. PATENT DOCUMENTS 9,674,498 B1 * 6/2017 Mukherjee ............. H04N 13/00
2015/0346582 A1 12/2015 Aikio et al.
(Continued)

FOREIGN PATENT DOCUMENTS

CN 106031180 A 10/2016
KR 10-2012-0133006 A 12/2012
(Continued)

OTHER PUBLICATIONS

"Requirements and Use Cases for Omnidirectional Media Application Format", International Oganisation for Standardisation, Organisation Internationale De Normalisation ISO/IEC JTC1/SC29/WG11 Coding of Moving Pictures and Audio, ISO/IEC JCT1/SC29/WG11 N15731, MPEG Meeting, Oct. 19-23, 2015, XP30022414 (Year: 2015).*
(Continued)

*Primary Examiner* — Lindsay J Uhl
(74) *Attorney, Agent, or Firm* — Dentons US LLP

(57) ABSTRACT

The present invention proposes a method for transmitting 360 video. The method for transmitting 360 video according to the present invention may comprise the steps of: receiving 360 video data captured by at least one camera; projecting a 2D image obtained by processing the 360 video data; generating signaling information associated with the 360 video data; encoding the 2D image; and processing the
(Continued)

encoded 2D image and the signaling information for transmission thereof, and transmitting the same through a broadcasting network.

15 Claims, 27 Drawing Sheets

Related U.S. Application Data filed on Feb. 17, 2016, provisional application No. 62/297,951, filed on Feb. 22, 2016, provisional application No. 62/337,299, filed on May 16, 2016.

(56) References Cited

U.S. PATENT DOCUMENTS

| | | |
|---|---|---|
| 2015/0348580 A1 | 12/2015 | van Hoff et al. |
| 2016/0012855 A1 | 1/2016 | Krishnan |
| 2018/0374192 A1* | 12/2018 | Kunkel ................. G06T 15/205 |

FOREIGN PATENT DOCUMENTS

| | | | | |
|---|---|---|---|---|
| KR | 20140039231 A | * | 4/2014 | ........... H04N 13/178 |
| KR | 10-2015-0010752 A | | 1/2015 | |
| KR | 20150010752 A | * | 1/2015 | ......... H04N 5/23238 |
| WO | 0060857 A1 | | 10/2000 | |
| WO | WO-0060857 A1 | * | 10/2000 | ......... H04N 5/23238 |
| WO | 2015-126144 A1 | | 8/2015 | |
| WO | WO-2015126144 A1 | * | 8/2015 | ....... H04N 21/23418 |

OTHER PUBLICATIONS

"Requirements and Use Cases for Omnidirectional Media Application Format", International Organisation for Standardisation Organisation Internationale De Normalisation ISO/IEC JTC1/SC29/WG11 Coding of Moving Pictures and Audio, N15731, MPEG Meeting, Oct. 19-23, 2015, XP030022414 (Year: 2015).*

"Requirements and Use Cases for Omnidirectional Media Application Format", International Organisation for Standardisation Organisation Internationale De Normalisation ISO/IEC JTC1/SC29/WG11 Coding of Moving Pictures and Audio, ISO/IEC JTC1/SC29/WG11 N15731, MPEG Meeting, Oct. 19-23, 2015, XP030022414.

G. Bang et al., "[FTV AHG] The head mounted display applications for Free-viewpoint video service", International Organisation for Standardisation Organisation Internationale De Normalisation ISO/IEC JTC1/SC29/WG11 Coding of Moving Pictures and Audio, ISO/IEC JTC1/SC29/WG11, MPEG2015/M36488, Jun. 22-26, 2015, XP030064856.

M. Yu et al., "A Framework to Evaluate Omnidirectional Video Coding Schemes", 2015 IEEE International Symposium on Mixed and Augmented Reality, Sep. 1, 2015, pp. 31-36, XP055552593.

* cited by examiner

FIG. 7
(a) 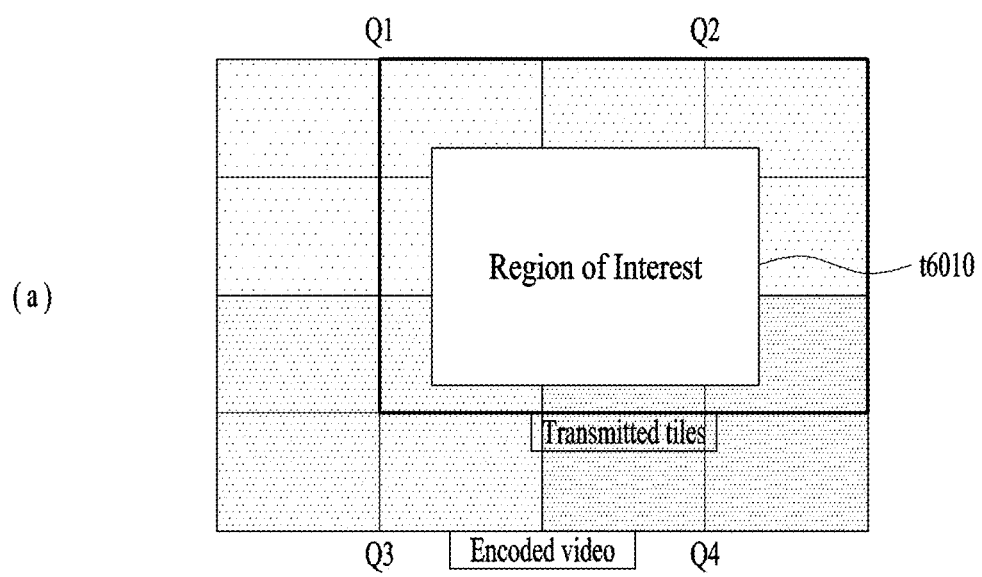
(b) 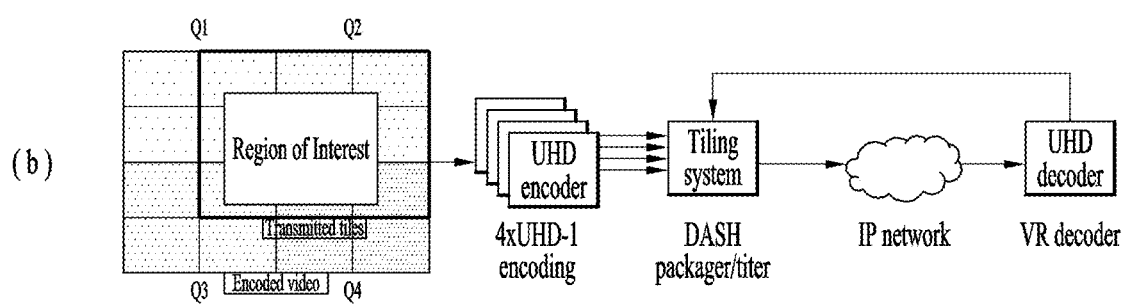

FIG. 8

```
    .....
            <basic metadata>
    unsigned    int(8)          vr_geometry;
    unsigned    int(8)          projection_schme;
            <stereoscopy-related metadata>
    unsigned    int(1)          is_stereoscopic;
    unsigned    int(3)          stereo_mode;
            <initial-view-related metadata>
    signed      int(8)          initial_view_yaw_degree;
    signed      int(8)          initial_view_pitch_degree;
    signed      int(8)          initial_view_roll_degree;
            <roi-related metadata>
    unsigned int(1)             2d_roi_range_flag;
    unsigned int(1)             3d_roi_range_flag;
    if (2d_roi_region_flag ==1) {
        unsigned int(16) min_top_left_x;
        unsigned int(16) max_top_left_x;
        unsigned int(16) min_top_left_y;
        unsigned int(16) max_top_left_y;
        unsigned int(16) min_width;
        unsigned int(16) max_width;
        unsigned int(16) min_height;
        unsigned int(16) max_height;
        unsigned int(16) min_x;
        unsigned int(16) max_x;
        unsigned int(16) min_y;
        unsigned int(16) max_y;
    }
    if (3d_roi_region_flag ==1) {
        unsigned int(16) min_yaw;
        unsigned int(16) max_yaw;
        unsigned int(16) min_pitch;
        unsigned int(16) max_pitch;
        unsigned int(16) min_roll;
        unsigned int(16) max_roll;
        unsigned int(16) min_field_of_view;
        unsigned int(16) max_field_of_view;
    }
            <field-of-view-related metadata>
    unsigned int(1)             content_fov_flag;
    if (content_fov_flag == 1) {
        unsigned int(16)        content_fov;
    }
            <cropped-region-related metadata>
    unsigned int(1)             is_cropped_region;
    if(is_cropped_region == 1) {
        unsigned int(16)        cr_region_left_top_x;
        unsigned int(16)        cr_region_left_top_y;
        unsigned int(16)        cr_region_width;
        unsigned int(16)        cr_region_height;
    }
    .....
```

FIG. 9

```
.....
    metadata related to support range of 360-degree video
unsigned int(1)      is_pitch_angle_less_180;
unsigned int(16)     pitch_angle;
unsigned int(1)      is_yaw_angle_less_360;
unsigned int(16)     yaw_angle;
if((is_pitch_angle_less_180) || (pitch_angle < 180)){
    int(16)      min_pitch;
    int(16)      max_pitch;
}
if((is_yaw_angle_less_360) || (yaw_angle < 360)) {
    int(16)      min_yaw;
    int(16)      max_yaw;
}
unsigned    int(1)          is_yaw_only;
    metadata related to vr_geometry field
if(vr_geometry == "sphere"){
    unsigned int(16)         sphere_raidus;
} else if (vr_geometry == " cylinder") {
    unsigned int(16)         cylinder_radius;
    unsigned int(16)         cylinder_height;
} else if (vr_geometry == "pyramid"){
    unsigned int(16)         pyramid_front_width;
    unsigned int(16)         pyramid_front_height;
    unsigned int(16)         pyramid_height;
} else if (vr_geometry == "cube"){
    unsigned int(16)         cube_front_width;
    unsigned int(16)         cube_front_height;
    unsigned int(16)         cube_height;
}
unsigned int(1)          spherical_flag;
    metadata related to projection_scheme field
if((projection_scheme =='0') || (projection_scheme =='3')) {
    unsigned int(16)         sphere_raidus;
} else if(projection_schme == '1'){  //cubic projection
    unsigned int(16)         cube_front_width;
    unsigned int(16)         cube_front_height;
    unsigned int(16)         cube_height;
} else if(projection_schme == '2') { //cylindrical projection
    unsigned int(16)         cylinder_radius;
    unsigned int(16)         cylinder_height;
} else if(projection_schme == '4'){ //pyramid projection
    unsigned int(16)         pyramid_front_width;
    unsigned int(16)         pyramid_front_height;
    signed int(8)            pyramid_front_rotation;
    unsigned int(16)         pyramid_height;
} else if(projection_schme == '5'){ // panoramic projection
    unsigned int(16)         panorama_height;
}
.....
```

```
.....
    metadata related to reception-side stitching
unsigned        int(1)          stitched_flag;
unsigned        int(1)          is_not_centered;
unsigned        int(1)          camera_info_flag;
if (stitched_flag == 1)  {
    string                      stitching_type;
    unsigned int(8)             num_camera;
}
if(is_not_centered == '1'){
    if(stitched_flag != '0'){
        signed int(8)           center_theta;
        signed int(8)           center_phi;
    }
}
if (camera_info_flag == 1)  {
    unsinged int(8)             num_camera;
    for (int l;=0; i< num_camera; i++) {
        IntrinsicCameraParametersBox   intrinsic_camera_params;
        ExtrinsicCameraParametersBox   extrinsic_camera_params;
        signed int(8)           camera_center_pitch;
        signed int(8)           camera_center_yaw;
        signed int(8)           camera_center_roll;
    }
}
    hdr-related metadata
unsigned int(1)             hdr_flag;
if (hdr_flag == 1)  {
    HDRConfigurationBox     hdr_config;
}
    wcg-related metadata
unsigned int(1)             wcg_flag;
if (wcg_flag == 1)  {
    CGConfigurationBox      wcg_config;
}
    region-related metadata
unsigned int(1)             region_info_flag;
if(regions_info_flag == '1')  {
    RegionGroup             region(projection_scheme);
}
.....
```

FIG. 11
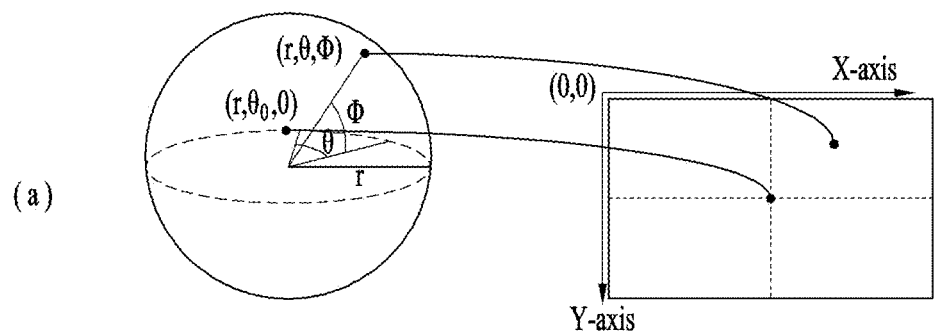
(a)
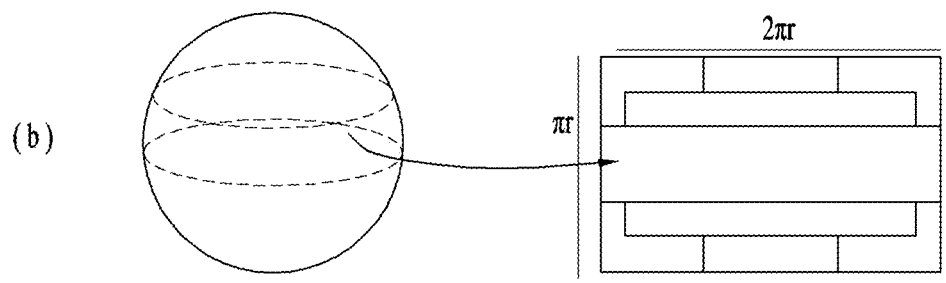
(b)
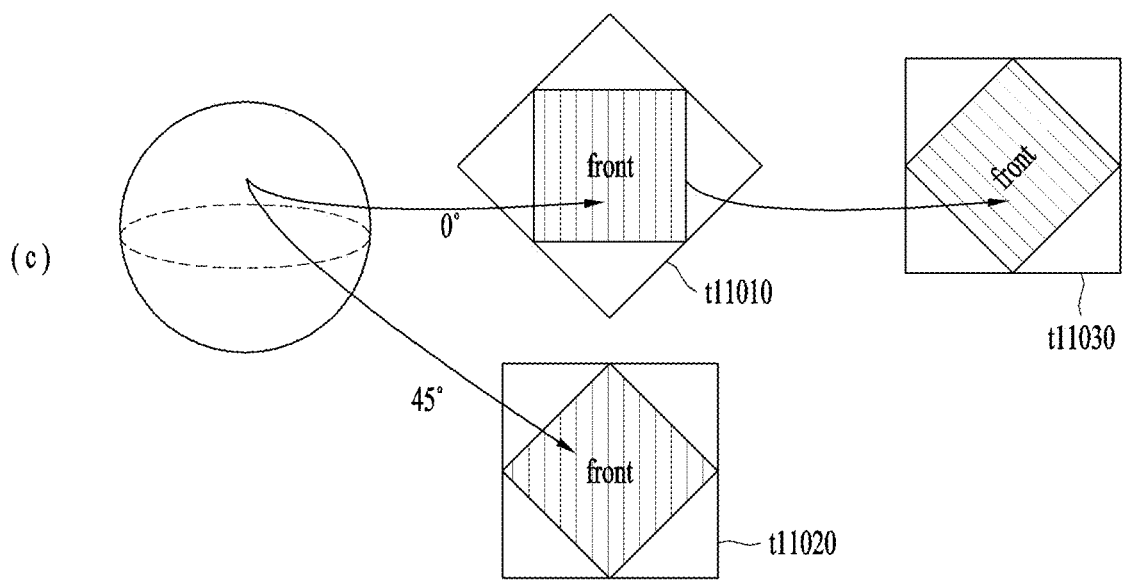
(c)

FIG. 13

```
class IntrinsicCameraParametersBox extends FullBox ('icam', version=0, flags) {
    unsigned int(6)     reserved=0;
    unsigned int(10)    ref_view_id;
    unsigned int(32)    prec_focal_length;
    unsigned int(32)    prec_principal_point;
    unsigned int(32)    prec_skew_factor;
    unsigned int(8)     exponent_focal_length_x;
    signed   int(64)    mantissa_focal_length_x;
    unsigned int(8)     exponent_focal_length_y;
    signed   int(64)    mantissa_focal_length_y;
    unsigned int(8)     exponent_principal_point_x;
    signed   int(64)    mantissa_principal_point_x;
    unsigned int(8)     exponent_principal_point_y;
    signed   int(64)    mantissa_principal_point_y;
    unsigned int(8)     exponent_skew_factor;
    signed   int(64)    mantissa_skew_factor;
}
```
— t14010

```
class ExtrinsicCameraParametersBox extends FullBox ('ecam', version=0, flags) {
    unsigned int(6)     reserved=0;
    unsigned int(10)    ref_view_id;
    unsigned int(8)     prec_rotation_param;
    unsigned int(8)     prec_translation_param;
    for (j=1; j<=3; j++) { /* row */
        for (k=1; k<=3; k++) { /* column */
            unsigned int(8)     exponent_r[j][k];
            signed   int(64)    mantissa_r[j][k];
        }
        unsigned int(8)     exponent_t[j];
        signed   int(64)    mantissa_t[j];
    }
}
```
— t14020

FIG. 14

```
class IntrinsicCameraParametersBox extends FullBox ('icam', version=0, flags) {
    unsigned int(8)         hdr_param_set;
    unsigned int(3)         reserved=0;
    unsigned int(1)         hdr_type_transition_flag;
    unsigned int(1)         hdr_sdr_transition_flag;
    unsigned int(1)         sdr_hdr_transition_flag;
    unsigned int(1)         sdr_compatibility_flag;
    unsigned int(1)         hdr_config_flag;
    if(hdr_config_flag) {
        unsigned int(8)     OETF_type;
        unsigned int(32)    max_mastering_display_luminance;
        unsigned int(32)    min_mastering_display_luminance;
        unsigned int(32)    average_frame_luminance_level;
        unsigned int(32)    max_frame_pixel_luminance}
}
```

FIG. 15

```
aligned(8) class CGConfigurationBox extends FullBox('cgcf', version=0, 0) {
    unsigned int(8)      color_gamut_type;
    unsigned int(1)      color_space_transition_flag;
    unsigned int(1)      wcg_scg_transition_flag;
    unsigned int(1)      scg_wcg_transition_flag;
    unsigned int(1)      scg_compatibility_flag;
    unsigned int(1)      color_primary_flag;
    unsigned int(3)      reserved=0;
    if(color_primary_flag ==1)
    {
        unsigned int(32)     color_primaryRx;
        unsigned int(32)     color_primaryRy;
        unsigned int(32)     color_primaryGx;
        unsigned int(32)     color_primaryGy;
        unsigned int(32)     color_primaryBx;
        unsigned int(32)     color_primaryBy;
        unsigned int(32)     color_whitePx;
        unsigned int(32)     color_whitePy;
    }
}
```
— t15010

| color_gamut_type Value | Meaning |
|---|---|
| 0 | reserved |
| 1 | Rec. ITU-R BT.709-5, Rec. ITU-R BT.1361 conventional colour gamut system and extended colour gamut system, IEC 61966-2-1 (sRGB or sYCC), IEC 61966-2-4, Society of Motion Picture and Television Engineers RP 177 (1993) |
| 2 | unspecified |
| 3 | Reserved for future use |
| 4 | Rec. ITU-R BT.470-6 System M (historical), United States National Television System Committee 1953 Recommendation for transmission standards for colour television United States Federal Communications Commission Title 47 Code of Federal Regulations (2003) 73.682 (a) |
| 5 | Rec. ITU-R BT.470-6 System B, G (historical), Rec. ITU-R BT.601-6 625, Rec. ITU-R BT.1358 625 Rec. ITU-R BT.1700 625 PAL and 625 SECAM |
| 6 | Rec. ITU-R BT.601-6 525, Rec. ITU-R BT.1358 525, Rec. ITU-R BT.1700 NTSC Society of Motion Picture and Television Engineers 170M (2004) |
| 7 | Society of Motion Picture and Television Engineers 240M (1999) |
| 8 | Generic film (colour filters using Illuminant C) |
| 9 | Rec. ITU-R BT.2020 |
| 10-255 | Reserved for future use |

```
class RegionGroupBox extends FullBox ('rgbx', version=0, flags) {
    unsigned int(8)         group_id;
    unsigned int(4)         reserved=0;
    unsigned int(4)         coding_dependency;
    unsigned int(8)         num_regions;
    for (j=0; j<= num_regions; j++) {
        unsigned int(8)     region_id;
        unsigned int(16)    horizontal_offset;
        unsigned int(16)    vertical_offset;
        unsigned int(16)    region_width;
        unsigned int(16)    region_height;
        int(16)             surface_center_pitch;
        unsigned int(16)    surface_pitch_angle;
        int(16)             surface_center_yaw;
        unsigned int(16)    surface_yaw_angle;
        int(16)             surface_center_roll;
        unsigned int(16)    surface_roll_angle;
    }
}
```
— t17010

```
class RegionGroupBox extends FullBox ('rgbx', version=0, flags) {
    unsigned int(8)         group_id;
    unsigned int(4)         reserved=0;
    unsigned int(4)         coding_dependency;
    unsigned int(8)         num_regions;
    for (j=0; j<= num_regions; j++) {
        unsigned int(8)     region_id;
        unsigned int(16)    horizontal_offset;
        unsigned int(16)    vertical_offset;
        unsigned int(16)    region_width;
        unsigned int(16)    region_height;
        unsigned int(16)    min_surface_pitch ;
        unsigned int(16)    max_surface_pitch ;
        unsigned int(16)    min_surface_yaw ;
        unsigned int(16)    max_surface_yaw ;
        unsigned int(16)    min_surface_roll ;
        unsigned int(16)    max_surface_roll ;
    }
}
```
— t17020

FIG. 17

```
class RegionGroup (unsigned int(8) projection_scehme) {
    unsigned int(8)         group_id;
    unsigned int(4)         reserved=0;
    unsigned int(4)         coding_dependency;
    unsigned int(8)         num_regions;
    for (j=0; j<= num_regions; j++) {
        unsigned int(8)         region_id;
        unsigned int(16)        horizontal_offset;
        unsigned int(16)        vertical_offset;
        unsigned int(16)        region_width;
        unsigned int(16)        region_height;
        unsigned int(6)         reserved=0;
        unsigned int(1)         sub_region_flag;
        unsigned int(1)         region_rotation_flag;
        if(rotation_flag == '1'){
            unsigned int(7)         region_rotation_axis;
            signed int(8)           region_rotation;
        }
        if((projection_scheme =='0') || (projection_scheme =='3')) {
            signed int(8)       min_region_pitch ;
            signed int(8)       max_region_pitch ;
            signed int(8)       min_region_yaw ;
            signed int(8)       max_region_yaw ;
            signed int(8)       min_region_roll ;
            signed int(8)       max_region_roll ;
        }else if(projection_scheme =='1'){          //cubic projection
            unsinged int(8)     cube_face;
            if(sub_region_flag == '1'){
                unsigned int(8)         sub_region_horizontal_offset ;
                unsigned int(8)         sub_region_vertical_offset ;
                unsigned int(8)         sub_region_width ;
                unsigned int(8)         sub_region_height;
            }
        }else if(projection_scheme =='2'){          //cylindrical projection
            unsinged int(8)     cylinder_face;
            if(sub_region_flag == '1'){
                unsigned int(8)         sub_region_horizontal_offset ;
                unsigned int(8)         sub_region_vertical_offset ;
                unsigned int(8)         sub_region_width ;
                unsigned int(8)         sub_region_height;
                signed int(8)           min_sub_region_yaw ;
                signed int(8)           max_sub_region_yaw ;
            }
        } else if(projection_scheme =='4') {        //pyramid projection
            unsinged int(8)     pyramid_face;
            if(sub_region_flag == '1'){
                unsigned int(8)         sub_region_horizontal_offset ;
                unsigned int(8)         sub_region_vertical_offset ;
                unsigned int(8)         sub_region_width ;
                unsigned int(8)         sub_region_height;
            }
        } else if(projection_scheme == '5') {       //panoramic projection
            signed int(8)       min_region_yaw ;
            signed int(8)       max_region_yaw ;
            signed int(8)       min_region_height ;
            signed int(8)       max_region_height ;
        } else if(projection_scheme == '6') {
            unsigned int(4)     reserved=0;
            unsigned int(10)    ref_view_id;
        }
    }
}
```

FIG. 20

```
aligned(8) class TrackHeaderBox extends FullBox('tkhd', version, flags){
    if (version==1) {
        unsigned int(64)        creation_time;
        unsigned int(64)        modification_time;
        unsigned int(32)        track_ID;
        const unsigned int(32)  reserved = 0;
        unsigned int(64)        duration;
    } else { // version==0
        unsigned int(32)        creation_time;
        unsigned int(32)        modification_time;
        unsigned int(32)        track_ID;
        const unsigned int(32)  reserved = 0;
        unsigned int(32)        duration;
    }
    const unsigned int(32)[2]   reserved = 0;
    template int(16)            layer = 0;
    template int(16)            alternate_group = 0;
    template int(16)            volume = {if track_is_audio 0x0100 else 0};
    const unsigned int(16)      reserved = 0;
    template int(32)[9]         matrix=
        { 0x00010000,0,0,0,0x00010000,0,0,0,0x40000000 };// unity matrix
    unsigned int(32)            width;
    unsigned int(32)            height;
    unsigned int(1)             omv_flag;
    unsigned int(7)             reserved=0;
    if(omv_flag == 1){
        OMVideoConfigurationBox  omv_config
    }
}
```
— t20010

```
aligned(8) class TrackFragmentHeaderBox extends FullBox('tfhd', 0, tf_flags){
    unsigned int(32)            track_ID;
unsigned int(1)   omv_flag;
unsigned int(7)   reserved=0;
if(omv_flag == 1){
OMVideoConfigurationBox         omv_config;
}
// all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
}
```
— t20020

```
aligned(8) class TrackFragmentHeaderBox extends FullBox('tfhd', 0, tf_flags){
    unsigned int(32)            track_ID;
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
    OMVideoConfigurationBox     default_sample_omv_config;
}
```
— t20030

FIG. 21

```
aligned(8) class VrVideoBox extends extends FullBox('vrvd', version = 0, 0)
{
          template unsigned int(28) reserved = 0;
          unsigned int(4) vr_mapping_type;
          OMVideoConfigurationBox      omv_config;
          Box[] any_box; // optional
}
```
— t21010

```
class OMVInformationSEIBox extends Box('omsb', size)
{
    unsigned int(8*size-64)        omvinfosei;
}
```
— t21020

```
aligned(8) class TrackReferenceBox extends Box('tref') {
}
aligned(8) class TrackReferenceTypeBox (unsigned int(32) reference_type) extends Box(reference_type) {
          unsigned int(32) track_IDs[];
}
```
— t21030

FIG. 22
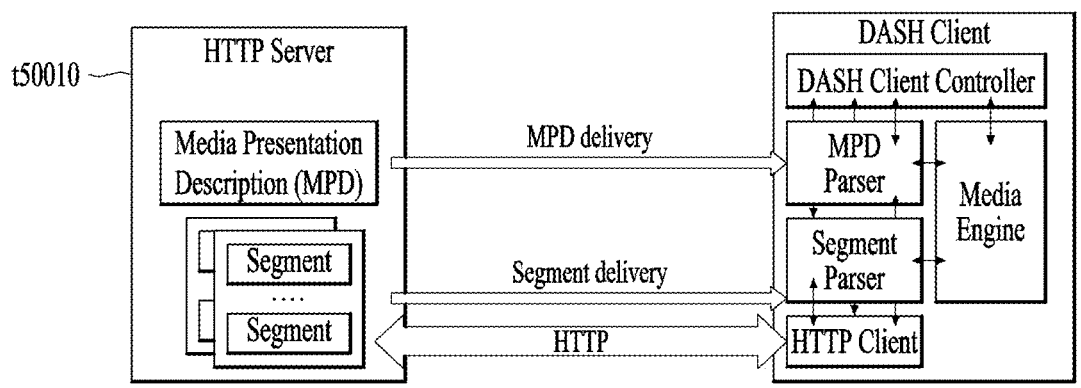
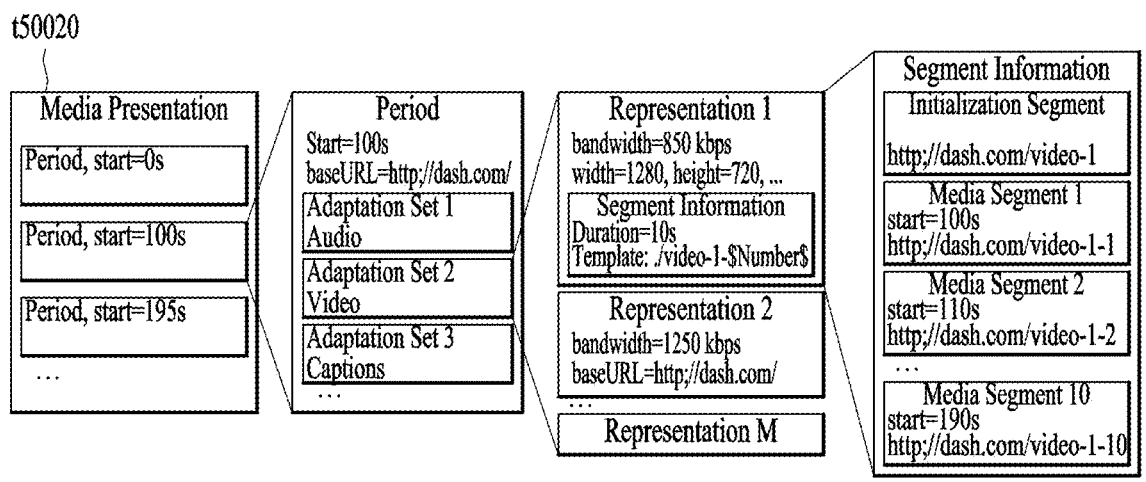

FIG. 23

| @value | Use |
|---|---|
| Projection_scheme | M |
| stitched_flag | OD (default:true) |
| stereo_mode | OD (default : mono) |
| is_pitch_angle_less_180 | OD (default:true) |
| is_yaw_angle_less_360 | OD (default:true) |
| is_yaw_only | OD (default: false) |
| is_not_centered | OD (default: false) |
| Initial_view_yaw | OD (default: 0) |
| Initial_view_pitch | OD (default: 0) |
| initial_view_roll | OD (default: 0) |
| Num_camera | 0 |
| center_theta | 0 |
| center_phi | 0 |
| content_fov | 0 |
| cropped_region_x | 0 |
| cropped_region_y | 0 |
| cropped_region_width | 0 |
| cropped_region_height | 0 |
| min_pitch | OD (default: -90) |
| max_pitch | OD (default: 90) |
| min_yaw | OD (default: -180) |
| max_yaw | OD (default: 180) |

FIG. 24

```
class 2DReagionCartesianCoordinatesSampleEntry extends MetadataSampleEntry ('2drc') {
    unsigned int(16) reference_width;
    unsigned int(16) reference_height;
    unsigned int(16) min_top_left_x;
    unsigned int(16) max_top_left_x;
    unsigned int(16) min_top_left_y;
    unsigned int(16) max_top_left_y;
    unsigned int(16) min_width;
    unsigned int(16) max_width;
    unsigned int(16) min_height;
    unsigned int(16) max_height;
}
```
— t24010

```
class 2DRegionCartesianCoordinatesSample(){
    unsigned int(16) top_left_x;
    unsigned int(16) top_left_y;
    unsigned int(16) width;
    unsigned int(16) height;
    unsigned int(1) interpolate;
    unsigned int(7) reserved;
}
```
— t24020

```
class 2DPointCartesianCoordinatesSampleEntry extends MetadataSampleEntry ('2dpc') {
    unsigned int(16) reference_width;
    unsigned int(16) reference_height;
    unsigned int(16) min_x;
    unsigned int(16) max_x;
    unsigned int(16) min_y;
    unsigned int(16) max_y;
}
```
— t24030

```
class 2DPointCartesianCoordinatesSample(){
    unsigned int(16) x;
    unsigned int(16) y;
    unsigned int(1) interpolate;
    unsigned int(7) reserved;
}
```
— t24040

FIG. 25

```
class 3DCartesianCoordinatesSampleEntry extends MetadataSampleEntry ('3dcc') {
    unsigned int(16) min_yaw;
    unsigned int(16) max_yaw;
    unsigned int(16) min_pitch;
    unsigned int(16) max_pitch;
    unsigned int(16) min_roll;
    unsigned int(16) max_roll;
    unsigned int(16) min_field_of_view;
    unsigned int(16) max_field_of_view;
}
```
― t25010

```
class 3DRegionCartesianCoordinatesSample(){
    unsigned int(16) yaw;
    unsigned int(16) pitch;
    unsigned int(16) roll;
    unsigned int(16) field_of_view;
    unsigned int(1) interpolate;
    unsigned int(7) reserved;
}
```
― t25020

```
class 3DPointCartesianCoordinatesSample(){
    unsigned int(16) yaw;
    unsigned int(16) pitch;
    unsigned int(16) roll;
    unsigned int(1) interpolate;
    unsigned int(7) reserved;
}
```
― t25030

FIG. 26

```
class GPSSampleEntry extends MetadataSampleEntry ('gpsm') {
    string              coordinate_reference_sys;
    unsigned int(1)     altitude_flag;
    unsigned int(7)     reserved=0;
}
```
— t26010

```
class GPSSample(){
    signed int(32) longitude;
    signed int(32) latitude;
    signed int(32) altitude;
}
```
— t26020

```
class GPSSample(){
    signed int(32) longitude;
    signed int(32) latitude;
}
```
— t26030

METHOD FOR TRANSMITTING 360 VIDEO, METHOD FOR RECEIVING 360 VIDEO, APPARATUS FOR TRANSMITTING 360 VIDEO, AND APPARATUS FOR RECEIVING 360 VIDEO

This application is a National Stage Application of International Application No. PCT/KR2017/001789, filed on Feb. 17, 2017, which claims the benefit of U.S. Provisional Application No. 62/296,534, filed on Feb. 17, 2016, U.S. Provisional Application No. 62/296,535, filed on Feb. 17, 2016, U.S. Provisional Application No. 62/297,951, filed on Feb. 22, 2016 and U.S. Provisional Application No. 62/337,299, filed on May 16, 2016, all of which are hereby incorporated by reference in their entirety for all purposes as if fully set forth herein.

TECHNICAL FIELD

The present invention relates to a 360-degree video transmission method, a 360-degree video reception method, a 360-degree video transmission apparatus, and a 360-degree video reception apparatus.

BACKGROUND ART

A virtual reality (VR) system provides a user with sensory experiences through which the user may feel as if he/she were in an electronically projected environment. A system for providing VR may be further improved in order to provide higher-quality images and spatial sound. Such a VR system may enable the user to interactively enjoy VR content.

DISCLOSURE

Technical Problem

VR systems need to be improved in order to more efficiently provide a user with a VR environment. To this end, it is necessary to propose plans for data transmission efficiency for transmitting a large amount of data such as VR content, robustness between transmission and reception networks, network flexibility considering a mobile reception apparatus, and efficient reproduction and signaling.

Technical Solution

According to objects of the present invention, the present invention proposes a 360-degree video transmission method, a 360-degree video reception method, a 360-degree video transmission apparatus, and a 360-degree video reception apparatus.

A 360-degree video transmission method according to an aspect of the present invention includes receiving 360-degree video data captured using at least one camera, processing the 360-degree video data and projecting the processed 360-degree video data on a 2D image, generating signaling information about the 360-degree video data, encoding the 2D image, and performing processing for transmission on the encoded 2D image and the signaling information and transmitting the processed 2D image and metadata over a broadcast network, wherein the signaling information includes projection scheme information indicating a projection scheme used to project the 360-degree video data on the 2D image.

The step of processing the 360-degree video data and projecting the processed 360-degree video data on the 2D image may include stitching the 360-degree video data and projecting the stitched 360-degree video data on the 2D image.

In the case in which the projection scheme information indicates a specific scheme, the step of processing the 360-degree video data and projecting the processed 360-degree video data on the 2D image may include projecting the 360-degree video data on the 2D image without stitching.

The signaling information may include ROI information indicating a region of interest (ROI), among the 360-degree video data, or initial viewpoint information indicating an initial viewpoint area shown first to a user when the 360-degree video data are reproduced, among the 360-degree video data, the ROI information may indicate the ROI using X and Y coordinates on the 2D image or indicate the ROI, appearing in a 3D space when the 360-degree video data are re-projected in the 3D space, using pitch, yaw, and roll, and the initial viewpoint information may indicate the initial viewpoint area using X and Y coordinates on the 2D image or indicate the initial viewpoint area, appearing in the 3D space, using pitch, yaw, and roll.

The signaling information may further include 3D space orientation information about orientation of a 3D space in which the 360-degree video data are re-projected, and the 3D space orientation information may indicate the extent of rotation of the orientation of the 3D space about the origin of a capture space coordinate system using pitch, yaw, and roll.

The signaling information may further include stitching signaling information necessary for a receiver to stitch the 360-degree video data, the stitching signaling information may include stitching flag information indicating whether the 360-degree video data have been stitched and camera information about the at least one camera that has captured the 360-degree video data, and the camera information may include information about the number of cameras, intrinsic camera information about each camera, extrinsic camera information about each camera, and camera center information indicating the position in a 3D space at which the center of an image captured by each camera is located using pitch, yaw, and roll values.

The stitching signaling information may further include rotation flag information indicating whether each region on the 2D image has been rotated, rotational axis information indicating the axis about which each region has been rotated, and amount-of-rotation information indicating the rotational direction and the extent of rotation of each region.

In the case in which the projection scheme information indicates a specific scheme, the 360-degree video data projected without stitching may be a fish-eye image captured using a spherical camera.

The signaling information may further include a pitch angle flag indicating whether the range of a pitch angle that the 360-degree video data support is less than 180 degrees, and the signaling information may further include a yaw angle flag indicating whether the range of a yaw angle that the 360-degree video data support is less than 360 degrees.

In the case in which the pitch angle flag indicates that the range of the pitch angle is less than 180 degrees, the signaling information may further include minimum pitch information and maximum pitch information respectively indicating the minimum pitch angle and the maximum pitch angle that the 360-degree video data support, and in the case in which the yaw angle flag indicates that the range of the yaw angle is less than 360 degrees, the signaling information may further include minimum yaw information and maximum yaw information respectively indicating the minimum yaw angle and the maximum yaw angle that the 360-degree video data support.

A 360-degree video reception apparatus according to another aspect of the present invention includes a reception unit for receiving a broadcast signal including a 2D image including 360-degree video data and signaling information about the 360-degree video data over a broadcast network, a reception-processing unit for processing the broadcast signal to acquire the 2D image and the signaling information, a data decoder for decoding the 2D image, a signaling parser for parsing the signaling information, and a renderer for processing the 2D image to render the 360-degree video data in a 3D space, wherein the signaling information includes projection scheme information indicating a projection scheme used to project the 360-degree video data on the 2D image.

The renderer may re-project the 360-degree video data, projected on the 2D image, in the 3D space.

The 360-degree video reception apparatus may further include a stitcher for, in the case in which the projection scheme information indicates a specific scheme, extracting the 360-degree video data projected on the 2D image and stitching the extracted 360-degree video data using the signaling information, wherein the renderer may re-project the stitched 360-degree video data in the 3D space.

The signaling information may include ROI information indicating a region of interest (ROI), among the 360-degree video data, or initial viewpoint information indicating an initial viewpoint area shown first to a user when the 360-degree video data are reproduced, among the 360-degree video data, the ROI information may indicate the ROI using X and Y coordinates on the 2D image or indicate the ROI, appearing in the 3D space, using pitch, yaw, and roll, and the initial viewpoint information may indicate the initial viewpoint area using X and Y coordinates on the 2D image or indicate the initial viewpoint area, appearing in the 3D space, using pitch, yaw, and roll.

The signaling information may further include 3D space orientation information about orientation of the 3D space in which the 360-degree video data are re-projected, and the 3D space orientation information may indicate the extent of rotation of the orientation of the 3D space about the origin of a capture space coordinate system using pitch, yaw, and roll.

The signaling information may further include stitching signaling information necessary for a receiver to stitch the 360-degree video data, the stitching signaling information may include stitching flag information indicating whether the 360-degree video data have been stitched and camera information about the at least one camera that has captured the 360-degree video data, and the camera information may include information about the number of cameras, intrinsic camera information about each camera, extrinsic camera information about each camera, and camera center information indicating the position in the 3D space at which the center of an image captured by each camera is located using pitch, yaw, and roll values.

The stitching signaling information may further include rotation flag information indicating whether each region on the 2D image has been rotated, rotational axis information indicating the axis about which each region has been rotated, and amount-of-rotation information indicating the rotational direction and the extent of rotation of each region.

In the case in which the projection scheme information indicates a specific scheme, the extracted 360-degree video data may be a fish-eye image captured using a spherical camera.

The signaling information may further include a pitch angle flag indicating whether the range of a pitch angle that the 360-degree video data support is less than 180 degrees, and the signaling information may further include a yaw angle flag indicating whether the range of a yaw angle that the 360-degree video data support is less than 360 degrees.

In the case in which the pitch angle flag indicates that the range of the pitch angle is less than 180 degrees, the signaling information may further include minimum pitch information and maximum pitch information respectively indicating the minimum pitch angle and the maximum pitch angle that the 360-degree video data support, and in the case in which the yaw angle flag indicates that the range of the yaw angle is less than 360 degrees, the signaling information may further include minimum yaw information and maximum yaw information respectively indicating the minimum yaw angle and the maximum yaw angle that the 360-degree video data support.

Advantageous Effects

According to the present invention, it is possible to efficiently transmit 360-degree content in an environment that supports next-generation hybrid broadcasting using a terrestrial broadcast network and the Internet.

According to the present invention, it is possible to propose a method of providing interactive experiences when a user enjoys 360-degree content.

According to the present invention, it is possible to propose a method of performing signaling such that the intention of a 360-degree content producer is accurately conveyed when a user enjoys 360-degree content.

According to the present invention, it is possible to propose a method of efficiently increasing transmission capacity and transmitting necessary information at the time of transmitting 360-degree content.

DESCRIPTION OF DRAWINGS

FIG. 7 is a view showing a tile according to an embodiment of the present invention;

FIG. 8 is a view showing 360-degree-video-related metadata according to an embodiment of the present invention;

FIG. 9 is a view showing 360-degree-video-related metadata according to another embodiment of the present invention;

FIG. 11 is a view showing projection schemes according to an embodiment of the present invention;

FIG. 13 is a view showing an IntrinsicCameraParametersBox class and an ExtrinsicCameraParametersBox class according to an embodiment of the present invention;

FIG. 14 is a view showing an HDRConfigurationBox class according to an embodiment of the present invention;

FIG. 15 is a view showing a CGConfigurationBox class according to an embodiment of the present invention;

FIG. 16 is a view showing a RegionGroupBox class according to an embodiment of the present invention;

FIG. 17 is a view showing a RegionGroup class according to an embodiment of the present invention;

FIG. 20 is a view showing that 360-degree-video-related metadata defined as an OMVideoConfigurationBox class is delivered in each box according to an embodiment of the present invention;

FIG. 21 is a view showing that 360-degree-video-related metadata defined as an OMVideoConfigurationBox class is delivered in each box according to another embodiment of the present invention;

FIG. 22 is a view showing the overall operation of a DASH-based adaptive streaming model according to an embodiment of the present invention;

FIG. 23 is a view showing 360-degree-video-related metadata described in the form of a DASH-based descriptor according to an embodiment of the present invention;

FIG. 24 is a view showing metadata related to specific area or ROI indication according to an embodiment of the present invention;

FIG. 25 is a view showing metadata related to specific area indication according to another embodiment of the present invention;

FIG. 26 is a view showing GPS-related metadata according to an embodiment of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood according to the intended meanings of the terms rather than their simple names or meanings.

Figure 1:
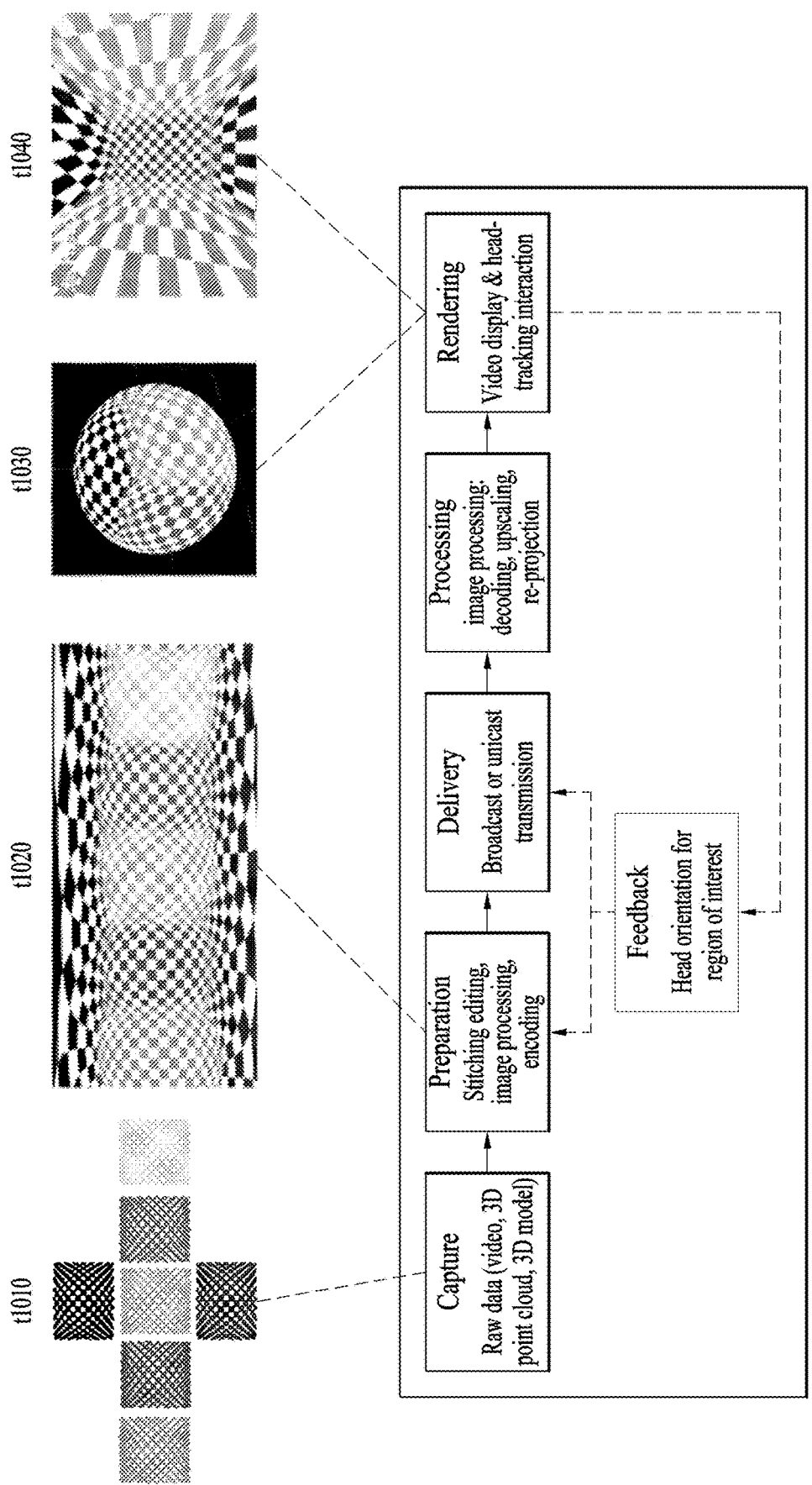
FIG. 1 is a view showing the entire architecture for providing a 360-degree video according to the present invention.

FIG. 1 is a view showing the entire architecture for providing 360-degree video according to the present invention.

The present invention proposes a scheme for 360-degree content provision in order to provide a user with virtual reality (VR). VR may mean technology or an environment for replicating an actual or virtual environment. VR artificially provides a user with sensual experiences through which the user may feel as if he/she were in an electronically projected environment.

360-degree content means all content for realizing and providing VR, and may include 360-degree video and/or 360-degree audio. The term "360-degree video" may mean video or image content that is captured or reproduced in all directions (360 degrees) at the same time, which is necessary to provide VR. Such 360-degree video may be a video or an image that appears in various kinds of 3D spaces depending on 3D models. For example, the 360-degree video may appear on a spherical surface. The term "360-degree audio", which is audio content for providing VR, may mean spatial audio content in which the origin of a sound is recognized as being located in a specific 3D space. The 360-degree content may be generated, processed, and transmitted to users, who may enjoy a VR experience using the 360-degree content.

The present invention proposes a method of effectively providing 360-degree video in particular. In order to provide 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capturing process may be a process of capturing an image or a video at each of a plurality of viewpoints using at least one camera. At the capturing process, image/video data may be generated, as shown (t1010). Each plane that is shown (t1010) may mean an image/video at each viewpoint. A plurality of captured images/videos may be raw data. At the capturing process, capturing-related metadata may be generated.

A special camera for VR may be used for capturing. In some embodiments, in the case in which 360-degree video for a virtual space generated by a computer is provided, capturing may not be performed using an actual camera. In this case, a process of simply generating related data may replace the capturing process.

The preparation process may be a process of processing the captured images/videos and the metadata generated at the capturing process. At the preparation process, the captured images/videos may undergo a stitching process, a projection process, a region-wise packing process, and/or an encoding process.

First, each image/video may undergo the stitching process. The stitching process may be a process of connecting the captured images/videos to generate a panoramic image/video or a spherical image/video.

Subsequently, the stitched image/video may undergo the projection process. At the projection process, the stitched image/video may be projected on a 2D image. Depending on the context, the 2D image may be called a 2D image frame. 2D image projection may be expressed as 2D image mapping. The projected image/video data may have the form of a 2D image, as shown (t1020).

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, this process may include a process of rotating each region or rearranging the regions on the 2D image in order to improve video coding efficiency. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata related to stitching/projection/encoding/editing may be generated in the same manner. In addition, metadata related to the initial viewpoint of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case in which the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form that is shown (t1030). The image/video is re-projected on a spherical 3D model, as shown (t1030). The user may view a portion of the rendered image/video through a VR display. At this time, the portion of the image/video that is viewed by the user may have the form that is shown (t1040).

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side at the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed at the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used at the reception side. That is, the decoding, re-projection, and rendering processes may be performed at the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewpoint, which is the point in the 360-degree video that is being viewed by the user, may be the very center of the viewport area. That is, the viewport is an area based on the viewpoint. The size or shape of the area may be set by a field of view (FOY), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

Figure 2:
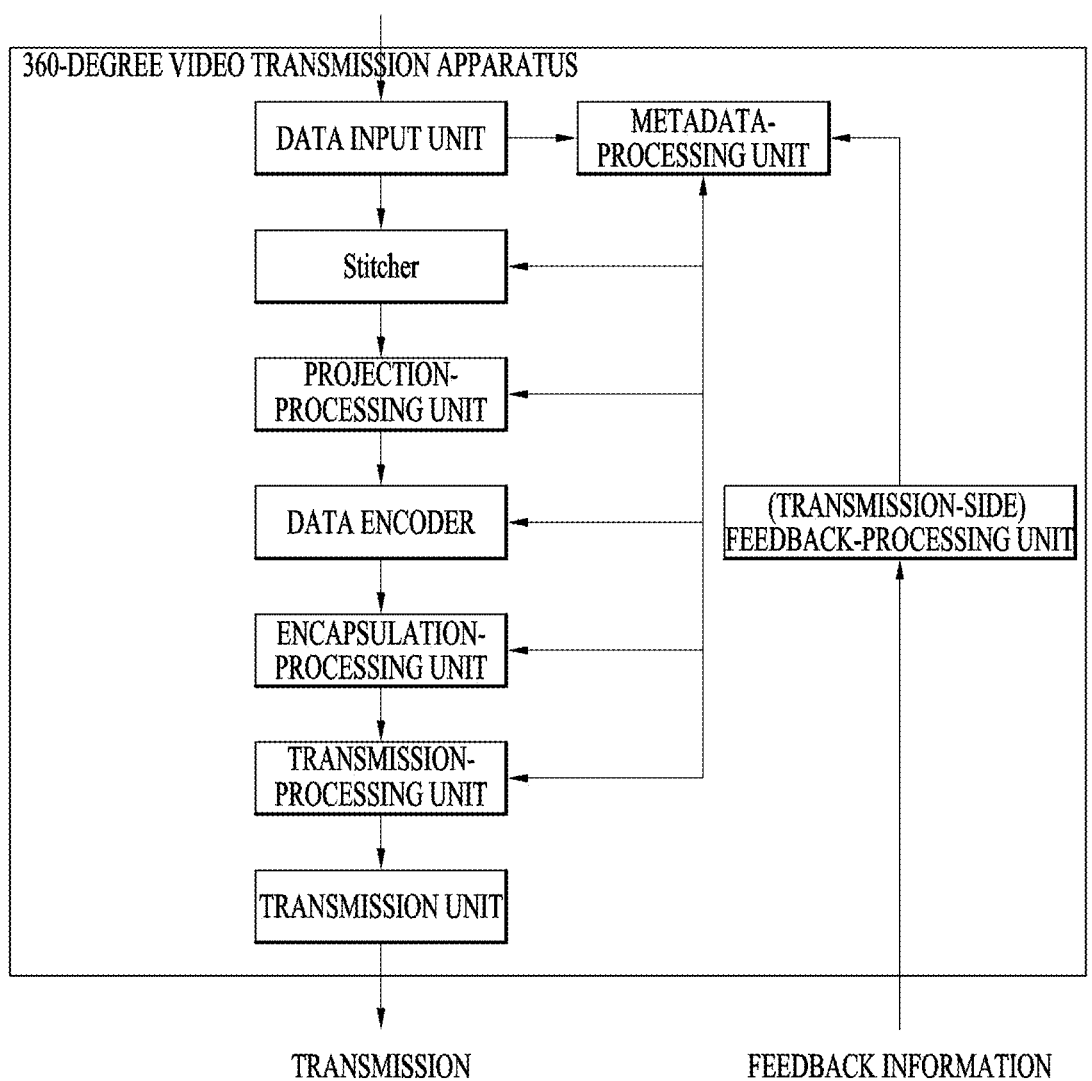
FIG. 2 is a view showing a 360-degree video transmission apparatus according to an aspect of the present invention.

FIG. 2 is a view showing a 360-degree video transmission apparatus according to an aspect of the present invention.

According to an aspect of the present invention, the present invention may be related to a 360-degree video transmission apparatus. The 360-degree video transmission apparatus according to the present invention may perform operations related to the preparation process and the delivery process. The 360-degree video transmission apparatus according to the present invention may include a data input unit, a stitcher, a projection-processing unit, a region-wise packing processing unit (not shown), a metadata-processing unit, a (transmission-side) feedback-processing unit, a data encoder, an encapsulation-processing unit, a transmission-processing unit, and/or a transmission unit as internal/external elements.

The data input unit may allow captured viewpoint-wise images/videos to be input. The viewpoint-wise image/videos may be images/videos captured using at least one camera. In addition, the data input unit may allow metadata generated at the capturing process to be input. The data input unit may deliver the input viewpoint-wise images/videos to the stitcher, and may deliver the metadata generated at the capturing process to a signaling processing unit.

The stitcher may stitch the captured viewpoint-wise images/videos. The stitcher may deliver the stitched 360-degree video data to the projection-processing unit. As needed, the stitcher may receive necessary metadata from the metadata-processing unit in order to use the received metadata at the stitching process. The stitcher may deliver metadata generated at the stitching process to the metadata-processing unit. The metadata generated at the stitching process may include information about whether stitching has been performed and the stitching type.

The projection-processing unit may project the stitched 360-degree video data on a 2D image. The projection-processing unit may perform projection according to various schemes, which will be described below. The projection-processing unit may perform mapping in consideration of the depth of the viewpoint-wise 360-degree video data. As needed, the projection-processing unit may receive metadata necessary for projection from the metadata-processing unit in order to use the received metadata for projection. The projection-processing unit may deliver metadata generated at the projection process to the metadata-processing unit. The metadata of the projection-processing unit may include information about the kind of projection scheme.

The region-wise packing processing unit (not shown) may perform the region-wise packing process. That is, the region-wise packing processing unit may divide the projected 360-degree video data into regions, and may rotate or re-arrange each region, or may change the resolution of each region. As previously described, the region-wise packing process is optional. In the case in which the region-wise packing process is not performed, the region-wise packing processing unit may be omitted. As needed, the region-wise packing processing unit may receive metadata necessary for region-wise packing from the metadata-processing unit in order to use the received metadata for region-wise packing. The region-wise packing processing unit may deliver metadata generated at the region-wise packing process to the metadata-processing unit. The metadata of the region-wise packing processing unit may include the extent of rotation and the size of each region.

In some embodiments, the stitcher, the projection-processing unit, and/or the region-wise packing processing unit may be incorporated into a single hardware component.

The metadata-processing unit may process metadata that may be generated at the capturing process, the stitching process, the projection process, the region-wise packing process, the encoding process, the encapsulation process, and/or the processing process for delivery. The metadata-processing unit may generate 360-degree-video-related metadata using the above-mentioned metadata. In some embodiments, the metadata-processing unit may generate the 360-degree-video-related metadata in the form of a signaling table. Depending on the context of signaling, the 360-degree-video-related metadata may be called metadata or signaling information related to the 360-degree video. In addition, the metadata-processing unit may deliver the acquired or generated metadata to the internal elements of the 360-degree video transmission apparatus, as needed. The metadata-processing unit may deliver the 360-degree-video-related metadata to the data encoder, the encapsulation-processing unit, and/or the transmission-processing unit such that the 360-degree-video-related metadata can be transmitted to the reception side.

The data encoder may encode the 360-degree video data projected on the 2D image and/or the region-wise packed 360-degree video data. The 360-degree video data may be encoded in various formats.

The encapsulation-processing unit may encapsulate the encoded 360-degree video data and/or the 360-degree-video-related metadata in the form of a file. Here, the 360-degree-video-related metadata may be metadata received from the metadata-processing unit. The encapsulation-processing unit may encapsulate the data in a file format of ISOBMFF or CFF, or may process the data in the form of a DASH segment. In some embodiments, the encapsulation-processing unit may include the 360-degree-video-related metadata on the file format. For example, the 360-degree-video-related metadata may be included in various levels of boxes in the ISOBMFF file format, or may be included as data in a separate track within the file. In some embodiments, the encapsulation-processing unit may encapsulate the 360-degree-video-related metadata itself as a file. The transmission-processing unit may perform processing for transmission on the encapsulated 360-degree video data according to the file format. The transmission-processing unit may process the 360-degree video data according to an arbitrary transport protocol. Processing for transmission may include processing for delivery through a broadcast network and processing for delivery through a broadband connection. In some embodiments, the transmission-processing unit may receive 360-degree-video-related metadata from the metadata-processing unit, in addition to the 360-degree video data, and may perform processing for transmission thereon.

The transmission unit may transmit the transmission-processed 360-degree video data and/or the 360-degree-video-related metadata through the broadcast network and/or the broadband connection. The transmission unit may include an element for transmission through the broadcast network and/or an element for transmission through the broadband connection.

In an embodiment of the 360-degree video transmission apparatus according to the present invention, the 360-degree video transmission apparatus may further include a data storage unit (not shown) as an internal/external element. The data storage unit may store the encoded 360-degree video data and/or the 360-degree-video-related metadata before delivery to the transmission-processing unit. The data may be stored in a file format of ISOBMFF. In the case in which the 360-degree video is transmitted in real time, no data storage unit is needed. In the case in which the 360-degree video is transmitted on demand, in non-real time (NRT), or through a broadband connection, however, the encapsulated 360-degree data may be transmitted after being stored in the data storage unit for a predetermined period of time.

In another embodiment of the 360-degree video transmission apparatus according to the present invention, the 360-degree video transmission apparatus may further include a (transmission-side) feedback-processing unit and/or a network interface (not shown) as an internal/external element. The network interface may receive feedback information from a 360-degree video reception apparatus according to the present invention, and may deliver the received feedback information to the transmission-side feedback-processing unit. The transmission-side feedback-processing unit may deliver the feedback information to the stitcher, the projection-processing unit, the region-wise packing processing unit, the data encoder, the encapsulation-processing unit, the metadata-processing unit, and/or the transmission-processing unit. In some embodiments, the feedback information may be delivered to the metadata-processing unit, and may then be delivered to the respective internal elements. After receiving the feedback information, the internal elements may reflect the feedback information when subsequently processing the 360-degree video data.

In another embodiment of the 360-degree video transmission apparatus according to the present invention, the region-wise packing processing unit may rotate each region, and may map the rotated region on the 2D image. At this time, the regions may be rotated in different directions and at different angles, and may be mapped on the 2D image. The rotation of the regions may be performed in consideration of the portions of the 360-degree video data that were adjacent to each other on the spherical surface before projection and the stitched portions thereof. Information about the rotation of the regions, i.e. the rotational direction and the rotational angle, may be signaled by the 360-degree-video-related metadata. In another embodiment of the 360-degree video transmission apparatus according to the present invention, the data encoder may differently encode the regions. The data encoder may encode some regions at high quality, and may encode some regions at low quality. The transmission-side feedback-processing unit may deliver the feedback information, received from the 360-degree video reception apparatus, to the data encoder, which may differently encode the regions. For example, the transmission-side feedback-processing unit may deliver the viewport information, received from the reception side, to the data encoder. The data encoder may encode regions including the areas indicated by the viewport information at higher quality (UHD, etc.) than other regions.

In a further embodiment of the 360-degree video transmission apparatus according to the present invention, the transmission-processing unit may differently perform processing for transmission on the regions. The transmission-processing unit may apply different transport parameters (modulation order, code rate, etc.) to the regions such that robustness of data delivered for each region is changed.

At this time, the transmission-side feedback-processing unit may deliver the feedback information, received from the 360-degree video reception apparatus, to the transmission-processing unit, which may differently perform transmission processing for the regions. For example, the transmission-side feedback-processing unit may deliver the viewport information, received from the reception side, to the transmission-processing unit. The transmission-processing unit may perform transmission processing on regions including the areas indicated by the viewport information so as to have higher robustness than other regions.

The internal/external elements of the 360-degree video transmission apparatus according to the present invention may be hardware elements that are realized as hardware. In some embodiments, however, the internal/external elements may be changed, omitted, replaced, or incorporated. In some embodiments, additional elements may be added to the 360-degree video transmission apparatus.

Figure 3:
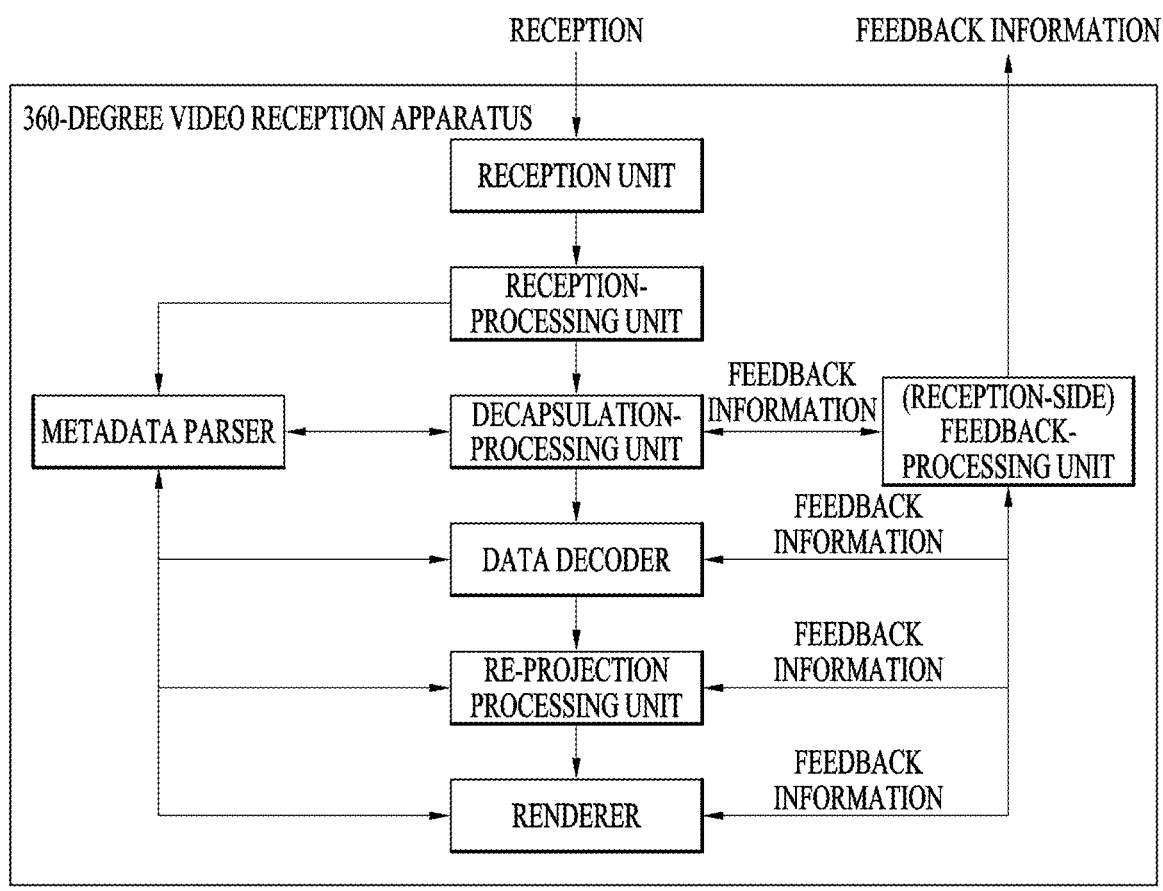
FIG. 3 is a view showing a 360-degree video reception apparatus according to another aspect of the present invention.

FIG. 3 is a view showing a 360-degree video reception apparatus according to another aspect of the present invention.

According to another aspect of the present invention, the present invention may be related to a 360-degree video reception apparatus. The 360-degree video reception apparatus according to the present invention may perform operations related to the processing process and/or the rendering process. The 360-degree video reception apparatus according to the present invention may include a reception unit, a reception-processing unit, a decapsulation-processing unit, a data decoder, a metadata parser, a (reception-side) feedback-processing unit, a re-projection processing unit, and/or a renderer as internal/external elements.

The reception unit may receive 360-degree video data transmitted by the 360-degree video transmission apparatus. Depending on the channel through which the 360-degree video data are transmitted, the reception unit may receive the 360-degree video data through a broadcast network, or may receive the 360-degree video data through a broadband connection.

The reception-processing unit may process the received 360-degree video data according to a transport protocol. In order to correspond to processing for transmission at the transmission side, the reception-processing unit may perform the reverse process of the transmission-processing unit. The reception-processing unit may deliver the acquired 360-degree video data to the decapsulation-processing unit, and may deliver the acquired 360-degree-video-related metadata to the metadata parser. The 360-degree-video-related metadata, acquired by the reception-processing unit, may have the form of a signaling table.

The decapsulation-processing unit may decapsulate the 360-degree video data, received in file form from the reception-processing unit. The decapsulation-processing unit may decapsulate the files based on ISOBMFF, etc. to acquire 360-degree video data and 360-degree-video-related metadata. The acquired 360-degree video data may be delivered to the data decoder, and the acquired 360-degree-video-related metadata may be delivered to the metadata parser. The 360-degree-video-related metadata, acquired by the decapsulation-processing unit, may have the form of a box or a track in a file format. As needed, the decapsulation-processing unit may receive metadata necessary for decapsulation from the metadata parser.

The data decoder may decode the 360-degree video data. The data decoder may receive metadata necessary for decoding from the metadata parser. The 360-degree-video-related metadata, acquired at the data decoding process, may be delivered to the metadata parser.

The metadata parser may parse/decode the 360-degree-video-related metadata. The metadata parser may deliver the acquired metadata to the decapsulation-processing unit, the data decoder, the re-projection processing unit, and/or the renderer.

The re-projection processing unit may re-project the decoded 360-degree video data. The re-projection processing unit may re-project the 360-degree video data in a 3D space. The 3D space may have different forms depending on the 3D models that are used. The re-projection processing unit may receive metadata for re-projection from the metadata parser. For example, the re-projection processing unit may receive information about the type of 3D model that is used and the details thereof from the metadata parser. In some embodiments, the re-projection processing unit may re-project, in the 3D space, only the portion of 360-degree video data that corresponds to a specific area in the 3D space using the metadata for re-projection.

The renderer may render the re-projected 360-degree video data. As previously described, the 360-degree video data may be expressed as being rendered in the 3D space. In the case in which two processes are performed simultaneously, the re-projection processing unit and the renderer may be incorporated such that the renderer can perform these processes. In some embodiments, the renderer may render only the portion that is being viewed by a user according to user's viewpoint information.

The user may view a portion of the rendered 360-degree video through a VR display. The VR display, which is a device that reproduces the 360-degree video, may be included in the 360-degree video reception apparatus (tethered), or may be connected to the 360-degree video reception apparatus (untethered).

In an embodiment of the 360-degree video reception apparatus according to the present invention, the 360-degree video reception apparatus may further include a (reception-side) feedback-processing unit and/or a network interface (not shown) as an internal/external element. The reception-side feedback-processing unit may acquire and process feedback information from the renderer, the re-projection processing unit, the data decoder, the decapsulation-processing unit, and/or the VR display. The feedback information may include viewport information, head orientation information, and gaze information. The network interface may receive the feedback information from the reception-side feedback-processing unit, and may transmit the same to the 360-degree video transmission apparatus.

As previously described, the feedback information may not only be delivered to the transmission side but may also be used at the reception side. The reception-side feedback-processing unit may deliver the acquired feedback information to the internal elements of the 360-degree video reception apparatus so as to be reflected at the rendering process. The reception-side feedback-processing unit may deliver the feedback information to the renderer, the re-projection processing unit, the data decoder, and/or the decapsulation-processing unit. For example, the renderer may first render the area that is being viewed by the user using the feedback information. In addition, the decapsulation-processing unit and the data decoder may first decapsulate and decode the area that is being viewed by the user or the area that will be viewed by the user.

The internal/external elements of the 360-degree video reception apparatus according to the present invention described above may be hardware elements that are realized as hardware. In some embodiments, the internal/external elements may be changed, omitted, replaced, or incorporated. In some embodiments, additional elements may be added to the 360-degree video reception apparatus.

According to another aspect of the present invention, the present invention may be related to a 360-degree video transmission method and a 360-degree video reception method. The 360-degree video transmission/reception method according to the present invention may be performed by the 360-degree video transmission/reception apparatus according to the present invention described above or embodiments of the apparatus.

Embodiments of the 360-degree video transmission/reception apparatus and transmission/reception method according to the present invention and embodiments of the internal/external elements thereof may be combined. For example, embodiments of the projection-processing unit and embodiments of the data encoder may be combined in order to provide a number of possible embodiments of the 360-degree video transmission apparatus. Such combined embodiments also fall within the scope of the present invention.

Figure 4:
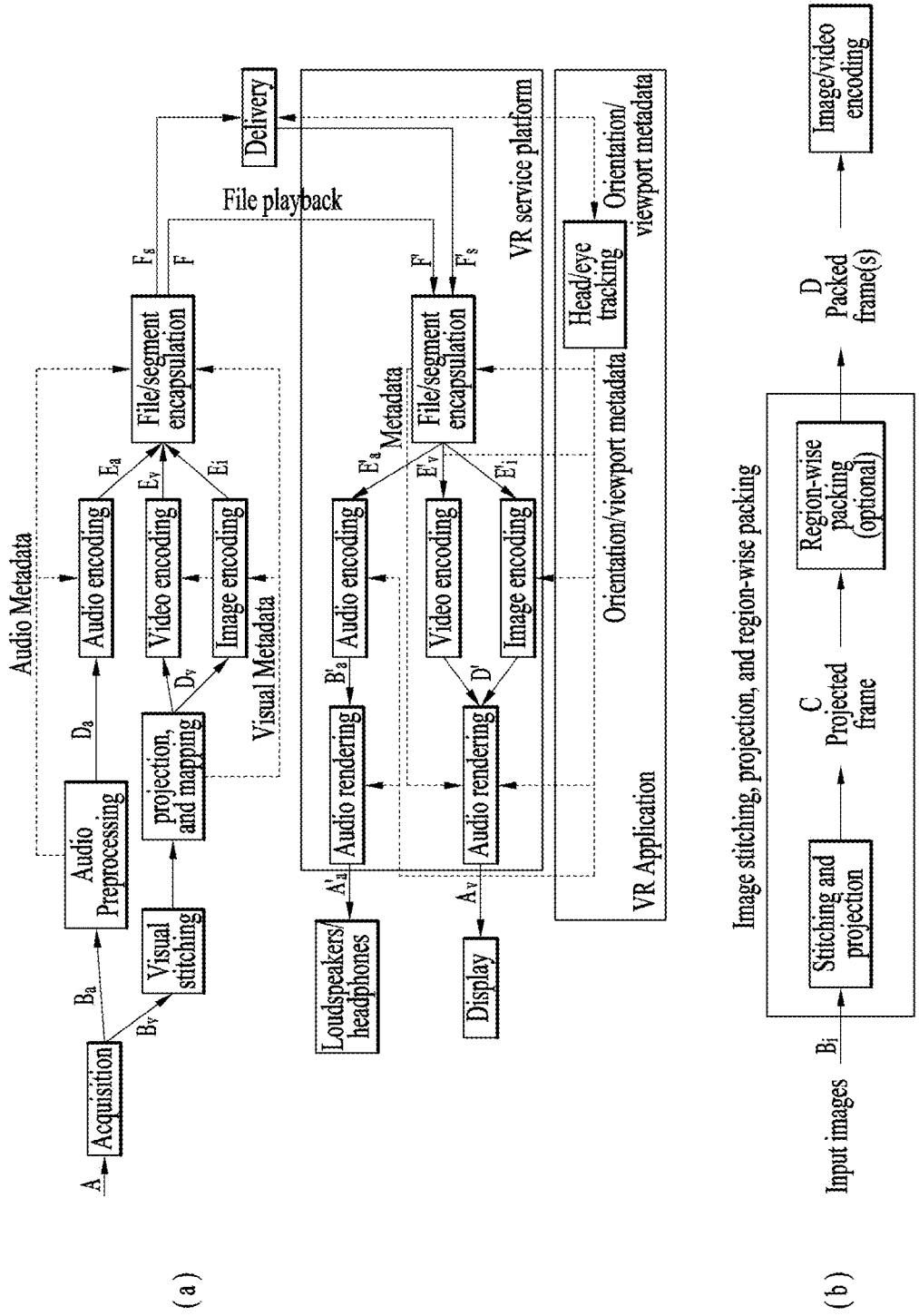
FIG. 4 is a view showing a 360-degree video transmission apparatus/360-degree video reception apparatus according to another embodiment of the present invention.

FIG. 4 is a view showing a 360-degree video transmission apparatus/360-degree video reception apparatus according to another embodiment of the present invention.

As previously described, 360-degree content may be provided through the architecture shown in FIG. 4(a). The 360-degree content may be provided in the form of a file, or may be provided in the form of segment-based download or streaming service, such as DASH. Here, the 360-degree content may be called VR content.

As previously described, 360-degree video data and/or 360-degree audio data may be acquired (Acquisition).

The 360-degree audio data may undergo an audio pre-processing process and an audio encoding process. In these processes, audio-related metadata may be generated. The encoded audio and the audio-related metadata may undergo processing for transmission (file/segment encapsulation).

The 360-degree video data may undergo the same processes as previously described. The stitcher of the 360-degree video transmission apparatus may perform stitching on the 360-degree video data (Visual stitching). In some embodiments, this process may be omitted, and may be performed at the reception side. The projection-processing unit of the 360-degree video transmission apparatus may project the 360-degree video data on a 2D image (Projection and mapping (packing)).

The stitching and projection processes are shown in detail in FIG. 4(b). As shown in FIG. 4(b), when the 360-degree video data (input image) is received, stitching and projection may be performed. Specifically, at the projection process, the stitched 360-degree video data may be projected in a 3D space, and the projected 360-degree video data may be arranged on the 2D image. In this specification, this process may be expressed as projecting the 360-degree video data on the 2D image. Here, the 3D space may be a sphere or a cube. The 3D space may be the same as the 3D space used for re-projection at the reception side.

The 2D image may be called a projected frame C. Region-wise packing may be selectively performed on the 2D image. When region-wise packing is performed, the position, shape, and size of each region may be indicated such that the regions on the 2D image can be mapped on a packed frame D. When region-wise packing is not performed, the projected frame may be the same as the packed frame. The regions will be described below. The projection process and the region-wise packing process may be expressed as projecting the regions of the 360-degree video data on the 2D image. Depending on the design, the 360-degree video data may be directly converted into the packed frame without undergoing intermediate processes.

As shown in FIG. 4(a), the projected 360-degree video data may be image-encoded or video-encoded. Since even the same content may have different viewpoints, the same content may be encoded in different bit streams. The encoded 360-degree video data may be processed in a file format of ISOBMFF by the encapsulation-processing unit. Alternatively, the encapsulation-processing unit may process the encoded 360-degree video data into segments. The segments may be included in individual tracks for transmission based on DASH.

When the 360-degree video data are processed, 360-degree-video-related metadata may be generated, as previously described. The metadata may be delivered while being included in a video stream or a file format. The metadata may also be used at the encoding process, file format encapsulation, or processing for transmission.

The 360-degree audio/video data may undergo processing for transmission according to the transport protocol, and may then be transmitted. The 360-degree video reception apparatus may receive the same through a broadcast network or a broadband connection.

In FIG. 4(a), a VR service platform may correspond to one embodiment of the 360-degree video reception apparatus. In FIG. 4(a), Loudspeaker/headphone, display, and head/eye tracking components are shown as being performed by an external device of the 360-degree video reception apparatus or VR application. In some embodiments, the 360-degree video reception apparatus may include these components. In some embodiments, the head/eye tracking component may correspond to the reception-side feedback-processing unit.

The 360-degree video reception apparatus may perform file/segment decapsulation for reception on the 360-degree audio/video data. The 360-degree audio data may undergo audio decoding and audio rendering, and may then be provided to a user through the loudspeaker/headphone component.

The 360-degree video data may undergo image decoding or video decoding and visual rendering, and may then be provided to the user through the display component. Here, the display component may be a display that supports VR or a general display.

As previously described, specifically, the rendering process may be expressed as re-projecting the 360-degree video data in the 3D space and rendering the re-projected 360-degree video data. This may also be expressed as rendering the 360-degree video data in the 3D space.

The head/eye tracking component may acquire and process head orientation information, gaze information, and viewport information of the user, which have been described previously.

A VR application that communicates with the reception-side processes may be provided at the reception side.

Figure 5:
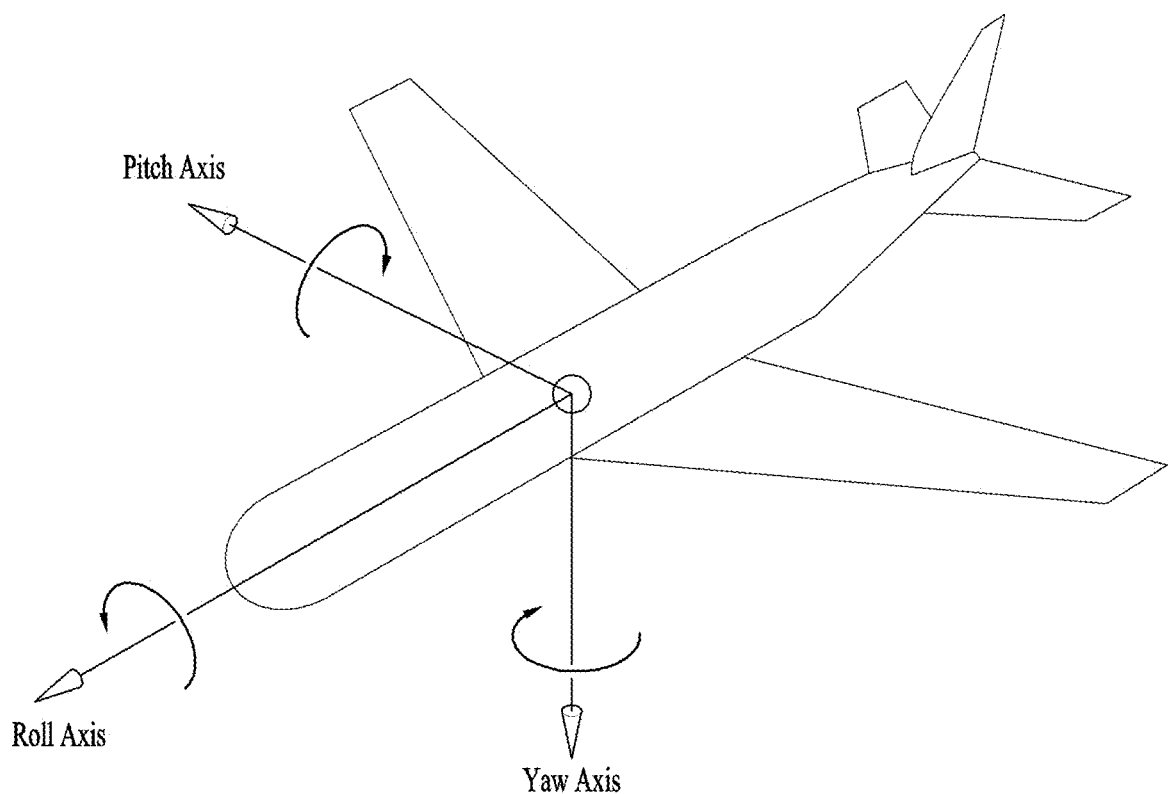
FIG. 5 is a view showing the concept of principal aircraft axes for describing 3D space in connection with the present invention.

FIG. 5 is a view showing the concept of principal aircraft axes for describing 3D space in connection with the present invention.

In the present invention, the concept of principal aircraft axes may be used in order to express a specific point, position, direction, distance, area, etc. in the 3D space.

That is, in the present invention, the 3D space before projection or after re-projection may be described, and the concept of principal aircraft axes may be used in order to perform signaling thereon. In some embodiments, a method of using X, Y, and Z-axis concepts or a spherical coordinate system may be used.

An aircraft may freely rotate in three dimensions. Axes constituting the three dimensions are referred to as a pitch axis, a yaw axis, and a roll axis. In this specification, these terms may also be expressed either as pitch, yaw, and roll or as a pitch direction, a yaw direction, and a roll direction.

The pitch axis may be an axis about which the forward portion of the aircraft is rotated upwards/downwards. In the shown concept of principal aircraft axes, the pitch axis may be an axis extending from one wing to another wing of the aircraft.

The yaw axis may be an axis about which the forward portion of the aircraft is rotated leftwards/rightwards. In the shown concept of principal aircraft axes, the yaw axis may be an axis extending from the top to the bottom of the aircraft.

In the shown concept of principal aircraft axes, the roll axis may be an axis extending from the forward portion to the tail of the aircraft. Rotation in the roll direction may be rotation performed about the roll axis.

As previously described, the 3D space in the present invention may be described using the pitch, yaw, and roll concept.

Figure 6:
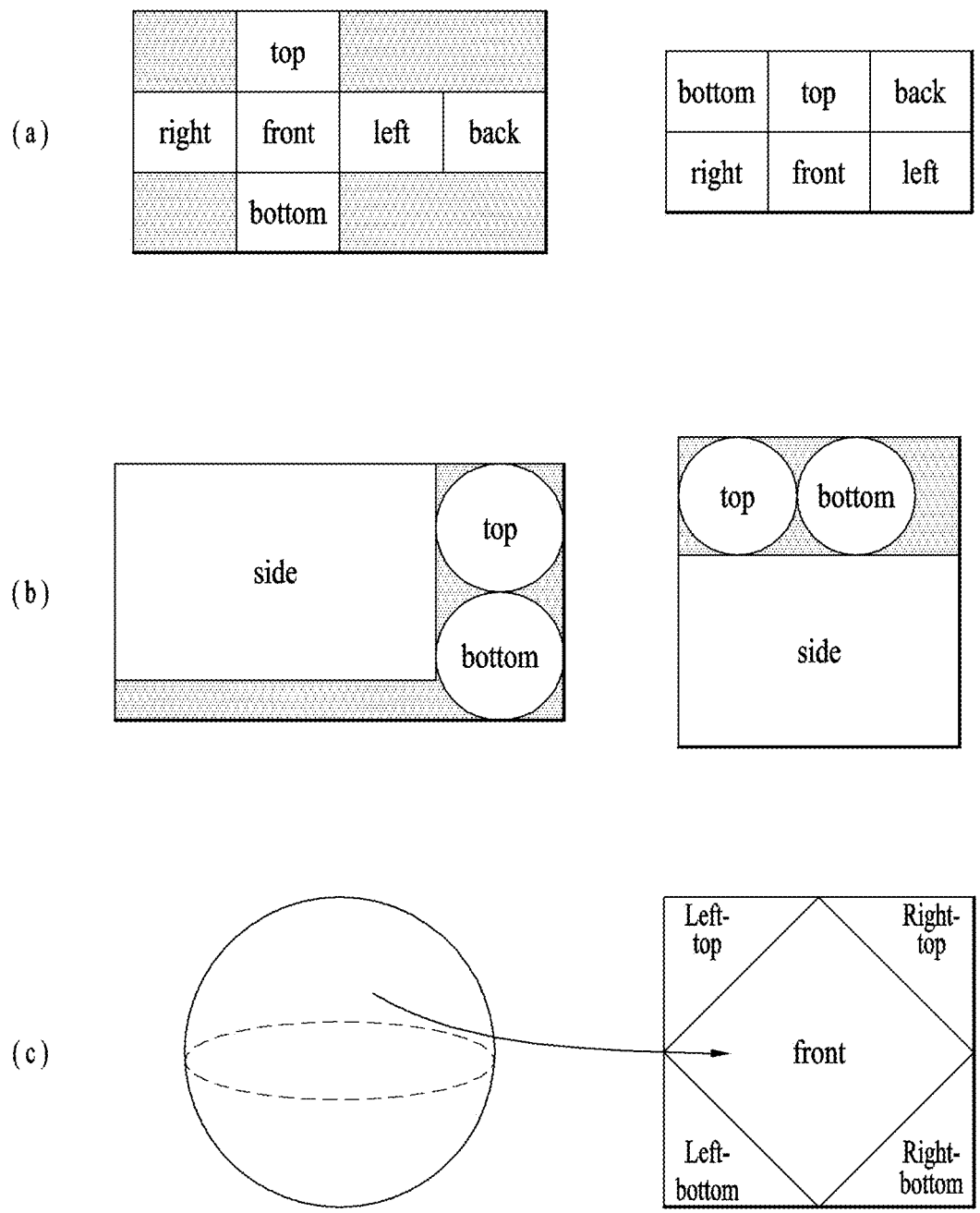
FIG. 6 is a view showing projection schemes according to an embodiment of the present invention.

FIG. 6 is a view showing projection schemes according to an embodiment of the present invention.

As previously described, the projection-processing unit of the 360-degree video transmission apparatus according to the present invention may project the stitched 360-degree video data on the 2D image. In this process, various projection schemes may be used.

In another embodiment of the 360-degree video transmission apparatus according to the present invention, the projection-processing unit may perform projection using a cubic projection scheme. For example, the stitched 360-degree video data may appear on a spherical surface. The projection-processing unit may project the 360-degree video data on the 2D image in the form of a cube. The 360-degree video data on the spherical surface may correspond to respective surfaces of the cube. As a result, the 360-degree video data may be projected on the 2D image, as shown at the left side or the right side of FIG. 6(a).

In another embodiment of the 360-degree video transmission apparatus according to the present invention, the projection-processing unit may perform projection using a cylindrical projection scheme. In the same manner, on the assumption that the stitched 360-degree video data appear on a spherical surface, the projection-processing unit may project the 360-degree video data on the 2D image in the form of a cylinder. The 360-degree video data on the spherical surface may correspond to the side, the top, and the bottom of the cylinder. As a result, the 360-degree video data may be projected on the 2D image, as shown at the left side or the right side of FIG. 6(b).

In a further embodiment of the 360-degree video transmission apparatus according to the present invention, the projection-processing unit may perform projection using a pyramidal projection scheme. In the same manner, on the assumption that the stitched 360-degree video data appears on a spherical surface, the projection-processing unit may project the 360-degree video data on the 2D image in the form of a pyramid. The 360-degree video data on the spherical surface may correspond to the front, the left top, the left bottom, the right top, and the right bottom of the pyramid. As a result, the 360-degree video data may be projected on the 2D image, as shown at the left side or the right side of FIG. 6(c).

In some embodiments, the projection-processing unit may perform projection using an equirectangular projection scheme or a panoramic projection scheme, in addition to the above-mentioned schemes.

As previously described, the regions may be divided parts of the 2D image on which the 360-degree video data are projected. The regions do not necessarily coincide with respective surfaces on the 2D image projected according to the projection scheme. In some embodiments, however, the regions may be partitioned so as to correspond to the projected surfaces on the 2D image such that region-wise packing can be performed. In some embodiments, a plurality of surfaces may correspond to a single region, and a single surface corresponds to a plurality of regions. In this case, the regions may be changed depending on the projection scheme. For example, in FIG. 6(a), the respective surfaces (top, bottom, front, left, right, and back) of the cube may be respective regions. In FIG. 6(b), the side, the top, and the bottom of the cylinder may be respective regions. In FIG. 6(c), the front and the four-directional lateral surfaces (left top, left bottom, right top, and right bottom) of the pyramid may be respective regions.

FIG. 7 is a view showing a tile according to an embodiment of the present invention.

The 360-degree video data projected on the 2D image or the 360-degree video data that have undergone region-wise packing may be partitioned into one or more tiles. FIG. 7(a) shows a 2D image divided into 16 tiles. Here, the 2D image may be the projected frame or the packed frame. In another embodiment of the 360-degree video transmission apparatus according to the present invention, the data encoder may independently encode the tiles.

Region-wise packing and tiling may be different from each other. Region-wise packing may be processing each region of the 360-degree video data projected on the 2D image in order to improve coding efficiency or to adjust resolution. Tiling may be the data encoder dividing the projected frame or the packed frame into tiles and independently encoding the tiles. When the 360-degree video data are provided, the user does not simultaneously enjoy all parts of the 360-degree video data. Tiling may enable the user to enjoy or transmit only tiles corresponding to an important part or a predetermined part, such as the viewport that is being viewed by the user, to the reception side within a limited bandwidth. The limited bandwidth may be more efficiently utilized through tiling, and calculation load may be reduced because the reception side does not process the entire 360-degree video data at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case in which the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360-degree content provider. The 360-degree content provider may produce a 360-degree video in consideration of the area of the 360-degree video in which users are interested. In some embodiments, the ROI may correspond to an area of the 360-degree video in which an important portion of the 360-degree video is shown.

In another embodiment of the 360-degree video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 7(a) shows a viewport t6010 displayed on the 2D image. Here, the viewport may be located over 9 tiles on the 2D image.

In this case, the 360-degree video transmission apparatus may further include a tiling system. In some embodiments, the tiling system may be disposed after the data encoder (see FIG. 7(b)), may be included in the data encoder or the transmission-processing unit, or may be included in the 360-degree video transmission apparatus as a separate internal/external element.

The tiling system may receive the viewport information from the transmission-side feedback-processing unit. The tiling system may select and transmit only tiles including the viewport area. In the FIG. 7(a), 9 tiles including the viewport area t6010, among a total of 16 tiles of the 2D image, may be transmitted. Here, the tiling system may transmit the tiles in a unicast manner over a broadband connection. The reason for this is that the viewport area may be changed for respective people.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata related to the viewport area to the internal elements of the 360-degree video transmission apparatus, or may include the same in the 360-degree-video-related metadata.

By using this tiling system, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360-degree video through the VR display (initial viewpoint).

In another embodiment of the 360-degree video transmission apparatus according to the present invention, the transmission-processing unit may perform transmission processing differently for respective tiles. The transmission-processing unit may apply different transport parameters (modulation order, code rate, etc.) to the tiles such that robustness of data delivered for each region is changed.

At this time, the transmission-side feedback-processing unit may deliver the feedback information, received from the 360-degree video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 8 is a view showing 360-degree-video-related metadata according to an embodiment of the present invention.

The 360-degree-video-related metadata may include various metadata for the 360-degree video. Depending on the context, the 360-degree-video-related metadata may be called 360-degree-video-related signaling information. The 360-degree-video-related metadata may be transmitted while being included in a separate signaling table, or may be transmitted while being included in DASH MPD, or may be transmitted while being included in the form of a box in a file format of ISOBMFF. In the case in which the 360-degree-video-related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

In an embodiment of the 360-degree-video-related metadata according to the present invention, the 360-degree-video-related metadata may include basic metadata about projection schemes, stereoscopy-related metadata, initial-view/initial-viewpoint-related metadata, ROI-related metadata, field-of-view (FOV)-related metadata, and/or cropped-region-related metadata. In some embodiments, the 360-degree-video-related metadata may further include metadata other than the above metadata.

Embodiments of the 360-degree-video-related metadata according to the present invention may include at least one of the basic metadata, the stereoscopy-related metadata, the initial-view-related metadata, the ROI-related metadata, the FOV-related metadata, the cropped-region-related metadata, and/or additional possible metadata. Embodiments of the 360-degree-video-related metadata according to the present invention may be variously configured depending on possible number of metadata included therein. In some embodiments, the 360-degree-video-related metadata may further include additional information.

The basic metadata may include 3D-model-related information and projection-scheme-related information. The basic metadata may include a vr_geometry field and a projection_scheme field. In some embodiments, the basic metadata may include additional information.

The vr_geometry field may indicate the type of 3D model supported by the 360-degree video data. In the case in which the 360-degree video data is re-projected in a 3D space, as previously described, the 3D space may have a form based on the 3D model indicated by the vr_geometry field. In some embodiments, a 3D model used for rendering may be different from a 3D model used for re-projection indicated by the vr_geometry field. In this case, the basic metadata may further include a field indicating the 3D model used for rendering. In the case in which the field has a value of 0, 1, 2, or 3, the 3D space may follow a 3D model of a sphere, a cube, a cylinder, or a pyramid. In the case in which the field has additional values, the values may be reserved for future use. In some embodiments, the 360-degree-video-related metadata may further include detailed information about the 3D model indicated by the field. Here, the detailed information about the 3D model may be radius information of the sphere or the height information of the cylinder. This field may be omitted.

The projection_scheme field may indicate the projection scheme used when the 360-degree video data is projected on a 2D image. In the case in which the field has a value of 0, 1, 2, 3, 4, or 5, this may indicate that an equirectangular projection scheme, a cubic projection scheme, a cylindrical projection scheme, a tile-based projection scheme, a pyramidal projection scheme, or a panoramic projection scheme has been used. In the case in which the field has a value of 6, this may indicate that the 360-degree video data has been projected on a 2D image without stitching. In the case in which the field has additional values, the values may be reserved for future use. In some embodiments, the 360-degree-video-related metadata may further include detailed information about regions generated by the projection scheme specified by the field. Here, the detailed information about the regions may be rotation of the regions or radius information of the top region of the cylinder.

The stereoscopy-related metadata may include information about 3D-related attributes of the 360-degree video data. The stereoscopy-related metadata may include an is_stereoscopic field and/or a stereo_mode field. In some embodiments, the stereoscopy-related metadata may further include additional information.

The is_stereoscopic field may indicate whether the 360-degree video data support 3D. When the field is 1, this may mean 3D support. When the field is 0, this may mean 3D non-support. This field may be omitted.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case in which the field has additional values, the values may be reserved for future use.

The initial-view-related metadata may include information about the time at which a user views the 360-degree video when the 360-degree video is reproduced first (an initial viewpoint). The initial-view-related metadata may include an initial_view_yaw_degree field, an initial_view_pitch_degree field, and/or an initial_view_roll_degree field. In some embodiments, the initial-view-related metadata may further include additional information.

The initial_view_yaw_degree field, the initial_view_pitch_degree field, and the initial_view_roll_degree field may indicate an initial viewpoint when the 360-degree video is reproduced. That is, the very center point of the viewport that is viewed first at the time of reproduction may be indicated by these three fields. The fields may indicate the position of the right center point as the rotational direction (symbol) and the extent of rotation (angle) about the yaw, pitch, and roll axes. At this time, the viewport that is viewed when the video is reproduced first according to the FOV may be determined. The horizontal length and the vertical length (width and height) of an initial viewport based on the indicated initial viewpoint through the FOV may be determined. That is, the 360-degree video reception apparatus may provide a user with a predetermined area of the 360-degree video as an initial viewport using these three fields and the FOV information.

In some embodiments, the initial viewpoint indicated by the initial-view-related metadata may be changed for each scene. That is, the scenes of the 360-degree video may be changed over time. An initial viewpoint or an initial viewport at which the user views the video first may be changed for every scene of the 360-degree video. In this case, the initial-view-related metadata may indicate the initial viewport for each scene. To this end, the initial-view-related metadata may further include a scene identifier identifying the scene to which the initial viewport is applied. In addition, the FOV may be changed for each scene. The initial-viewrelated metadata may further include scene-wise FOV information indicating the FOV corresponding to the scene.

The ROI-related metadata may include information related to the ROI. The ROI-related metadata may a 2d_roi_range_flag field and/or a 3d_roi_range_flag field. Each of the two fields may indicate whether the ROI-related metadata includes fields expressing the ROI based on the 2D image or whether the ROI-related metadata includes fields expressing the ROI based on the 3D space. In some embodiments, the ROI-related metadata may further include additional information, such as differential encoding information based on the ROI and differential transmission processing information based on the ROI.

In the case in which the ROI-related metadata includes fields expressing the ROI based on the 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. These fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. These fields may indicate the minimum x coordinate, the maximum x coordinate, the minimum y coordinate, and the maximum y coordinate of the coordinates in the ROI, respectively. These fields may be omitted.

In the case in which the ROI-related metadata includes fields expressing the ROI based on the coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. These fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV-related metadata, a description of which will follow.

The FOV-related metadata may include the above information related to the FOV. The FOV-related metadata may include a content_fov_flag field and/or a content_fov field. In some embodiments, the FOV-related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360-degree video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region-related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case in which the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region-related metadata may include an is_cropped_region field, a cr_region_left_top_x field, a cr_region_left_top_y field, a cr_region_width field, and/or a cr_region_height field. In some embodiments, the cropped-region-related metadata may further include additional information.

The is_cropped_region field may be a flag indicating whether the entire area of the image frame is used by the 360-degree video reception apparatus or the VR display. That is, this field may indicate whether the entire image frame is the active video area. In the case in which only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

FIG. 9 is a view showing 360-degree-video-related metadata according to another embodiment of the present invention.

As previously described, the 360-degree-video-related metadata may be transmitted while being included in a separate signaling table, or may be transmitted while being included in DASH MPD, may be transmitted while being included in the form of a box in a file format of ISOBMFF or Common File Format, or may be transmitted while being included in a separate track as data.

In the case in which the 360-degree-video-related metadata are included in the form of a box, the 360-degree-video-related metadata may be defined as OMVideoConfigurationBox class. OMVideoConfigurationBox may be called an omvc box. The 360-degree-video-related metadata may be transmitted while being included in a variety of levels, such as a file, a fragment, a track, a sample entry, and a sample. Depending on the level in which the 360-degree-video-related metadata are included, the 360-degree-video-related metadata may provide metadata about data of a corresponding level (a track, a stream, a sample, etc.).

In another embodiment of the 360-degree-video-related metadata according to the present invention, the 360-degree-video-related metadata may further include metadata related to the support range of the 360-degree video, metadata related to the vr_geometry field, metadata related to the projection_scheme field, metadata related to reception-side stitching, High Dynamic Range (HDR)-related metadata, Wide Color Gamut (WCG)-related metadata, and/or region-related metadata.

Embodiments of the 360-degree-video-related metadata according to the present invention may include at least one of the basic metadata, the stereoscopy-related metadata, the initial-view-related metadata, the ROI-related metadata, the FOV-related metadata, the cropped-region-related metadata, the metadata related to the support range of the 360-degree video, the metadata related to the vr_geometry field, the metadata related to the projection_scheme field, the metadata related to reception-side stitching, the HDR-related metadata, the WCG-related metadata, and/or the region-related metadata. Embodiments of the 360-degree-video-related metadata according to the present invention may be variously configured depending on the possible number of metadata included therein. In some embodiments, the 360-degree-video-related metadata may further include additional information.

The metadata related to the support range of the 360-degree video may include information about the support range of the 360-degree video in the 3D space. The metadata related to the support range of the 360-degree video may include an is_pitch_angle_less_180 field, a pitch_angle field, an is_yaw_angle_less_360 field, a yaw_angle field, and/or an is_yaw_only field. In some embodiments, the metadata related to the support range of the 360-degree video may further include additional information. The fields of the metadata related to the support range of the 360-degree video may be classified as other metadata.

The is_pitch_angle_less_180 field may indicate whether, when the 360-degree video is re-projected or rendered in the 3D space, the range of the pitch in the 3D space that the 360-degree video covers (supports) is less than 180 degrees. That is, this field may indicate whether a difference between the maximum value and the minimum value of the pitch angle supported by the 360-degree video is less than 180 degrees.

The pitch_angle field may indicate a difference between the maximum value and the minimum value of the pitch angle supported by the 360-degree video when the 360-degree video is re-projected or rendered in the 3D space. This field may be omitted depending on the value of the is_pitch_angle_less_180 field.

The is_yaw_angle_less_360 field may indicate whether, when the 360-degree video is re-projected or rendered in the 3D space, the range of the yaw in the 3D space that the 360-degree video covers (supports) is less than 360 degrees. That is, this field may indicate whether a difference between the maximum value and the minimum value of the yaw angle supported by the 360-degree video is less than 360 degrees.

The yaw_angle field may indicate a difference between the maximum value and the minimum value of the yaw angle supported by the 360-degree video when the 360-degree video is re-projected or rendered in the 3D space. This field may be omitted depending on the value of the is_yaw_angle_less_360 field.

In the case in which the is_pitch_angle_less_180 field indicates that the pitch support range is less than 180 degrees and in which the pitch_angle field has a value less than 180, the metadata related to the support range of the 360-degree video may further include a min_pitch field and/or a max_pitch field.

The min_pitch field and the max_pitch field may respectively indicate the minimum value and the maximum value of the pitch (or φ) that the 360-degree video supports when the 360-degree video is re-projected or rendered in the 3D space.

In the case in which the is_yaw_angle_less_360 field indicates that the yaw support range is less than 360 degrees and in which the yaw_angle field has a value less than 360, the metadata related to the support range of the 360-degree video may further include a min_yaw field and/or a max_yaw field.

The min_yaw field and the max_yaw field may respectively indicate the minimum value and the maximum value of the yaw (or θ) that the 360-degree video supports when the 360-degree video is re-projected or rendered in the 3D space.

The is_yaw_only field may be a flag indicating that the interaction of a user for the 360-degree video is limited only in the yaw direction. That is, this field may be a flag indicating that the head motion for the 360-degree video is limited only in the yaw direction. For example, in the case in which this field is set, when the user moves his/her head from side to side while wearing the VR display, the rotational direction and the extent of rotation only about the yaw axis are reflected in order to provide a 360-degree video experience. When the user moves his/her head only up and down, the area of the 360-degree video may not be changed. This field may be classified as metadata other than the metadata related to the support range of the 360-degree video.

The metadata related to the vr_geometry field may provide detailed information related to the 3D model based on the type of the 3D model indicated by the vr_geometry field. As previously described, the vr_geometry field may indicate the type of the 3D model supported by the 360-degree video data. The metadata related to the vr_geometry field may provide detailed information about each indicated 3D model (a sphere, a cube, a cylinder, or a pyramid). The detailed information will be described below.

Additionally, the metadata related to the vr_geometry field may include a spherical_flag field. The spherical_flag field may indicate whether the 360-degree video is a spherical video. This field may be omitted.

In some embodiments, the metadata related to the vr_geometry field may further include additional information. In some embodiments, the fields of the metadata related to the vr_geometry field may be classified as other metadata.

The metadata related to the projection_scheme field may provide detailed information about the projection scheme indicated by the projection_scheme field. As previously described, the projection_scheme field may indicate the projection scheme used when the 360-degree video data is projected on the 2D image. The metadata related to the projection_scheme field may provide detailed information about each indicated projection scheme (an equirectangular projection scheme, a cubic projection scheme, a cylindrical projection scheme, a pyramidal projection scheme, a panoramic projection scheme, or projection without stitching). The detailed information will be described below.

In some embodiments, the metadata related to the projection_scheme field may further include additional information. In some embodiments, the fields of the metadata related to the projection_scheme field may be classified as other metadata.

The metadata related to reception-side stitching may provide information necessary when stitching is performed at the reception side. When stitching is performed at the reception side, the stitcher of the 360-degree video transmission apparatus does not stitch the 360-degree video data, and therefore the non-stitched 360-degree video data are projected on the 2D image as a whole. In this case, the projection_scheme field may have a value of 6, as previously described.

In this case, the 360-degree video reception apparatus may extract and stitch the 360-degree video data, decoded and projected on the 2D image. In this case, the 360-degree video reception apparatus may further include a stitcher. The stitcher of the 360-degree video reception apparatus may perform stitching using the 'metadata related to reception-side stitching'. The re-projection unit or the renderer of the 360-degree video reception apparatus may re-project or render the 360-degree video data, stitched at the reception side, in the 3D space.

For example, in the case in which the 360-degree video data is generated live, is immediately transmitted to the reception side, and is enjoyed by a user, performing stitching at the reception side may be more efficient for rapid data transfer. In addition, in the case in which the 360-degree video data is transmitted both to a device that supports VR and to a device that does not support VR, performing stitching at the reception side may be more efficient. The reason for this is that the device that supports VR stitches the 360-degree video data and provides the 360-degree video data as VR and the device that does not support VR provide the 360-degree video data on the 2D image as a general screen, rather than VR.

The metadata related to reception-side stitching may include a stitched_flag field and/or a camera_info_flag field. Here, the metadata related to reception-side stitching may not be used at the reception side alone in some embodiments, and thus may be simply called metadata related to stitching.

The stitched_flag field may indicate whether the 360-degree video data, acquired (captured) using at least one camera sensor, has undergone stitching. When the value of the projection_scheme field is 6, this field may have a false value.

The camera_info_flag field may indicate whether detailed information of the camera used to capture the 360-degree video data is provided as metadata.

In the case in which the stitched_flag field indicates that stitching has been performed, the metadata related to reception-side stitching may include a stitching_type field and/or a num_camera field.

The stitching_type field may indicate the stitching type applied to the 360-degree video data. For example, the stitching type may be information related to stitching software. Even when the same projection scheme is used, the 360-degree video may be differently projected on the 2D image depending on the stitching type. In the case in which stitching type information is provided, therefore, the 360-degree video reception apparatus may perform re-projection using the information.

The num_camera field may indicate the number of cameras used to capture the 360-degree video data.

In the case in which the camera_info_flag field indicates that detailed information of the camera is provided as metadata, the metadata related to reception-side stitching may include the num_camera field. The meaning of the num_camera field is identical to the above description. In the case in which the num_camera field is included depending on the value of the stitched_flag field, duplicate num_camera fields may be included. In this case, the 360-degree-video-related metadata may omit one of the fields.

Information about each of the cameras present in the numbers indicated by the num_camera field may be included. The information about each camera may include an intrinsic_camera_params field, an extrinsic_camera_params field, a camera_center_pitch field, a camera_center_yaw field, and/or a camera_center_roll field.

The intrinsic_camera_params field and the extrinsic_camera_params field may respectively include intrinsic parameters and extrinsic parameters of each camera. The two fields may respectively have a structure defined as IntrinsicCameraParametersBox class and a structure defined as ExtrinsicCameraParametersBox class, a detailed description of which will follow.

The camera_center_pitch field, the camera_center_yaw field, and the camera_center_roll field may respectively indicate the pitch ($\theta$), yaw (or $\varphi$), and roll values in the 3D space that match the right center point of the image acquired by each camera.

In some embodiments, the metadata related to reception-side stitching may further include additional information. In some embodiments, the fields of the metadata related to reception-side stitching may be classified as other metadata.

In some embodiments, the 360-degree-video-related metadata may further include an is_not_centered field and a center_theta field and/or a center_phi field, which may exist depending on the value of the is_not_centered field. In some embodiments, the center_theta field and the center_phi field may be replaced by a center_pitch field, a center_yaw field, and/or a center_roll field. These fields may provide metadata related to the center pixel of the 2D image, on which the 360-degree video data are projected, and to the midpoint of the 3D space. In some embodiments, these fields may be classified as separate metadata within the 360-degree-video-related metadata, or may be classified as being included in other metadata, such as the metadata related to stitching.

The is_not_centered field may indicate whether the center pixel of the 2D image, on which the 360-degree video data are projected, is identical to the midpoint of the 3D space (a spherical surface). In other words, this field may indicate whether, when the 360-degree video data are projected or re-projected in the 3D space, the midpoint of the 3D space has been changed (rotated) from the origin of a world coordinate system or the origin of a capture space coordinate system. The capture space may be the space in which the 360-degree video is captured. The capture space coordinate system may be a spherical coordinate system that indicates the capture space.

The 3D space, in which the 360-degree video data are projected/re-projected, may be rotated from the origin of the capture space coordinate system or the origin of the world coordinate system. In this case, the midpoint of the 3D space may be different from the origin of the capture space coordinate system or the origin of the world coordinate system. The is_not_centered field may indicate whether such change (rotation) has occurred. In some embodiments, the midpoint of the 3D space may be the same as a point on which the center pixel of the 2D image appears in the 3D space.

Here, the midpoint of the 3D space may be called orientation of the 3D space. In the case in which the 3D space is expressed using a spherical system, the midpoint of the 3D space may be the point at which θ=0 and φ=0. In the case in which the 3D space is expressed using principal aircraft axes (a yaw/pitch/roll coordinate system), the midpoint of the 3D space may be the point at which pitch=0, yaw=0, and roll=0. When the value of this field is 0, the midpoint of the 3D space may match/may be mapped with the origin of the capture space coordinate system or the origin of the world coordinate system. Here, the 3D space may be called a projection structure or a VR geometry.

In some embodiments, the is_not_centered field may have different meanings depending on the value of the projection_scheme field. In the case in which the projection_scheme field has a value of 0, 3, or 5, this field may indicate whether the center pixel of the 2D image is identical to the point at which θ=0 and φ=0 on the spherical surface. In the case in which the projection_scheme field has a value of 1, this field may indicate whether the center pixel of the front in the 2D image is identical to the point at which θ=0 and φ=0 on the spherical surface. In the case in which the projection_scheme field has a value of 2, this field may indicate whether the center pixel of the side in the 2D image is identical to the point at which θ=0 and φ=0 on the spherical surface. In the case in which the projection_scheme field has a value of 4, this field may indicate whether the center pixel of the front in the 2D image is identical to the point at which θ=0 and φ=0 on the spherical surface.

In the case in which the is_not_centered field indicates that the midpoint of the 3D space (the spherical surface) has been rotated, the 360-degree-video-related metadata may further include a center_theta field and/or a center_phi field. In some embodiments, the center_theta field and the center_phi field may be replaced by a center_pitch field, a center_yaw field, and/or a center_roll field.

These fields may have different meanings depending on the value of the projection_scheme field. In the case in which the projection_scheme field has a value of 0, 3, or 5, each of these fields may indicate the point in the 3D space (the spherical surface) mapped with the center pixel of the 2D image using (θ, φ) values or (yaw, pitch, roll) values. In the case in which the projection_scheme field has a value of 1, each of these fields may indicate the point in the 3D space (the spherical surface) mapped with the center pixel of the front of the cube in the 2D image using (θ, φ) values or (yaw, pitch, roll) values. In the case in which the projection_scheme field has a value of 2, each of these fields may indicate the point in the 3D space (the spherical surface) mapped with the center pixel of the side of the cylinder in the 2D image using (θ, φ) values or (yaw, pitch, roll) values. In the case in which the projection_scheme field has a value of 4, each of these fields may indicate the point in the 3D space (the spherical surface) mapped with the center pixel of the front of the pyramid in the 2D image using (θ, φ) values or (yaw, pitch, roll) values.

In some embodiments, the center_pitch field, the center_yaw field, and/or the center_roll field may indicate the extent of rotation of the midpoint of the 3D space from the origin of the capture space coordinate system or the origin of the world coordinate system. In this case, each field may indicate the extent of rotation using yaw, pitch, and roll values.

The HDR-related metadata may provide HDR information related to the 360-degree video. The HDR-related metadata may include an hdr_flag field and/or an hdr_config field. In some embodiments, the HDR-related metadata may further include additional information.

The hdr_flag field may indicate whether the 360-degree video supports HDR. At the same time, this field may indicate whether the 360-degree-video-related metadata includes a detailed parameter (an hdr_config field) related to HDR.

The hdr_config field may indicate an HDR parameter related to the 360-degree video. This field may have a structure defined as HDRConfigurationBox class, a description of which will follow. HDR effects may be effectively realized on the display using information of this field.

The WCG-related metadata may provide WCG information related to the 360-degree video. The WCG-related metadata may include a WCG_flag field and/or a WCG_config field. In some embodiments, the WCG-related metadata may further include additional information.

The WCG_flag field may indicate whether the 360-degree video supports WCG. At the same time, this field may indicate whether the metadata includes a detailed parameter (a WCG_config field) related to WCG.

The WCG_config field may indicate a WCG parameter related to the 360-degree video. This field may have a structure defined as CGConfigurationBox class, a description of which will follow.

The region-related metadata may provide metadata related to the regions of the 360-degree video data. The region-related metadata may include a region_info_flag field and/or a region field. In some embodiments, the region-related metadata may further include additional information.

The region_info_flag field may indicate whether the 2D image, on which the 360-degree video data are projected, is divided into one or more regions. At the same time, this field may indicate whether the 360-degree-video-related metadata includes detailed information about each region.

The region field may include detailed information about each region. This field may have a structure defined as RegionGroup or RegionGroupBox class. The RegionGroupBox class may describe general information about each region irrespective of the projection scheme that is used, and the RegionGroup class may describe detailed information about each region based on the projection scheme while having the projection_scheme field as a variable, a description of which will follow.

Figure 10:
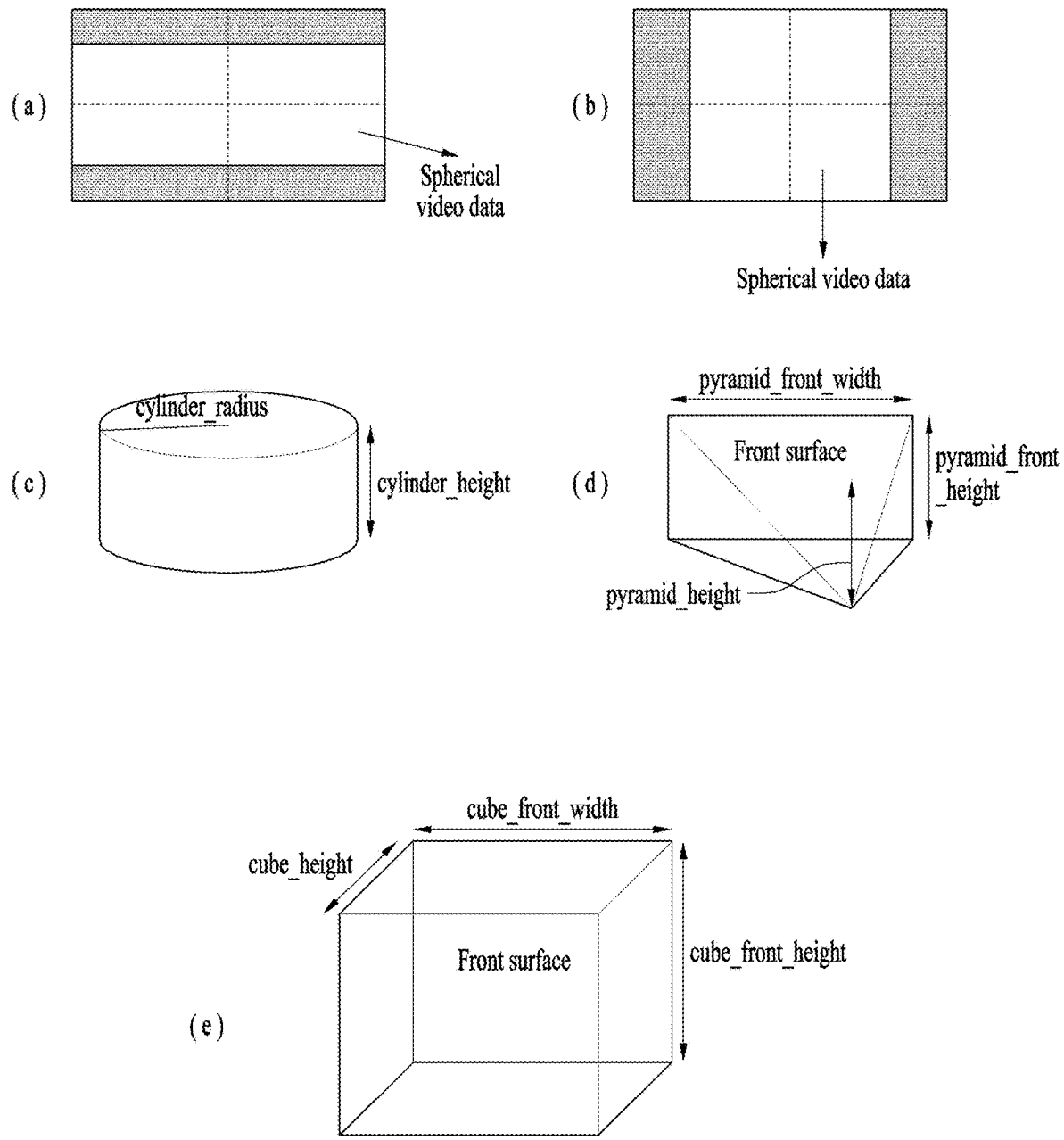
FIG. 10 is a view showing a projection area on a 2D image and 3D models according to the support range of 360-degree video according to an embodiment of the present invention.

FIG. 10 is a view showing a projection area on a 2D image and 3D models according to the support range of a 360-degree video according to an embodiment of the present invention.

Referring to FIGS. 10(a) and (b), the support range of the 360-degree video in the 3D space may be less than 180 degrees in the pitch direction and less than 360 degrees in the yaw direction, as previously described. In this case, the metadata related to the support range of the 360-degree video may signal the support range.

In the case in which the support range is less than 180 degrees or 360 degrees, the 360-degree video data may be projected only on a portion of the 2D image. In this case, the metadata related to the support range of the 360-degree video may be used to inform the reception side that the 360-degree video data are projected only on a portion of the 2D image. The 360-degree video reception apparatus may process only the portion of the 2D image on which the 360-degree video data actually exist using the same.

For example, when the pitch range supported by the 360-degree video is between −45 degrees and 45 degrees, the 360-degree video may be projected on the 2D image through equirectangular projection, as shown in FIG. 10(a). Referring to FIG. 10(a), the 360-degree video data may exist only on a specific area of the 2D image. At this time, vertical length (height) information about the area of the 2D image on which the 360-degree video data exist may be further included in the metadata in the form of pixel values.

In addition, for example, when the yaw range supported by the 360-degree video is between −90 degrees and 90 degrees, the 360-degree video may be projected on the 2D image through equirectangular projection, as shown in FIG. 10(b). Referring to FIG. 10(b), the 360-degree video data may exist only on a specific area of the 2D image. At this time, horizontal length information about the area of the 2D image on which the 360-degree video data exist may be further included in the metadata in the form of pixel values.

As information related to the support range of the 360-degree video is transmitted to the reception side as the 360-degree-video-related metadata, transmission capacity and extensibility may be improved. Only pitch and yaw areas, rather than the entire 3D space (e.g. the spherical surface), may be captured depending on content. In this case, the 360-degree video data may exist only on a portion of the 2D image even when the 360-degree video data are projected on the 2D image. As the metadata indicating the portion of the 2D image on which the 360-degree video data are projected is transmitted, the reception side may process only the portion of the 2D image. In addition, as additional data are transmitted through the remaining portion of the 2D image, transmission capacity may be increased.

Referring to FIGS. 10(c), 10(d), and 10(e), the metadata related to the vr_geometry field may provide detailed information about each indicated 3D model (a sphere, a cube, a cylinder, or a pyramid), as previously described.

In the case in which the vr_geometry field indicates that the 3D model is a sphere, the metadata related to the vr_geometry field may include a sphere_radius field. The sphere_radius field may indicate the radius of the 3D model, i.e. the sphere.

In the case in which the vr_geometry field indicates that the 3D model is a cylinder, the metadata related to the vr_geometry field may include a cylinder_radius field and/or a cylinder_height field. As shown in FIG. 10(c), the two fields may indicate the radius of the top/bottom of the 3D model, i.e. the cylinder, and the height of the cylinder.

In the case in which the vr_geometry field indicates that the 3D model is a pyramid, the metadata related to the vr_geometry field may include a pyramid_front_width field, a pyramid_front_height field, and/or a pyramid_height field. As shown in FIG. 10(d), the three fields may indicate the horizontal length (width) of the front of the 3D model, i.e. the pyramid, the vertical length (height) of the front of the pyramid, and the height of the pyramid. The height of the pyramid may be the vertical height from the front to the apex of the pyramid.

In the case in which the vr_geometry field indicates that the 3D model is a cube, the metadata related to the vr_geometry field may include a cube_front_width field, a cube_front_height field, and/or a cube_height field. As shown in FIG. 10(e), the three fields may indicate the horizontal length (width) of the front of the 3D model, i.e. the cube, the vertical length (height) of the front of the cube, and the height of the cube.

FIG. 11 is a view showing projection schemes according to an embodiment of the present invention.

Referring to FIGS. 11(a), 11(b), and 11(c), the metadata related to the projection_scheme field may provide detailed information about projection schemes indicated by the projection_scheme field, as previously described.

In the case in which the projection_scheme field indicates that the projection scheme is an equirectangular projection scheme or a tile-based projection scheme, the metadata related to the projection_scheme field may include a sphere_radius field. The sphere_radius field may indicate the radius of a sphere applied at the time of projection.

The 360-degree video data acquired by the camera may appear as a spherical surface (see FIG. 11(a)). Each point on the spherical surface may be expressed using r (the radius of the sphere), θ (the rotational direction and the extent of rotation about the z-axis), and φ (the rotational direction and the extent of rotation of the x-y plane toward the z-axis) in a spherical coordinate system. The sphere_radius may indicate the value of r. In some embodiments, the spherical surface may coincide with a world coordinate system, or the principal point of a front camera may be assumed to be the (r, 0, 0) point of the spherical surface.

During projection, the 360-degree video data on the spherical surface may be mapped with the 2D image, which is expressed using XY coordinates. The left top of the 2D image is the origin (0, 0) of the XY coordinate system, from which the x-axis coordinate value may be increased in the rightward direction and the y-axis coordinate value may be increased in the downward direction. At this time, the 360-degree video data (r, θ, φ) on the spherical surface may be converted into the XY coordinate system as follows.

$$x=(\theta-\theta_0)*\cos(\varphi_0)*r$$

$$y=\varphi*r$$

Where $\theta_0$ is a central meridian of the projection, and $\varphi_0$ may be fixed to 0 in equirectangular projection. In the case in which the x and y ranges of the XY coordinate system are $-\pi r*\cos(\varphi_0) \le x \le \pi r*\cos(\varphi_0)$ and $-\pi/2*r \le y \le \pi/2*r$, the ranges of θ and φ may be $-\pi+\theta_0 \le \theta \le \pi+\theta_0$ and $-\pi/2 \le \varphi \le \pi/2$.

The value (x, y) converted into the XY coordinate system may be converted into (X, Y) pixels on the 2D image as follows.

$$X=K_x*x+X_O=K_x*(\theta-\theta_0)*\cos(\varphi_0)*r+X_O$$

$$Y=-K_y*y-Y_O=-K_y*\varphi*r-Y_O$$

Where $K_x$ and $K_y$ may be scaling factors for the X-axis and the Y-axis of the 2D image when projection is performed on the 2D image. $K_x$ may be (the width of the mapped image)/($2\pi r*\cos(\varphi_0)$), and $K_y$ may be (the height of the mapped image)/$\pi r$. $X_O$ may be an offset value indicating the extent of movement of the x coordinate value scaled according to the value of $K_x$ to the x-axis, and $Y_O$ may be an offset value indicating the extent of movement of the y coordinate value scaled according to the value of $K_y$ to the y-axis.

At the time of equirectangular projection, (r, $\theta_0$, 0) on the spherical surface, i.e. the point at which θ=$\theta_0$ and φ=0 may be mapped with the center pixel of the 2D image. In addition, the principal point of the front camera may be assumed to be the (r, 0, 0) point of the spherical surface. In addition, $\varphi_0$ may be fixed to 0. Additionally, in the case in which the left top pixel of the 2D image is located at (0, 0)

of the XY coordinate system, the offset values may be expressed as $X_0=K_x*\pi*r$ and $Y_0=-K_y*\pi/2*r$. Conversion into the XY coordinate system may be performed as follows using the same.

$$X=K_x*x+X_0=K_x*(\pi+\theta-\theta_0)*r$$

$$Y=-K_y*y-Y_0=K_y*(\pi/2-\varphi)*r$$

For example, in the case in which $\theta_0=0$, i.e. in the case in which the center pixel of the 2D image indicates data having $\theta=0$ on the spherical surface, the spherical surface may be mapped with an area having a horizontal length (width) $=2K_x\pi r$ and a vertical length (height)$=K_x\pi r$ on the 2D image on the basis of (0, 0). Data having $\varphi=\pi/2$ on the spherical surface may be mapped with the entirety of the upper side on the 2D image. In addition, data having (r, $\pi/2$, 0) on the spherical surface may be mapped with the point ($3\pi K_x r/2$, $\pi K_x r/2$) on the 2D image.

The reception side may re-project the 360 video data on the 2D image on the spherical surface, which may be expressed by the following conversion equation.

$$\theta=\theta_0+X/K_x*r-\pi$$

$$\varphi=\pi/2-Y/K_y*r$$

For example, the pixel having an XY coordinate value of ($K_x\pi r$, 0) on the 2D image may be re-projected on the point at which $\theta=\theta_0$ and $\varphi=\pi/2$ on the spherical surface.

In the case in which the equirectangular projection scheme is used, the center_theta field may have the same value as the value of $\theta_0$.

In the case in which the tile-based projection scheme is used, the projection-processing unit may divide the 360-degree video data on the spherical surface into one or more areas, and may project the divided areas of the 360-degree video data on the 2D image, as shown in FIG. 11(b).

In the case in which the projection_scheme field indicates that the projection scheme is a cubic projection scheme, the metadata related to the projection_scheme field may include a cube_front_width field, a cube_front_height field, and/or a cube_height field. The three fields may indicate the horizontal length (width) of the front of the cube applied at the time of projection, the vertical length (height) of the front of the cube, and the height of the cube.

In the case in which the projection_scheme field indicates that the projection scheme is a cubic projection scheme, the metadata related to the projection_scheme field may include a cube_front_width field, a cube_front_height field, and/or a cube_height field. The three fields may indicate the horizontal length (width) of the front of the cube applied at the time of projection, the vertical length (height) of the front of the cube, and the height of the cube. The cubic projection scheme was described previously. The front may be a region including 360-degree video data acquired by the front camera.

In the case in which the projection_scheme field indicates that the projection scheme is a cylindrical projection scheme, the metadata related to the projection_scheme field may include a cylinder_radius field and/or a cylinder_height field. The two fields may indicate the radius of the top/bottom of the cylinder applied at the time of projection and the height of the cylinder. The cylindrical projection scheme was described previously.

In the case in which the projection_scheme field indicates that the projection scheme is a pyramidal projection scheme, the metadata related to the projection_scheme field may include a pyramid_front_width field, a pyramid_front_height field, and/or a pyramid_height field. The three fields may indicate the horizontal length (width) of the front of the pyramid applied at the time of projection, the vertical length (height) of the front of the pyramid, and the height of the pyramid. The height of the pyramid may be the vertical height from the front to the apex of the pyramid. The pyramidal projection scheme was described previously. The front may be a region including 360-degree video data acquired by the front camera.

For the pyramidal projection scheme, the metadata related to the projection_scheme field may further include a pyramid_front_rotation field. The pyramid_front_rotation field may indicate the extent and direction of rotation of the front of the pyramid. FIG. 11(c) shows the case in which the front is not rotated (t11010) and the case in which the front is rotated 45 degrees (t11020). In the case in which the front is not rotated, the 2D image, on which the video has been projected, is finally obtained, as shown (t11030).

Figure 12:
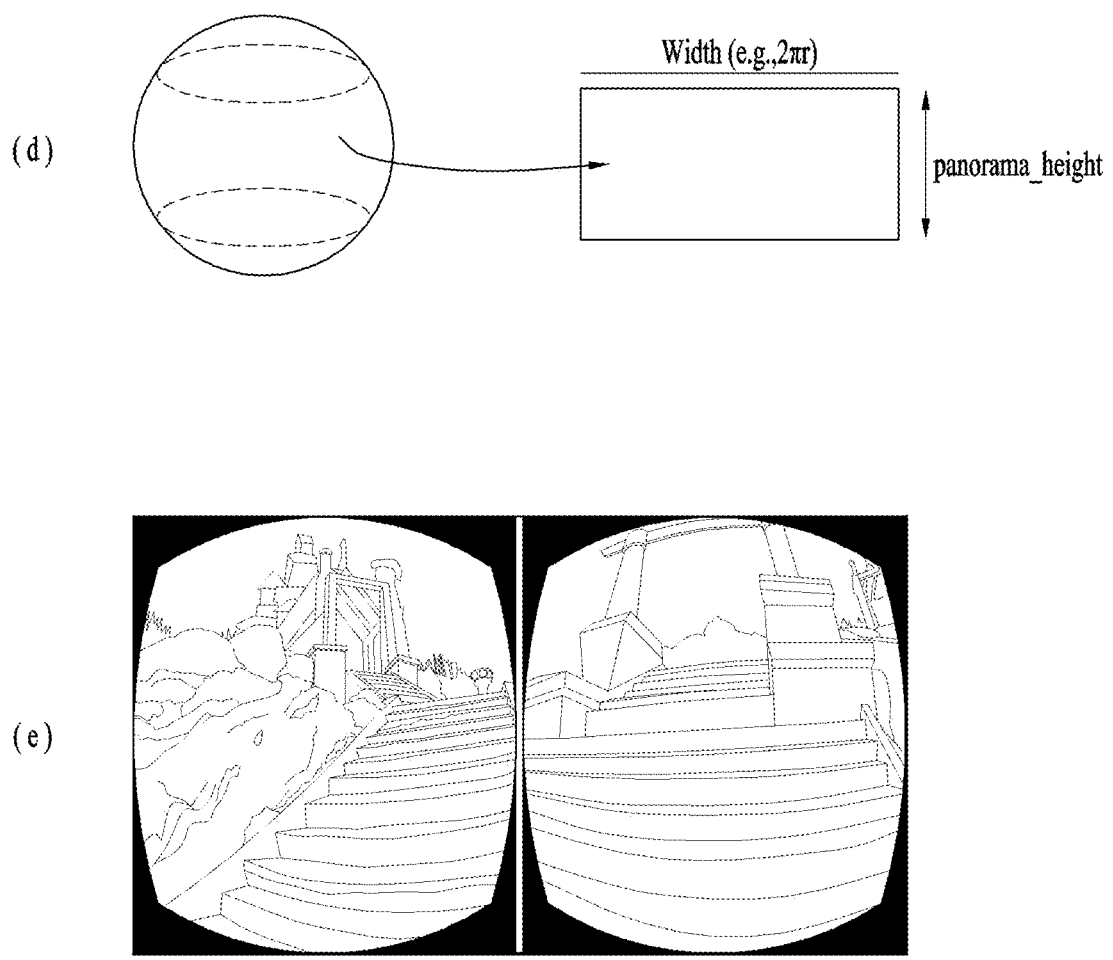
FIG. 12 is a view showing projection schemes according to another embodiment of the present invention.

FIG. 12 is a view showing projection schemes according to another embodiment of the present invention.

In the case in which the projection_scheme field indicates that the projection scheme is a panoramic projection scheme, the metadata related to the projection_scheme field may include a panorama_height field. In the case in which the panoramic projection scheme is used, the projection-processing unit may project only the side of the 360-degree video data on the spherical surface on the 2D image, as shown in FIG. 12(d). This may be the same as the case in which the cylindrical projection scheme has neither top nor bottom. The panorama_height field may indicate the height of the panorama applied at the time of projection.

In the case in which the projection_scheme field indicates that projection is performed without stitching, the metadata related to the projection_scheme field may include no additional fields. When projection is performed without stitching, the projection-processing unit may project the 360-degree video data on the 2D image as a whole, as shown in FIG. 12(e). In this case, no stitching is performed, and the respective images acquired by the camera may be projected on the 2D image as a whole.

In the embodiment shown, the two images are projected on the 2D image without stitching. The respective images may be fish-eye images acquired by sensors of a spherical camera. As previously described, stitching may be performed at the reception side.

FIG. 13 is a view showing an IntrinsicCameraParametersBox class and an ExtrinsicCameraParametersBox class according to an embodiment of the present invention.

The above-described intrinsic_camera_params field may include intrinsic parameters of the camera. This field may be defined according to the IntrinsicCameraParametersBox class, as shown (t14010).

The IntrinsicCameraParametersBox class may include camera parameters that link the pixel coordinates of an image point and the coordinates of the point in a camera reference frame.

The IntrinsicCameraParametersBox class may include a ref_view_id field, a prec_focal_length field, a prec_principal_point field, a prec_skew_factor field, an exponent_focal_length_x field, a mantissa_focal_length_x field, an exponent_focal_length_y field, a mantissa_focal_length_y field, an exponent_principal_point_x field, a mantissa_principal_point_x field, an exponent_principal_point_y field, a mantissa_principal_point_y field, an exponent_skew_factor field, and/or a mantissa_skew_factor field.

The ref_view_id field may indicate view_id identifying a view of the camera. The prec_focal_length field may specify an exponent of the maximum truncation error allowed for focal_length_x and focal_length_y. This may be expressed as $2^{-prec\_focal\_length}$. The prec_principal_point field may specify an exponent of the maximum truncation error allowed for principal_point_x and principal_point_y. This may be expressed as $2^{-prec\_principal\_point}$.

The prec_skew_factor field may specify an exponent of the maximum truncation error allowed for a skew factor. This may be expressed as $2^{prec\_skew\_factor}$.

The exponent_focal_length_x field may indicate an exponent part of the focal length in the horizontal direction. The mantissa_focal_length_x field may indicate a mantissa part of the focal length of an i-th camera in the horizontal direction. The exponent_focal_length_y field may indicate an exponent part of the focal length in the vertical direction. The mantissa_focal_length_y field may indicate a mantissa part of the focal length in the vertical direction.

The exponent_principal_point_x field may indicate an exponent part of the principal point in the horizontal direction. The mantissa_principal_point_x field may indicate a mantissa part of the principal point in the horizontal direction. The exponent_principal_point_y field may indicate an exponent part of the principal point in the vertical direction. The mantissa_principal_point_y field may indicate a mantissa part of the principal point in the vertical direction.

The exponent_skew_factor field may indicate an exponent part of the skew factor. The mantissa_skew_factor field may indicate a mantissa part of the skew factor.

The above-described extrinsic_camera_params field may include extrinsic parameters of the camera. This field may be defined according to the ExtrinsicCameraParametersBox class, as shown (t14020).

The ExtrinsicCameraParametersBox class may include camera parameters that define the position and orientation of a camera reference frame based on the world coordinate system (known world reference frame). That is, this may include parameters indicating the details of rotation and translation of each camera based on the world coordinate system.

The ExtrinsicCameraParametersBox class may include a ref_view_id field, a prec_rotation_param field, a prec_translation_param field, an exponent_r[j][k] field, a mantissa_r[j][k] field, an exponent_t[j] field, and/or a mantissa_t[j] field.

The ref_view_id field may indicate view_id identifying a view related to extrinsic camera parameters.

The prec_rotation_param field may specify an exponent part of the maximum truncation error allowed for r[j][k]. This may be expressed as $2^{-prec\_rotation\_param}$. The prec_translation_param field may specify an exponent part of the maximum truncation error allowed for t[j]. This may be expressed as $2^{-prec\_translation\_param}$.

The exponent_r[j][k] field may specify an exponent part of a (j, k) component of a rotation matrix. The mantissa_r[j][k] field may specify a mantissa part of the (j, k) component of the rotation matrix. The exponent_t[j] field may specify an exponent part of a j-th component of a translation vector. This may have a value of between 0 and 62. The mantissa_t[j] field may specify a mantissa part of the j-th component of the translation vector.

FIG. 14 is a view showing an HDRConfigurationBox class according to an embodiment of the present invention.

The HDRConfigurationBox class may provide HDR information related to a 360-degree video.

The HDRConfigurationBox class may include an hdr_param_set field, an hdr_type_transition_flag field, an hdr_sdr_transition_flag field, an sdr_hdr_transition_flag field, an sdr_compatibility_flag field, and/or an hdr_config_flag field. The hdr_config_flag field may indicate whether detailed parameter information related to HDR is included. Depending on the value of the hdr_config_flag field, the HDRConfigurationBox class may include an OETF_type field, a max_mastering_display_luminance field, a min_mastering_display_luminance field, an average_frame_luminance_level field, and/or a max_frame_pixel_luminance field.

The hdr_param_set field may identify the combination of HDR-related parameters that the HDR-related information follows. For example, in the case in which this field is 1, the applied HDR-related parameters may be as follows: EOTF may be SMPTE ST2084, Bit depth may be 12 bit/pixel, peak luminance may be 10000 nit, codec may be a dual HEVC codec (HEVC+HEVC), and metadata may be SMPTE ST 2086 and SMPTE ST 2094. In the case in which this field is 2, the applied HDR-related parameters may be as follows: EOTF may be SMPTE ST2084, Bit depth may be 10 bit/pixel, peak luminance may be 4000 nit, codec may be a single HEVC codec, and metadata may be SMPTE ST 2086 and SMPTE ST 2094. In the case in which this field is 3, the applied HDR-related parameters may be as follows: EOTF may be BBC EOTF, Bit depth may be 10 bit/pixel, peak luminance may be 1000 nit, and codec may be a single HEVC codec.

The hdr_type_transition_flag field may be a flag indicating whether HDR information for the video data is changed and thus another type of HDR information is applied. The hdr_sdr_transition_flag field may be a flag indicating whether the video data is changed from HDR to SDR. The sdr_hdr_transition_flag field may be a flag indicating whether the video data is changed from SDR to HDR. The sdr_compatibility_flag field may be a flag indicating whether the video data is compatible with an SDR decoder or an SDR display.

The OETF_type field may indicate the type of a source OETF (opto-electronic transfer function) of the video data. When the value of this field is 1, 2, or 3, the type may be ITU-R BT.1886, ITU-R BT.709, or ITU-R BT.2020. Additional values may be reserved for future use.

The max_mastering_display_luminance field may indicate the peak luminance value of a mastering display of the video data. This value may be an integer between 100 and 1000.

The min_mastering_display_luminance field may indicate the minimum luminance value of the mastering display of the video data. This value may be a fractional number between 0 and 0.1.

For one video sample, the average_frame_luminance_level field may indicate the average value of a luminance level. In addition, for a sample group or a video track (stream), this field may indicate the maximum number of the average values of luminance levels of samples belonging thereto.

For one video sample, the max_frame_pixel_luminance field may indicate the maximum value of pixel luminance values. In addition, for a sample group or a video track (stream), this field may indicate the largest one of the maximum pixel luminance values of samples belonging thereto.

The "360-degree video data", which the above fields describe, may be a video track, a video sample group, or video samples in a media file. Depending on the objects that the fields describe, the description range of each field may be changed. For example, the hdr_type_transition_flag field may indicate whether the video track is converted from HDR to SDR, or may indicate whether one video sample is converted from HDR to SDR.

FIG. 15 is a view showing a CGConfigurationBox class according to an embodiment of the present invention.

The CGConfigurationBox class may provide WCG information related to a 360-degree video. The CGConfigurationBox class may be defined in order to store and signal color gamut information related to a video track (stream) or a sample when the 360-degree video data are generated (t15010).

The CGConfigurationBox class may be used to express content color gamut or container color gamut of a 360-degree video. In order to signal both the content color gamut and the container color gamut of the 360-degree video data, the WCG-related metadata may include a container_wcg_config field and a content_wcg_config field having the CGConfigurationBox class.

The CGConfigurationBox class may include a color_gamut_type field, a color_space_transition_flag field, a wcg_scg_transition_flag field, an scg_wcg_transition_flag field, an scg_compatibility_flag field, and/or a color_primary_flag field. In addition, depending on the value of the color_primary_flag field, this class may further include a color_primaryRx field, a color_primaryRy field, a color_primaryGx field, a color_primaryGy field, a color_primaryBx field, a color_primaryBy field, a color_whitePx field, and/or a color_whitePy field.

The color_gamut_type field may indicate the type of color gamut for the 360-degree video data. When a content color gamut is signaled, this field may indicate the chromaticity coordinates of source primaries. When a container color gamut is signaled, this field may indicate the chromaticity coordinates of color primaries that were used (that can be used) at the time of encoding/decoding. Depending on the value of this field, the values of color primaries of video usability information (VUI) may be indicated. In some embodiments, the values of this field may be indicated as shown (t15020).

The color_space_transition_flag field may be a flag indicating whether the chromaticity coordinates of source primaries for the video data are changed to other chromaticity coordinates when a content color gamut is signaled. When a container color gamut is signaled, this field may be a flag indicating whether chromaticity coordinates of color primaries that were used (that can be used) at the time of encoding/decoding are changed to other chromaticity coordinates.

The wcg_scg_transition_flag field may be a flag indicating whether the video data are converted from a Wide Color Gamut (WCG) to a Standard Color Gamut (SCG) when a content color gamut is signaled. When a container color gamut is signaled, this field may be a flag indicating whether the container color gamut is converted from WCG to SCG. For example, in the case in which conversion from WCG of BT.2020 to SCG of BT.709 is performed, the value of this field may be set to 1.

The scg_wcg_transition_flag field may be a flag indicating whether the video data are converted from an SCG to a WCG when a content color gamut is signaled. When a container color gamut is signaled, this field may be a flag indicating whether the container color gamut is converted from SCG to WCG. For example, in the case in which conversion from SCG of BT.709 to WCG of BT.2020 is performed, the value of this field may be set to 1.

The scg_compatibility_flag field may be a flag indicating whether the WCG video is compatible with a SCG-based decoder or display when a content color gamut is signaled. When a container color gamut is signaled, this field may be a flag indicating whether the container color gamut is compatible with the SCG-based decoder or display. That is, in the case in which an existing SCG-based decoder or display is used, whether the WCG video can be output while having no quality problem without separate mapping information or upgrade may be determined by this field.

The color_primary_flag field may be a flag indicating whether detailed information about chromaticity coordinates of color primaries for the video exists when a content color gamut is signaled. In the case in which the color_gamut_type field indicates "unspecified", detailed information about chromaticity coordinates of color primaries for the video may be provided. When a container color gamut is signaled, this field may indicate whether detailed information related to chromaticity coordinates of color primaries that were used (that can be used) at the time of encoding/decoding exists. In the case in which the color_primary_flag field is set to 1, as previously described, i.e. in the case in which it is indicated that detailed information exists, the following fields may be added.

The color_primaryRx field and the color_primaryRy field may indicate the x coordinate value and the y coordinate value of R-color of the video source when a content color gamut is signaled. This may be a fractional number between 0 and 1. When a container color gamut is signaled, these fields may indicate the x coordinate value and the y coordinate value of the R-color of color primaries that were used (that can be used) at the time of encoding/decoding.

The color_primaryGx field and the color_primaryGy field may indicate the x coordinate value and the y coordinate value of G-color of the video source when a content color gamut is signaled. This may be a fractional number between 0 and 1. When a container color gamut is signaled, these fields may indicate the x coordinate value and the y coordinate value of the G-color of color primaries that were used (that can be used) at the time of encoding/decoding.

The color_primaryBx field and the color_primaryBy field may indicate the x coordinate value and the y coordinate value of B-color of the video source when a content color gamut is signaled. This may be a fractional number between 0 and 1. When a container color gamut is signaled, these fields may indicate the x coordinate value and the y coordinate value of the B-color of color primaries that were used (that can be used) at the time of encoding/decoding.

The color_whitePx field and the color_whitePy field may indicate the x coordinate value and the y coordinate value of a white point of the video source when a content color gamut is signaled. This may be a fractional number between 0 and 1. When a container color gamut is signaled, these fields may indicate the x coordinate value and the y coordinate value of a white point of color primaries that were used (that can be used) at the time of encoding/decoding.

FIG. 16 is a view showing RegionGroupBox class according to an embodiment of the present invention.

As previously described, the RegionGroupBox class may describe general information about each region irrespective of the projection scheme that is used. The RegionGroup class may describe information about regions of the projected frame or the packed frame described above.

The RegionGroupBox class may include a group_id field, a coding_dependency field, and/or a num_regions field. Depending on the value of the num_regions field, the RegionGroupBox class may further include a region_id field, a horizontal_offset field, a vertical_offset field, a region_width field, and/or a region_height field for each region.

The group_id field may indicate the identifier of the group to which each region belongs. The coding_dependency field may indicate the form of coding dependency between regions. This field may indicate that coding dependency does not exist (the case in which coding can be independently performed for each region) or that coding dependency exists between regions.

The num_regions field may indicate the number of regions included in the video track or a sample group or a sample in the track. For example, in the case in which all region information is included in each video frame of one video track, this field may indicate the number of regions constituting one video frame.

The region_id field may indicate an identifier for each region. The horizontal_offset field and the vertical_offset field may indicate the x and y coordinates of the left top pixel of the region on the 2D image. Alternatively, these fields may indicate the horizontal and vertical offset values of the left top pixel. The region_width field and the region_height field may indicate the horizontal length pixel and the vertical length pixel of the region.

In an embodiment of the RegionGroupBox class (t17010), the RegionGroupBox class may further include a surface_center_pitch field, a surface_pitch_angle field, a surface_center_yaw field, a surface_yaw_angle field, a surface_center_roll field, and/or a surface_roll_angle field.

The surface_center_pitch field, the surface_center_yaw field, and the surface_center_roll field may respectively indicate the pitch, yaw, and roll values of the very center pixel when the region is located in 3D space.

The surface_pitch_angle field, the surface_yaw_angle field, and the surface_roll_angle field may respectively indicate the difference between the minimum value and the maximum value of pitch, the difference between the minimum value and the maximum value of yaw, and the difference between the minimum value and the maximum value of roll when the region is located in the 3D space.

In another embodiment of the RegionGroupBox class (t17020), the RegionGroupBox class may further include a min_surface_pitch field, a max_surface_pitch field, a min_surface_yaw field, a max_surface_yaw field, a min_surface_roll field, and/or a max_surface_roll field.

The min_surface_pitch field and the max_surface_pitch field may respectively indicate the minimum value and the maximum value of pitch when the region is located in the 3D space. The min_surface_yaw field and the max_surface_yaw field may respectively indicate the minimum value and the maximum value of yaw when the region is located in the 3D space. The min_surface_roll field and the max_surface_roll field may respectively indicate the minimum value and the maximum value of roll when the region is located in the 3D space.

FIG. 17 is a view showing a RegionGroup class according to an embodiment of the present invention.

As previously described, the RegionGroup class may describe detailed information about each region based on the projection scheme while having the projection_scheme field as a variable.

In the same manner as the above-described RegionGroupBox class, the RegionGroup class may include a group_id field, a coding_dependency field, and/or a num_regions field. Depending on the value of the num_regions field, the RegionGroup class may further include a region_id field, a horizontal_offset field, a vertical_offset field, a region_width field, and/or a region_height field for each region. The definition of each field is identical to the above description.

The RegionGroup class may include a sub_region_flag field, a region_rotation_flag field, a region_rotation_axis field, a region_rotation field, and/or region information based on each projection scheme.

The sub_region_flag field may indicate whether the region is divided into sub-regions. The region_rotation_flag field may indicate whether the region has been rotated after the 360-degree video data were projected on the 2D image.

The region_rotation_axis field may indicate the axis of rotation when the 360-degree video data have been rotated. When the value of this field is 0x0 and 0x1, this field may indicate that rotation has been performed about the vertical axis and the horizontal axis of the image. The region_rotation field may indicate the rotational direction and the extent of rotation when the 360-degree video data have been rotated.

The RegionGroup class may describe information about each region differently according to the projection scheme.

In the case in which the projection_scheme field indicates that the projection scheme is an equirectangular projection scheme or a tile-based projection scheme, the RegionGroup class may include a min_region_pitch field, a max_region_pitch field, a min_region_yaw field, a max_region_yaw field, a min_region_roll field, and/or a max_region_roll field.

The min_region_pitch field and the max_region_pitch field may respectively indicate the minimum value and the maximum value of pitch of the area in the 3D space in which the region is re-projected. When the captured 360-degree video data appear on a spherical surface, these fields may indicate the minimum value and the maximum value of φ on the spherical surface.

The min_region_yaw field and the max_region_yaw field may respectively indicate the minimum value and the maximum value of yaw of the area in the 3D space in which the region is re-projected. When the captured 360-degree video data appear on a spherical surface, these fields may indicate the minimum value and the maximum value of θ on the spherical surface.

The min_region_roll field and the max_region_roll field may respectively indicate the minimum value and the maximum value of roll of the area in the 3D space in which the region is re-projected.

In the case in which the projection_scheme field indicates that the projection scheme is a cubic projection scheme, the RegionGroup class may include a cube_face field. In the case in which the sub_region_flag field indicates that the region is divided into sub-regions, the RegionGroup class may include area information of sub-regions in the face indicated by the cube_face field, i.e. a sub_region_horizental_offset field, a sub_region_vertical_offset field, a sub_region_width field, and/or a sub_region_height field.

The cube_face field may indicate to which face of the cube, applied at the time of projection, the region corresponds. For example, when the value of this field is 0x00, 0x01, 0x02, 0x03, 0x04, and 0x05, the region may correspond to the front, left, right, back, top, and bottom of the cube, respectively.

The sub_region_horizontal_offset field and the sub_region_vertical_offset field may respectively indicate the horizontal and vertical offset values of the left top pixel of the sub-region. That is, the two fields may indicate relative x and y coordinate values of the left top pixel of the sub-region based on the left top pixel of the region.

The sub_region_width field and the sub_region_height field may respectively indicate the horizontal length (width) and the vertical length (height) of the sub-region as pixel values.

When the sub-region is re-projected in the 3D space, the minimum/maximum horizontal length (width) of the area that the sub-region occupies in the 3D space may be analogized based on the values of the horizontal_offset field, the sub_region_horizental_offset field, and the sub_region_width field. In some embodiments, a min_sub_region_width field and a max_sub_region_width field may be further included in order to explicitly signal the minimum/maximum horizontal length.

In addition, when the sub-region is re-projected in the 3D space, the minimum/maximum vertical length (height) of the area that the sub-region occupies in the 3D space may be analogized based on the values of the vertical_offset field, the sub_region_vertical_offset field, and the sub_region_height field. In some embodiments, a min_sub_region_height field and a max_sub_region_height field may be further included in order to explicitly signal the minimum/maximum vertical length.

In the case in which the projection_scheme field indicates that the projection scheme is a cylindrical projection scheme, the RegionGroup class may include a cylinder_face field. In the case in which the sub_region_flag field indicates that the region is divided into sub-regions, the RegionGroup class may include a sub_region_horizental_offset field, a sub_region_vertical_offset field, a sub_region_width field, a sub_region_height field, a min_sub_region_yaw field, and/or a max_sub_region_yaw field.

The cylinder_face field may indicate to which face of the cylinder, applied at the time of projection, the region corresponds. For example, when the value of this field is 0x00, 0x01, and 0x02, the region may correspond to the side, top, and bottom of the cylinder, respectively.

The sub_region_horizental_offset field, the sub_region_vertical_offset field, the sub_region_width field, and the sub_region_height field were described previously.

The min_sub_region_yaw field and the max_sub_region_yaw field may respectively indicate the minimum value and the maximum value of yaw of the area in the 3D space in which the region is re-projected. When the captured 360-degree video data appear on a spherical surface, these fields may indicate the minimum value and the maximum value of 0 on the spherical surface. Since the cylindrical projection scheme is applied, it is sufficient to signal only information about yaw.

In the case in which the projection_scheme field indicates that the projection scheme is a pyramidal projection scheme, the RegionGroup class may include a pyramid_face field. In the case in which the sub_region_flag field indicates that the region is divided into sub-regions, the RegionGroup class may include a sub_region_horizental_offset field, a sub_region_vertical_offset field, a sub_region_width field, a sub_region_height field, a min_sub_region_yaw field, and/or a max_sub_region_yaw field. The sub_region_horizental_offset field, the sub_region_vertical_offset field, the sub_region_width field, and the sub_region_height field were described previously.

The pyramid_face field may indicate to which face of the pyramid, applied at the time of projection, the region corresponds. For example, when the value of this field is 0x00, 0x01, 0x02, 0x03, and 0x04, the region may correspond to the front, left top, left bottom, right top, and right bottom of the pyramid, respectively.

In the case in which the projection_scheme field indicates that the projection scheme is a panoramic projection scheme, the RegionGroup class may include a min_region_yaw field, a max_region_yaw field, a min_region_height field, and/or a max_region_height field. The min_region_yaw field and the max_region_yaw field were described previously.

The min_region_height field and the max_region_height field may respectively indicate the minimum value and the maximum value of the vertical length (height) of the area in the 3D space in which the region is re-projected. Because the panoramic projection scheme is applied, it is sufficient to signal only information about yaw and the vertical length.

In the case in which the projection_scheme field indicates that projection is performed without stitching, the RegionGroup class may include a ref_view_id field. The ref_view_id field may indicate a ref_view_id field of the IntrinsicCameraParametersBox/ExtrinsicCameraParametersBox class having intrinsic/extrinsic camera parameters of the region in order to associate the region with intrinsic/extrinsic camera parameters related to the region.

Figure 18:
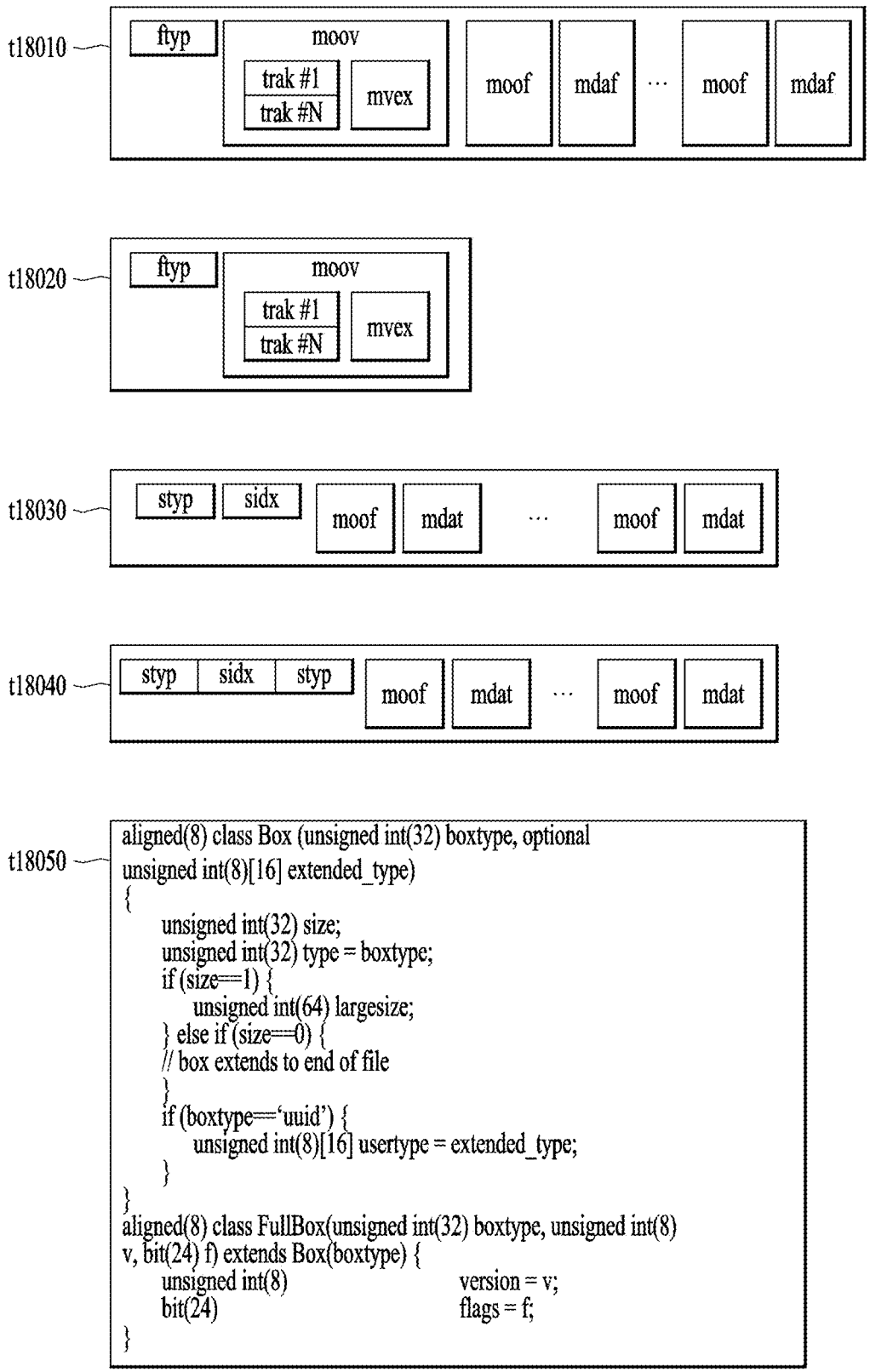
FIG. 18 is a view showing the structure of a media file according to an embodiment of the present invention.

FIG. 18 is a view showing the structure of a media file according to an embodiment of the present invention.

Figure 19:
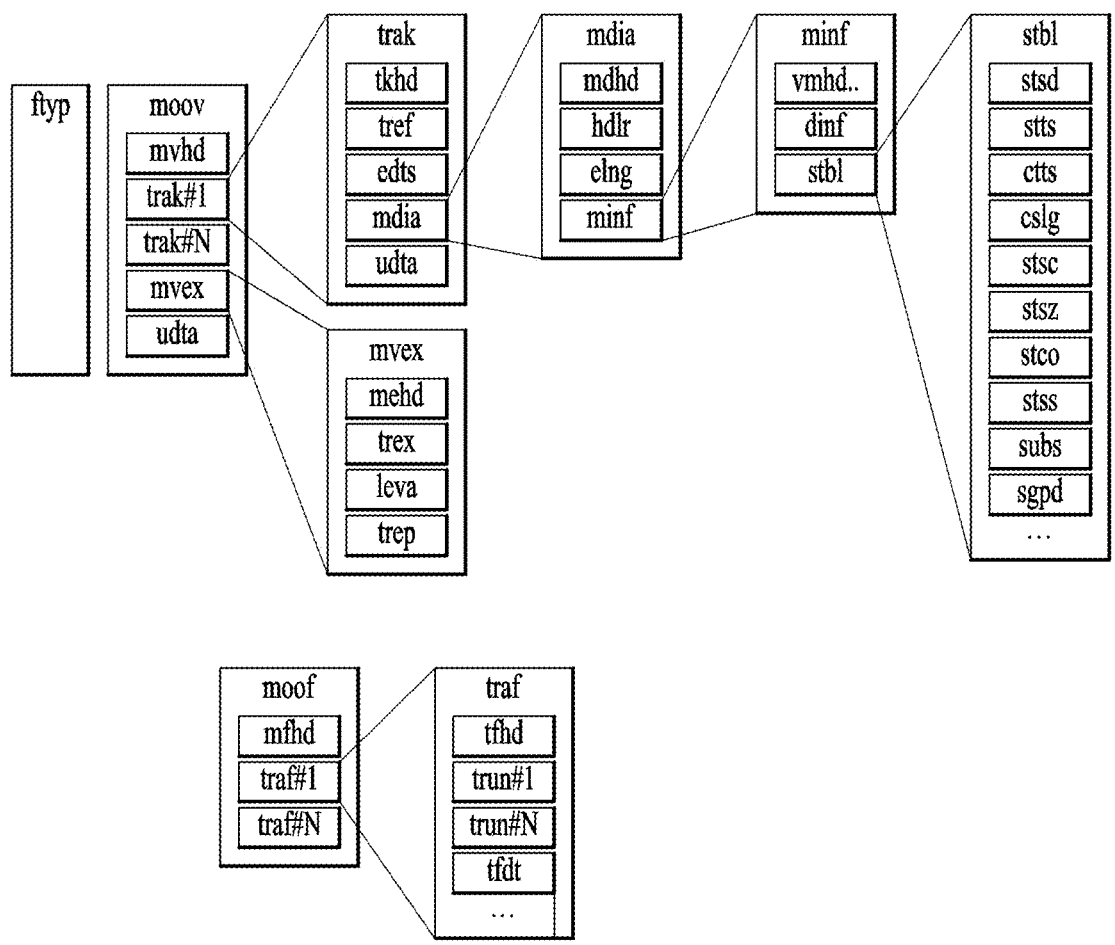
FIG. 19 is a view showing the hierarchical structure of boxes in ISOBMFF according to an embodiment of the present invention.

FIG. 19 is a view showing the hierarchical structure of boxes in ISOBMFF according to an embodiment of the present invention.

A standardized media file format may be defined to store and transmit media data, such as audio or video. In some embodiments, the media file may have a file format based on ISO base media file format (ISO BMFF).

The media file according to the present invention may include at least one box. Here, the term "box" may be a data block or object including media data or metadata related to the media data. Boxes may have a hierarchical structure, based on which data are sorted such that the media file has a form suitable for storing and/or transmitting large-capacity media data. In addition, the media file may have a structure enabling a user to easily access media information, e.g. enabling the user to move to a specific point in media content.

The media file according to the present invention may include an ftyp box, an moov box, and/or an mdat box.

The ftyp box (file type box) may provide the file type of the media file or information related to the compatibility thereof. The ftyp box may include configuration version information about media data of the media file. A decoder may sort the media file with reference to the ftyp box.

The moov box (movie box) may be a box including metadata about media data of the media file. The moov box may serve as a container for all metadata. The moov box may be the uppermost-level one of the metadata-related boxes. In some embodiments, only one moov box may exist in the media file.

The mdat box (media data box) may be a box containing actual media data of the media file. The media data may include audio samples and/or video samples. The mdat box may serve as a container containing such media samples.

In some embodiments, the moov box may further include an mvhd box, a trak box, and/or an mvex box as lower boxes.

The mvhd box (movie header box) may include information related to media presentation of media data included in the media file. That is, the mvhd box may include information, such as a media production time, change time, time standard, and period of the media presentation.

The trak box (track box) may provide information related to a track of the media data. The trak box may include information, such as stream-related information, presentation-related information, and access-related information about an audio track or a video track. A plurality of trak boxes may exist depending on the number of tracks.

In some embodiments, the trak box may further include a tkhd box (track heater box) as a lower box. The tkhd box may include information about the track indicated by the trak box. The tkhd box may include information, such as production time, change time, and identifier of the track.

The mvex box (move extended box) may indicate that a moof box, a description of which will follow, may be included in the media file. moof boxes may be scanned in order to know all media samples of a specific track.

In some embodiments, the media file according to the present invention may be divided into a plurality of fragments (t18010). As a result, the media file may be stored or transmitted in the state of being divided. Media data (mdat box) of the media file may be divided into a plurality of fragments, and each fragment may include one moof box and one divided part of the mdat box. In some embodiments, information of the ftyp box and/or the moov box may be needed in order to utilize the fragments.

The moof box (movie fragment box) may provide metadata about media data of the fragment. The moof box may be the uppermost-level one of the metadata-related boxes of the fragment.

The mdat box (media data box) may include actual media data, as previously described. The mdat box may include media samples of the media data corresponding to the fragment.

In some embodiments, the moof box may further include an mfhd box and/or a traf box as lower boxes.

The mfhd box (movie fragment header box) may include information related to correlation between the divided fragments. The mfhd box may indicate the sequence number of the media data of the fragment. In addition, it is possible to check whether there are omitted parts of the divided data using the mfhd box.

The traf box (track fragment box) may include information about the track fragment. The traf box may provide metadata related to the divided track fragment included in the fragment. The traf box may provide metadata in order to decode/reproduce media samples in the track fragment. A plurality of traf boxes may exist depending on the number of track fragments.

In some embodiments, the traf box may further include a tfhd box and/or a trun box as lower boxes.

The tfhd box (track fragment header box) may include header information of the track fragment. The tfhd box may provide information, such as a basic sample size, period, offset, and identifier, for media samples of the track fragment indicated by the traf box.

The trun box (track fragment run box) may include information related to the track fragment. The trun box may include information, such as a period, size, and reproduction start time for each media sample.

The media file or the fragments of the media file may be processed and transmitted as segments. The segments may include an initialization segment and/or a media segment.

The file of the embodiment shown (t18020) may be a file including information related to initialization of a media decoder, excluding a media file. For example, this file may correspond to the initialization segment. The initialization segment may include the ftyp box and/or the moov box.

The file of the embodiment shown (t18030) may be a file including the fragment. For example, this file may correspond to the media segment. The media segment may include the moof box and/or the mdat box. In addition, the media segment may further include an styp box and/or an sidx box.

The styp box (segment type box) may provide information for identifying media data of the divided fragment. The styp box may perform the same function as the ftyp box for the divided fragment. In some embodiments, the styp box may have the same format as the ftyp box.

The sidx box (segment index box) may provide information indicating the index for the divided fragment, through which it is possible to indicate the sequence number of the divided fragment.

In some embodiments (t18040), an ssix box may be further included. In the case in which the segment is divided into sub-segments, the ssix box (sub-segment index box) may provide information indicating the index of the sub-segment.

The boxes in the media file may include further extended information based on the form of a box shown in the embodiment (t18050) or FullBox. In this embodiment, a size field and a largesize field may indicate the length of the box in byte units. A version field may indicate the version of the box format. A type field may indicate the type or identifier of the box. A flags field may indicate a flag related to the box.

FIG. 20 is a view showing that 360-degree-video-related metadata defined as an OMVideoConfigurationBox class is delivered in each box according to an embodiment of the present invention.

As previously described, the 360-degree-video-related metadata may have the form of a box defined as an OMVideoConfigurationBox class. The 360-degree-video-related metadata according to all embodiments described above may be defined as the OMVideoConfigurationBox class. In this case, signaling fields may be included in this box according to each embodiment.

In the case in which 360-degree video data are stored and transmitted based on a file format of ISOBMFF or Common File Format (CFF), the 360-degree-video-related metadata defined as the OMVideoConfigurationBox class may be included in each box having the ISOBMFF file format. In this way, the 360-degree-video-related metadata may be stored and signaled together with the 360-degree video data.

As previously described, the 360-degree-video-related metadata defined as the OMVideoConfigurationBox class may be delivered while being included in a variety of levels, such as a file, a fragment, a track, a sample entry, and a sample. Depending on the level in which the 360-degree-video-related metadata are included, the 360-degree-video-related metadata may provide metadata about data of a corresponding level (a track, a stream, a sample group, a sample, a sample entry, etc.).

In an embodiment of the present invention, the 360-degree-video-related metadata defined as the OMVideoConfigurationBox class may be delivered while being included in the tkhd box (t20010). In this case, the tkhd box may include an omv_flag field and/or an omv_config field having an OMVideoConfigurationBox class.

The omv_flag field may be a flag indicating whether 360-degree video (or omnidirectional video) is included in the video track. When the value of this field is 1, 360-degree video may be included in the video track. When the value of this field is 0, no 360-degree video may be included in the video track. The omv_config field may exist depending on the value of the omv_flag field.

The omv_config field may provide metadata about the 360-degree video included in the video track according to the OMVideoConfigurationBox class.

In another embodiment of the present invention, the 360-degree-video-related metadata defined as the OMVideoConfigurationBox class may be delivered while being included in a vmhd box. Here, the vmhd box (video media header box), which is a lower box of the trak box, may provide general presentation-related information about the video track. In this case, the vmhd box may include an omv_flag field and/or an omv_config field having an OMVideoConfigurationBox class, in the same manner. These fields were described previously.

In some embodiments, the 360-degree-video-related metadata may be simultaneously included in the tkhd box and the vmhd box. In this case, the 360-degree-video-related metadata included in the respective boxes may follow different embodiments of the 360-degree-video-related metadata.

In the case in which the 360-degree-video-related metadata are simultaneously included in the tkhd box and the vmhd box, the values of the 360-degree-video-related metadata defined in the tkhd box may be overridden by the values of the 360-degree-video-related metadata defined in the vmhd box. That is, in the case in which the values of the 360-degree-video-related metadata defined in the two boxes are different from each other, the values in the vmhd box may be used. In the case in which no 360-degree-video-related metadata are included in the vmhd box, the 360-degree-video-related metadata in the tkhd box may be used.

In another embodiment of the present invention, the metadata defined as the OMVideoConfigurationBox class may be delivered while being included in a trex box. In the case in which a video stream is delivered in ISOBMFF while being fragmented into one or more movie fragments, the 360-degree-video-related metadata may be delivered while being included in the trex box. Here, the trex box (track extend box), which is a lower box of the mvex box, may set up default values used by the respective movie fragments. This box may provide default values in order to reduce the size and complexity of the space in the traf box. In this case, the trex box may include a default_sample_omv_flag field and/or a default_sample_omv_config field having an OMVideoConfigurationBox class.

The default_sample_omv_flag field may be a flag indicating whether 360-degree video samples are included in the video track fragment of the movie fragment. When the value of this field is 1, this may indicate that the 360-degree video samples are included by default. In this case, the trex box may further include a default_sample_omv_config field.

The default_sample_omv_config field may provide detailed metadata related to the 360-degree video applicable to video samples of the track fragment according to the OMVideoConfigurationBox class. These metadata may be applied to samples in the track fragment by default.

In another embodiment of the present invention, the 360-degree-video-related metadata defined as the OMVideoConfigurationBox class may be delivered while being included in the tfhd box (t20020). In the case in which a video stream is delivered in ISOBMFF while being fragmented into one or more movie fragments, the 360-degree-video-related metadata may be delivered while being included in the tfhd box. In this case, the tfhd box may include an omv_flag field and/or an omv_config field having an OMVideoConfigurationBox class, in the same manner. These fields were described previously. In this case, however, the two fields may describe detailed parameters related to the 360-degree video with respect to the 360-degree video of the track fragment included in the movie fragment.

In some embodiments, when the 360-degree-video-related metadata are delivered while being included in the tfhd box, the omv_flag field may be omitted, and a default_sample_omv_config field may be included instead of the omv_config field (t20030).

In this case, whether the 360-degree-video-related metadata are included in the tfhd box may be indicated by a tr_flags field of the tfhd box. For example, in the case in which the tr_flags field includes 0x400000, this may indicate that the default value of the 360-degree-video-related metadata associated with the video samples included in the video track fragment of the movie fragment exists. Also, in this case, a default_sample_omv_config field may exist in the tfhd box. The default_sample_omv_config field was described previously.

In another embodiment of the present invention, the 360-degree-video-related metadata defined as the OMVideoConfigurationBox class may be delivered while being included in the trun box. In the case in which a video stream is delivered in ISOBMFF while being fragmented into one or more movie fragments, the 360-degree-video-related metadata may be delivered while being included in the trun box. In this case, the trun box may include an omv_flag field and/or an omv_config field having an OMVideoConfigurationBox class, in the same manner. These fields were described previously. In this case, however, the two fields may describe detailed parameters related to the 360-degree video commonly applicable to video samples of the track fragment included in the movie fragment.

In some embodiments, when the 360-degree-video-related metadata are delivered while being included in the trun box, the omv_flag field may be omitted. In this case, whether the 360-degree-video-related metadata are included in the trun box may be indicated by a tr_flags field of the trun box.

For example, in the case in which the tr_flags field includes 0x008000, this may indicate that 360-degree-video-related metadata commonly applicable to the video samples included in the video track fragment of the movie fragment exist. Also, in this case, the omv_config field in the trun box may provide 360-degree-video-related metadata commonly applicable to each video sample according to the OMVideoConfigurationBox class. At this time, the omv_config field may be located at the box level in the trun box.

Also, in the case in which the tr_flags field includes 0x004000, this may indicate that 360-degree-video-related metadata applicable to each video sample included in the video track fragment of the movie fragment exist. Also, in this case, the trun box may include a sample_omv_config field according to the OMVideoConfigurationBox class at each sample level. The sample_omv_config field may provide 360-degree-video-related metadata applicable to each sample.

In the case in which the 360-degree-video-related metadata are simultaneously included in the tfhd box and the trun box, the values of the 360-degree-video-related metadata defined in the tfhd box may be overridden by the values of the 360-degree-video-related metadata defined in the trun box. That is, in the case in which the values of the 360-degree-video-related metadata defined in the two boxes are different from each other, the values in the trun box may be used. In the case in which no 360-degree-video-related metadata are included in the trun box, the 360-degree-video-related metadata in the tfhd box may be used.

In another embodiment of the present invention, the 360-degree-video-related metadata defined as the OMVideoConfigurationBox class may be delivered while being included in a visual sample group entry. In the case in which the same 360-degree-video-related metadata are applicable to one or more video samples existing in one file or movie fragment, the 360-degree-video-related metadata may be delivered while being included in the visual sample group entry. At this time, the visual sample group entry may include an omv_flag field and/or an omv_config field having an OMVideoConfigurationBox class.

The omv_flag field may indicate whether the sample group is a 360-degree video sample group. The omv_config field may describe detailed parameters related to the 360-degree video commonly applicable to 360-degree video samples included in the video sample group according to the OMVideoConfigurationBox class. For example, the initial view for the 360-degree video associated with each sample group may be set using an initial_view_yaw_degree field, an initial_view_pitch_degree field, and an initial_view_roll_degree field of the OMVideoConfigurationBox class.

In another embodiment of the present invention, the 360-degree-video-related metadata defined as the OMVideoConfigurationBox class may be delivered while being included in a visual sample entry. As initialization information necessary to decode each video sample existing in one file or movie fragment, 360-degree-video-related metadata related to each sample may be delivered while being included in the visual sample entry. At this time, the visual sample entry may include an omv_flag field and/or an omv_config field having an OMVideoConfigurationBox class.

The omv_flag field may indicate whether the video track/sample includes a 360-degree video sample. The omv_config field may describe detailed parameters related to the 360-degree video associated with the video track/sample according to the OMVideoConfigurationBox class.

In another embodiment of the present invention, the 360-degree-video-related metadata defined as the OMVideoConfigurationBox class may be delivered while being included in an HEVC sample entry (HEVCSampleEntry). As initialization information for decoding each HEVC sample existing in one file or movie fragment, 360-degree-video-related metadata related to each HEVC sample may be delivered while being included in the HEVC sample entry. At this time, the HEVC sample entry may include an omv_config field having an OMVideoConfigurationBox class. The omv_config field was described previously.

In the same manner, the 360-degree-video-related metadata may be delivered while being included in AVCSampleEntry( ), AVC2SampleEntry( ), SVCSampleEntry( ), or MVCSampleEntry( ) using the same method.

In another embodiment of the present invention, the 360-degree-video-related metadata defined as the OMVideoConfigurationBox class may be delivered while being included in an HEVC configuration box (HEVCConfigurationBox). As initialization information for decoding each HEVC sample existing in one file or movie fragment, 360-degree-video-related metadata related to each HEVC sample may be delivered while being included in the HEVC configuration box. At this time, the HEVC configuration box may include an omv_config field having an OMVideoConfigurationBox class. The omv_config field was described previously.

In the same manner, the 360-degree-video-related metadata may be delivered while being included in AVCConfigurationBox, SVCConfigurationBox, or MVCConfigurationBox using the same method.

In another embodiment of the present invention, the 360-degree-video-related metadata defined as the OMVideoConfigurationBox class may be delivered while being included in HEVCDecoderConfigurationRecord. As initialization information for decoding each HEVC sample existing in one file or movie fragment, 360-degree-video-related metadata related to each HEVC sample may be delivered while being included in HEVCDecoderConfigurationRecord. At this time, HEVCDecoderConfigurationRecord may include an omv_flag field and/or an omv_config field having an OMVideoConfigurationBox class. The omv_flag field and the omv_config field were described previously.

In the same manner, the 360-degree-video-related metadata may be delivered while being included in AVCecoderConfigurationRecord, SVCecoderConfigurationRecord, and MVCecoderConfigurationRecord using the same method.

In a further embodiment of the present invention, the 360-degree-video-related metadata defined as the OMVideoConfigurationBox class may be delivered while being included in OmnidirectionalMediaMetadataSample.

The 360-degree-video-related metadata may be stored and delivered in the form of a metadata sample. The metadata sample may be defined as OmnidirectionalMediaMetadataSample. OmnidirectionalMediaMetadataSample may include signaling fields defined in the OMVideoConfigurationBox class.

FIG. 21 is a view showing that 360-degree-video-related metadata defined as an OMVideoConfigurationBox class is delivered in each box according to another embodiment of the present invention.

In another embodiment of the present invention, 360-degree-video-related metadata defined as an OMVideoConfigurationBox class may be delivered while being included in VrVideoBox.

VrVideoBox may be newly defined to deliver 360-degree-video-related metadata. VrVideoBox may include the 360-degree-video-related metadata. The box type of VrVideoBox may be 'vrvd', and VrVideoBox may be delivered while being included in a scheme information box ('schi'). SchemeType of VrVideoBox may be 'vrvd', and in the case in which SchemeType is 'vrvd', this box may exist as a mandatory box. VrVideoBox may indicate that video data included in the track are 360-degree video data. In the case in which the type value in schi is vrvd, therefore, a receiver that does not support VR video may confirm that processing is possible, and may not process data in the file format.

VrVideoBox may include a vr_mapping_type field and/or an omv_config field defined as an OMVideoConfigurationBox class.

The vr_mapping_type field may be an integer indicating a projection scheme used to project 360-degree video data having the form of a spherical surface on a 2D image format. This field may have the same meaning as the projection_scheme field.

The omv_config field may describe 360-degree-video-related metadata according to the OMVideoConfigurationBox class.

In another embodiment of the present invention, 360-degree-video-related metadata defined as an OMVideoConfigurationBox class may be delivered while being included in OmnidirectionalMediaMetadataSampleEntry.

OmnidirectionalMediaMetadataSampleEntry may define a sample entry of a metadata track that transports metadata for 360-degree video data.

OmnidirectionalMediaMetadataSampleEntry may include an omv_config field defined as an OMVideoConfigurationBox class. The omv_config field was described previously.

In another embodiment of the present invention, 360-degree-video-related metadata defined as an OMVideoConfigurationBox class may be delivered while being included in OMVInformationSEIBox.

OMVInformationSEIBox may be newly defined to deliver 360-degree-video-related metadata (t21020). OMVInformationSEIBox may include a SEI NAL unit including the 360-degree-video-related metadata. The SEI NAL unit may include an SEI message including 360-degree-video-related metadata. OMVInformationSEIBox may include an omvinfosei field. The omvinfosei field may a SEI NAL unit including the 360-degree-video-related metadata. The 360-degree-video-related metadata were described previously.

OMVInformationSEIBox may be delivered while being included in VisualSampleEntry, AVCSampleEntry, MVCSampleEntry, SVCSampleEntry, or HEVCSampleEntry.

In another embodiment of the present invention, 360-degree-video-related metadata may be delivered through a specific one of a plurality of tracks, and the other tracks may only reference the specific track.

As previously described, a 2D image may be divided into a plurality of regions, and each region may be encoded and then stored and delivered through at least one track. Here, the term "track" may mean a track on a file format of ISOBMFF. In some embodiments, one track may be used to store and deliver 360-degree video data corresponding to one region.

At this time, each track may include 360-degree-video-related metadata according to the OMVideoConfigurationBox in the internal boxes thereof, but only any specific track may include the 360-degree-video-related metadata. In this case, other tracks that do not include the 360-degree-video-related metadata may include information indicating the specific track delivering the 360-degree-video-related metadata.

Here, the other tracks may include TrackReferenceTypeBox. TrackReferenceTypeBox may be a box used to indicate the other tracks (t21030).

TrackReferenceTypeBox may include a track_id field. The track_id field may be an integer that provides a reference between the track and another track in the presentation. This field is not reused, and may not have a value of 0.

TrackReferenceTypeBox may have reference_type as a variable. reference_type may indicate the reference type provided by TrackReferenceTypeBox.

For example, in the case in which reference_type of TrackReferenceTypeBox has 'subt' type, this may indicate that the track includes a subtitle, timed text, and overlay graphical information for the track indicated by the track_id field of TrackReferenceTypeBox.

In the present invention, in the case in which reference_type of TrackReferenceTypeBox has 'omvb' type, this box may indicate a specific track that delivers the 360-degree-video-related metadata. Specifically, when each track including each region is decoded, fundamental base layer information of the 360-degree-video-related metadata may be needed. This box may indicate a specific track that delivers the base layer information.

In the present invention, in the case in which reference_type of TrackReferenceTypeBox has 'omvm' type, this box may indicate a specific track that delivers the 360-degree-video-related metadata. Specifically, the 360-degree-video-related metadata may be stored and delivered in a separate individual track, like OmnidirectionalMediaMetadataSample( ). This box may indicate the individual track.

When 360-degree video data are rendered and provided to a user, the user may view only a portion of the 360-degree video. Consequently, it may be advantageous for regions of the 360-degree video data to be stored and delivered in different tracks. At this time, if each track includes all of the 360-degree-video-related metadata, transmission efficiency and capacity may be reduced. Consequently, it may be advantageous for only a specific track to include 360-degree-video-related metadata or the base layer information of the 360-degree-video-related metadata and for the other tracks to access the specific track using TrackReferenceTypeBox as needed.

A method of storing/delivering 360-degree-video-related metadata according to the present invention may be applied at the time of generating a media file for 360-degree video, generating a DASH segment operating on MPEG DASH, or generating an MPU operating on MPEG MMT. The receiver (including a DASH client and an MMT client) may acquire 360-degree-video-related metadata (flags, parameters, boxes, etc.) from the decoder, and may effectively provide the content based thereon.

OMVideoConfigurationBox may simultaneously exist in several boxes in one media file, a DASH segment, or an MMT MPU. In this case, 360-degree-video-related metadata defined in the upper box may be overridden by 360-degree-video-related metadata defined in the lower box.

In addition, each field (attribute) in OMVideoConfigurationBox may be delivered while being included in supplemental enhancement information (SEI) or video usability information (VUI) of the 360-degree video data.

In addition, the value of each field (attribute) in OMVideoConfigurationBox may be changed over time. In this case, OMVideoConfigurationBox may be stored in one track in the file as timed metadata. OMVideoConfigurationBox stored in one track in the file as timed metadata may signal 360-degree-video-related metadata changing over time with respect to 360-degree video data delivered to at least another media track in the file.

FIG. 22 is a view showing the overall operation of a DASH-based adaptive streaming model according to an embodiment of the present invention.

A DASH-based adaptive streaming model according to the embodiment shown (t50010) describes the operation between an HTTP server and a DASH client. Here, Dynamic Adaptive Streaming over HTTP (HTTP), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming) As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. As a result, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. At this time, information of the MPD may be used.

A DASH data model may have a hierarchical structure (t50020). Media presentation may be described by the MPD. The MPD may describe the temporal sequence of a plurality of periods making media presentation. One period may indicate one section of the media content.

In one period, data may be included in an adaptation set. The adaptation set may be a set of media content components that can be exchanged with each other. Adaptation may include a set of representations. One representation may correspond to a media content component. In one representation, content may be temporarily divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. These may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case in which descriptors, a description of which will follow, are delivered through the MPD, the descriptors may be delivered while being defined in EssentialProperty and/or SupplementalProperty.

FIG. 23 is a view showing 360-degree-video-related metadata described in the form of a DASH-based descriptor according to an embodiment of the present invention.

The DASH-based descriptor may include a @schemeIdUri field, a @value field, and/or a @ id field. The @schemeIdUri field may provide a URI for identifying the scheme of the descriptor. The @value field may have values, the meanings of which are defined by the scheme indicated by the @schemeIdUri field. That is, the @value field may have the values of descriptor elements based on the scheme, which may be called parameters. These may be delimited using ','. The @id field may indicate the identifier of the descriptor. In the case in which this field has the same identifier, the field may include the same scheme ID, value, and parameter.

Each embodiment of the 360-degree-video-related metadata may be rewritten in the form of a DASH-based descriptor. In the case in which 360-degree video data are delivered according to DASH, the 360-degree-video-related metadata may be described in the form of a DASH-based descriptor, and may be delivered to the reception side while being included in the MPD, etc. These descriptors may be delivered in the form of the EssentialProperty descriptor and/or the SupplementalProperty descriptor. These descriptors may be delivered while being included in the adaptation set, representation, and sub-representation of the MPD.

For a descriptor delivering the 360-degree-video-related metadata, the @schemeIdURI field may have a value of urn:mpeg:dash:vr:201x. This may be a value identifying that the descriptor is a descriptor delivering the 360-degree-video-related metadata.

The @value field of this descriptor may have the same value as in the embodiment shown. That is, parameters of @value delimited using ',' may correspond to respective fields of the 360-degree-video-related metadata. In the embodiment shown, one of the embodiments of the 360-degree-video-related metadata is described using the parameters of @value. Alternatively, respective signaling fields may be replaced by parameters such that all embodiments of the 360-degree-video-related metadata can be described using the parameters of @value. That is, the 360-degree-video-related metadata according to all embodiments described above may also be described in the form of a DASH-based descriptor.

In the embodiment shown, each parameter may have the same meaning as the signaling field having the same name Here, M may indicate that the parameter is a mandatory parameter, O may indicate that the parameter is an optional parameter, and OD may indicate that the parameter is an option parameter having a default value. In the case in which an OD parameter value is not given, a predefined default value may be used as the parameter value. In the embodiment shown, the default value of each OD parameter is given in parentheses.

FIG. 24 is a view showing metadata related to specific area or ROI indication according to an embodiment of the present invention.

A 360-degree video provider may enable a user to watch an intended viewpoint or area, such as a director's cut, when he/she watches the 360-degree video. To this end, 360-degree-video-related metadata according to another embodiment of the present invention may further include metadata related to specific area indication. The 360-degree video reception apparatus according to the present invention may enable the user to watch a specific area/viewpoint of the 360-degree video using metadata related to specific area indication at the time of rendering. The metadata related to specific area indication may be included in OMVideoConfigurationBox, which was described previously.

In some embodiments, the metadata related to specific area indication may indicate a specific area or a viewpoint on a 2D image. In some embodiments, the metadata related to specific area indication may be stored in a track as timed metadata according to ISOBMFF.

The sample entry of a track including metadata related to specific area indication according to an embodiment of the present invention may include a reference_width field, a reference_height field, a min_top_left_x field, a max_top_left_x field, a min_top_left_y field, a max_top_left_y field, a min_width field, a max_width field, a min_height field, and/or a max_height field (t24010).

The reference_width field and the reference_height field may indicate the horizontal size and the vertical size of the 2D image using the number of pixels.

The min_top_left_x field, the max_top_left_x field, the min_top_left_y field, and the max_top_left_y field may indicate information about the coordinates of the left top pixel of a specific area indicated by each sample included in the track. These fields may indicate the minimum value and the maximum value of the x coordinate value (top_left_x) of the left top pixel of an area included in each sample included in the track and the minimum value and the maximum value of the y coordinate value (top_left_y) of the left top pixel of an area included in each sample, respectively.

The min_width field, the max_width field, the min_height field, and the max_height field may indicate information about the size of a specific area indicated by each sample included in the track. These fields may indicate the minimum value and the maximum value of the horizontal size (width) of an area included in each sample included in the track and the minimum value and the maximum value of the vertical size (height) thereof using the number of pixels, respectively.

Information indicating a specific area to be indicated on a 2D image may be stored as individual samples of a metadata track (t24020). At this time, each sample may include a top_left_x field, a top_left_y field, a width field, a height field, and/or an interpolate field.

The top_left_x field and the top_left_y field may respectively indicate the x and y coordinates of the left top pixel of a specific area to be indicated. The width field and the height field may respectively indicate the horizontal size and the vertical size of a specific area to be indicated using the number of pixels. In the case in which the value of the interpolate field is set to 1, this may indicate that values between an area expressed by the previous sample and an area expressed by the current sample are filled with linearly interpolated values.

The sample entry of a track including metadata related to specific area indication according to another embodiment of the present invention may include a reference_width field, a reference_height field, a min_x field, a max_x field, a min_y field, and/or a max_y field. The reference_width field and the reference_height field were described previously. In this case, the metadata related to specific area indication may indicate a specific point (viewpoint), rather than an area (t24030).

The min_x field, the max_x field, the min_y field, and the max_y field may respectively indicate the minimum value and the maximum value of the x coordinate of a viewpoint included in each sample included in the track and the minimum value and the maximum value of the y coordinate thereof.

Information indicating a specific point to be indicated on a 2D image may be stored as individual samples (t24040). At this time, each sample may include an x field, a y field, and/or an interpolate field.

The x field and the y field may respectively indicate the x and y coordinates of a point to be indicated. In the case in which the value of the interpolate field is set to 1, this may indicate that values between a point expressed by the previous sample and a point expressed by the current sample are filled with linearly interpolated values.

FIG. 25 is a view showing metadata related to specific area indication according to another embodiment of the present invention.

In some embodiments, the metadata related to specific area indication may indicate a specific area or a viewpoint in 3D space. In some embodiments, the metadata related to specific area indication may be stored in a track as timed metadata according to ISOBMFF.

The sample entry of a track including metadata related to specific area indication according to another embodiment of the present invention may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the minimum/maximum values of the amount of rotation about the yaw, pitch, and roll axes of a specific area to be indicated, included in each sample included in the track. These fields may indicate the minimum value of the amount of rotation about the yaw axis of a specific area included in each sample included in the track, the maximum value of the amount of rotation about the yaw axis of a specific area included in each sample included in the track, the minimum value of the amount of rotation about the pitch axis of a specific area included in each sample included in the track, the maximum value of the amount of rotation about the pitch axis of a specific area included in each sample included in the track, the minimum value of the amount of rotation about the roll axis of a specific area included in each sample included in the track, and the maximum value of the amount of rotation about the roll axis of a specific area included in each sample included in the track, respectively.

The min_field_of_view field and the max_field_of_view field may indicate the minimum/maximum values of vertical/horizontal FOV of a specific area to be indicated, included in each sample included in the track.

Information indicating a specific area to be indicated in a 3D space may be stored as individual samples (t25020). At this time, each sample may include a yaw field, a pitch field, a roll field, an interpolate field, and/or a field_of_view field.

The yaw field, the pitch field, and the roll field may respectively indicate the amount of rotation about the yaw, pitch, and roll axes of a specific area to be indicated. The interpolate field may indicate whether values between an area expressed by the previous sample and an area expressed by the current sample are filled with linearly interpolated values. The field_of_view field may indicate a vertical/horizontal field of view to be expressed.

Information indicating a specific viewpoint to be indicated in 3D space may be stored as individual samples (t25030). At this time, each sample may include a yaw field, a pitch field, a roll field, and/or an interpolate field.

The yaw field, the pitch field, and the roll field may respectively indicate the amount of rotation about the yaw, pitch, and roll axes of a specific viewpoint to be indicated. The interpolate field may indicate whether values between a point expressed by the previous sample and a point expressed by the current sample are filled with linearly interpolated values.

In the case in which the metadata related to specific area indication are delivered, all of the methods of delivering the 360-degree-video-related metadata according to the previous embodiments may be applied. For example, the metadata related to specific area indication may be delivered through a specific one of a plurality of tracks, and the other tracks may only reference the specific track, as previously described.

In the present invention, in the case in which reference_type of TrackReferenceTypeBox has 'vdsc' type, this box may indicate a specific track that delivers the metadata related to specific area indication.

Alternatively, the current track may be a track that delivers the metadata related to specific area indication, and the indicated track may be a track that delivers the 360-degree video data to which the metadata are applied. In this case, reference_type may have 'cdsc' type, in addition to 'vdsc' type. In the case in which the 'cdsc' type is used, this may indicate that the indicated track is described by the current track. The 'cdsc' type may be used for the 360-degree-video-related metadata.

FIG. 26 is a view showing GPS-related metadata according to an embodiment of the present invention.

When 360-degree video is reproduced, GPS-related metadata related to the image may be further delivered. The GPS-related metadata may be included in the 360-degree-video-related metadata or OMVideoConfigurationBox.

The GPS-related metadata according to the embodiment of the present invention may be stored in a track as timed metadata according to ISOBMFF. The sample entry of this track may include a coordinate_reference_sys field and/or an altitude_flag field (t26010).

The coordinate_reference_sys field may indicate a coordinate reference system for latitude, longitude, and altitude values included in the sample. This may be expressed in the form of a URI, and may indicate, for example, "urn:ogc:def:crs:EPSG::4979" (Coordinate Reference System (CRS), which is code 4979 in the EPSG database).

The altitude_flag field may indicate whether an altitude value is included in the sample.

The GPS-related metadata may be stored as individual samples (t26020). At this time, each sample may include a longitude field, a latitude field, and/or an altitude field.

The longitude field may indicate a longitude value of the point. A positive value may indicate an eastern longitude, and a negative value may indicate a western longitude. The latitude field may indicate a latitude value of the point. A positive value may indicate a northern latitude, and a negative value may indicate a southern latitude. The altitude field may indicate an altitude value of the point.

In the case in which the altitude_flag field of GPSSampleEntry is 0, a sample format including no altitude field may be used (t26030).

In the case in which the GPS-related metadata are delivered, all of the methods of delivering the 360-degree-video-related metadata according to the previous embodiments may be applied. For example, the GPS-related metadata may be delivered through a specific one of a plurality of tracks, and the other tracks may only reference the specific track, as previously described.

In the present invention, in the case in which reference_type of TrackReferenceTypeBox has 'gpsd' type, this box may indicate the specific track that delivers the GPS-related metadata.

Alternatively, the current track may be a track that delivers the GPS-related metadata, and the indicated track may be a track that delivers the 360-degree video data to which the metadata are applied. In this case, reference_type may have 'cdsc' type, in addition to the 'gpsd' type. In the case in which the 'cdsc' type is used, this may indicate that the indicated track is described by the current track.

A method of storing/delivering 360-degree-video-related metadata according to the present invention may be applied at the time of generating a media file for 360-degree video, generating a DASH segment operating on MPEG DASH, or generating an MPU operating on MPEG MMT. The receiver (including a DASH client and an MMT client) may acquire 360-degree-video-related metadata (flags, parameters, boxes, etc.) from the decoder, and may effectively provide the content based thereon.

2DReagionCartesianCoordinatesSampleEntry, 2DPointCartesianCoordinatesSampleEntry, 3DCartesianCoordinatesSampleEntry, GPSSampleEntry, and OMVideoConfigurationBox, described above, may simultaneously exist in several boxes in one media file, a DASH segment, or an MMT MPU. In this case, 360-degree-video-related metadata defined in the upper box may be overridden by 360-degree-video-related metadata defined in the lower box.

Figure 27:
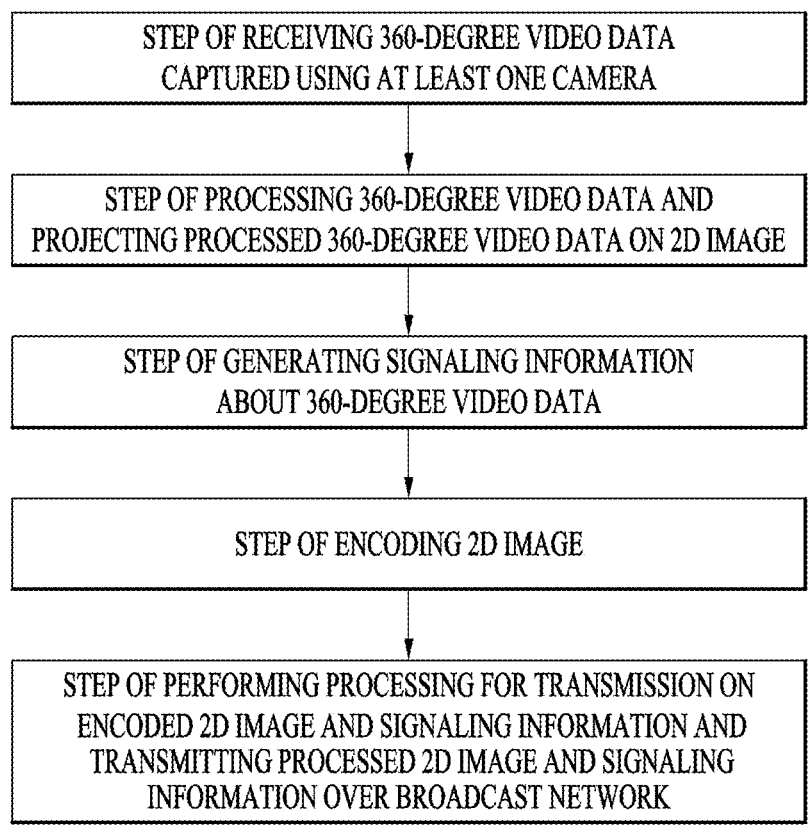
FIG. 27 is a view showing a 360-degree video transmission method according to an embodiment of the present invention.

FIG. 27 is a view showing a 360-degree video transmission method according to an embodiment of the present invention.

A 360-degree video transmission method according to an embodiment of the present invention may include a step of receiving 360-degree video data captured using at least one camera, a step of processing the 360-degree video data and projecting the processed 360-degree video data on a 2D image, a step of generating metadata related to the 360-degree video data, a step of encoding the 2D image, and a step of performing processing for transmission on the encoded 2D image and the metadata and transmitting the processed 2D image and metadata over a broadcast network. Here, the metadata related to the 360-degree video data may correspond to the 360-degree-video-related metadata. Depending on the context, the metadata related to the 360-degree video data may be called signaling information about the 360-degree video data. Depending on the context, the metadata may be called signaling information.

The data input unit of the 360-degree video transmission apparatus may receive 360-degree video data captured using at least one camera. The stitcher and the projection-processing unit of the 360-degree video transmission apparatus may process the 360-degree video data and project the processed 360-degree video data on a 2D image. In some embodiments, the stitcher and the projection-processing unit may be integrated into a single internal component. The signaling processing unit may generate metadata related to the 360-degree video data. The data encoder of the 360-degree video transmission apparatus may encode the 2D image. The transmission-processing unit of the 360-degree video transmission apparatus may perform processing for transmission on the encoded 2D image and the metadata. The transmission unit of the 360-degree video transmission apparatus may transmit the processed 2D image and metadata over a broadcast network. Here, the metadata may include projection scheme information indicating the projection scheme used to project the 360-degree video data to the 2D image. Here, the projection scheme information may be the projection_scheme field described above.

In a 360-degree video transmission method according to another embodiment of the present invention, the stitcher may stitch the 360-degree video data, and the projection-processing unit may project the stitched 360-degree video data to the 2D image.

In a 360-degree video transmission method according to another embodiment of the present invention, in the case in which the projection scheme information indicates a specific scheme, the projection-processing unit may project the 360-degree video data to the 2D image without stitching.

In a 360-degree video transmission method according to another embodiment of the present invention, the metadata may include ROI information indicating an ROI, among the 360-degree video data, or initial viewpoint information indicating an initial viewpoint area shown first to a user when the 360-degree video data are reproduced, among the 360-degree video data. The ROI information may indicate the ROI using X and Y coordinates on the 2D image, or may indicate the ROI, appearing in a 3D space when the 360-degree video data are re-projected in the 3D space, using pitch, yaw, and roll. The initial viewpoint information may indicate the initial viewpoint area using X and Y coordinates on the 2D image, or may indicate the initial viewpoint area, appearing in the 3D space, using pitch, yaw, and roll.

In a 360-degree video transmission method according to another embodiment of the present invention, the data encoder may encode regions corresponding to the ROI or the initial viewpoint area on the 2D image as an advanced layer, and may encode the remaining regions on the 2D image as a base layer.

In a 360-degree video transmission method according to another embodiment of the present invention, the metadata may further include stitching metadata necessary for the receiver to stitch the 360-degree video data. The stitching metadata may correspond to the metadata related to reception-side stitching described above. The stitching metadata may include stitching flag information indicating whether the 360-degree video data have been stitched and camera information about the at least one camera that has captured the 360-degree video data. The camera information may include information about the number of cameras, intrinsic camera information about each camera, extrinsic camera information about each camera, and camera center information indicating the position in the 3D space at which the center of an image captured by each camera is located using pitch, yaw, and roll values.

In a 360-degree video transmission method according to another embodiment of the present invention, the stitching metadata may include rotation flag information indicating whether each region on the 2D image has been rotated, rotational axis information indicating the axis about which each region has been rotated, and the amount-of-rotation information indicating the rotational direction and the extent of rotation of each region.

In a 360-degree video transmission method according to another embodiment of the present invention, in the case in which the projection scheme information indicates a specific scheme, the 360-degree video data projected without stitching may be a fish-eye image captured using a spherical camera.

In a 360-degree video transmission method according to another embodiment of the present invention, the metadata may further include a pitch angle flag indicating whether the range of the pitch angle that the 360-degree video data support is less than 180 degrees. The metadata may further include a yaw angle flag indicating whether the range of the yaw angle that the 360-degree video data support is less than 360 degrees. This may correspond to the metadata related to the support range of the 360-degree video described above.

In a 360-degree video transmission method according to a further embodiment of the present invention, in the case in which the pitch angle flag indicates that the range of the pitch angle is less than 180 degrees, the metadata may further include minimum pitch information and maximum pitch information respectively indicating the minimum pitch angle and the maximum pitch angle that the 360-degree video data support. In the case in which the yaw angle flag indicates that the range of the yaw angle is less than 360 degrees, the metadata may further include minimum yaw information and maximum yaw information respectively indicating the minimum yaw angle and the maximum yaw angle that the 360-degree video data support.

A 360-degree video reception method according to an embodiment of the present invention will be described. This method is not shown in the drawings.

A 360-degree video reception method according to an embodiment of the present invention may include a step of a reception unit receiving a broadcast signal including a 2D image including 360-degree video data and metadata related to the 360-degree video data over a broadcast network, a step of a reception-processing unit processing the broadcast signal to acquire the 2D image and the metadata, a step of a data decoder decoding the 2D image, a step of a signaling parser parsing the metadata, and a step of a renderer processing the 2D image to render the 360-degree video data in a 3D space.

360-degree video reception methods according to embodiments of the present invention may correspond to the 360-degree video transmission methods according to the embodiments of the present invention described above. The 360-degree video reception method may have embodiments corresponding to the embodiments of the 360-degree video transmission method described above.

The above steps may be omitted, or may be replaced by other steps that perform the same or similar operations.

A 360-degree video transmission apparatus according to an embodiment of the present invention may include the data input unit, the stitcher, the signaling-processing unit, the projection-processing unit, the data encoder, the transmission-processing unit, and/or the transmission unit. The respective internal components thereof were described previously. The 360-degree video transmission apparatus according to the embodiment of the present invention and the internal components thereof may perform the embodiments of the 360-degree video transmission method described above.

A 360-degree video reception apparatus according to an embodiment of the present invention may include the reception unit, the reception-processing unit, the data decoder, the signaling parser, the re-projection processing unit, and/or the renderer. The respective internal components thereof were described previously. The 360-degree video reception apparatus according to the embodiment of the present invention and the internal components thereof may perform the embodiments of the 360-degree video reception method described above.

The internal components of the apparatus may be processors that execute consecutive processes stored in a memory or other hardware components. These may be located inside/outside the apparatus.

In some embodiments, the above-described modules may be omitted, or may be replaced by other modules that perform the same or similar operations.

The above-described parts, modules, or units may be processors or hardware parts that execute consecutive processes stored in a memory (or a storage unit). The steps described in the above-described embodiments can be performed by processors or hardware parts. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

While the present invention has been described with reference to separate drawings for the convenience of description, new embodiments may be implemented by combining embodiments illustrated in the respective drawings. As needed by those skilled in the art, designing a computer-readable recording medium, in which a program for implementing the above-described embodiments is recorded, falls within the scope of the present invention.

The apparatus and method according to the present invention is not limitedly applied to the constructions and methods of the embodiments as previously described; rather, all or some of the embodiments may be selectively combined to achieve various modifications.

Meanwhile, the image-processing method according to the present specification may be implemented as code that can be written on a processor-readable recording medium and thus read by a processor provided in a network device. The processor-readable recording medium may be any type of recording device in which data are stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

In addition, the present specification describes both a product invention and a method invention, and descriptions of the two inventions may be complementarily applied as needed.

MODE FOR INVENTION

Various embodiments have been described in the best mode for carrying out the invention.

INDUSTRIAL APPLICABILITY

The present invention is used in a series of VR-related fields.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

The invention claimed is:

1. A method of transmitting 360-degree video by an apparatus, the method comprising:
  acquiring 360-degree video data;
  generating a projected picture from the 360-degree video data;
  generating signaling information for the 360-degree video data, wherein the signaling information is used to support a range of the 360-degree video data;
  encoding the projected picture; and
  transmitting the projected picture and the signaling information,
wherein the signaling information includes first range information for representing a first range, 0 to 360 degree of a sphere region based on a z-axis and second range information for representing a second range, 0 to 180 degree of the sphere region based on another axis which is different from the z-axis, and
wherein the first range information and the second range information are present within the signaling information depending on information included in the signaling information.

2. The method according to claim 1, wherein the signaling information further includes initial view information that includes a set of elements for indicating a center of viewport.

3. The method according to claim 2, wherein the initial view information is used to indicate an initial view to be initially rendered.

4. The method according to claim 1, wherein the signaling information further includes pitch degree information for indicating a pitch range of the 360-degree video data and yaw degree information for indicating a yaw range of the 360-degree video data,
wherein one of the pitch range and the yaw range is in a range of 0 to 360 degree and the rest is in a range of 0 to 180 degree.

5. The method according to claim 1, wherein the signaling information further includes center information for indicating a center of a source image.

6. The method according to claim 1, wherein the signaling information further includes stereo information for indicating whether the 360-degree video data corresponds to stereoscopic video.

7. The method according to claim 6, wherein the stereo information is further used to indicate a type of frame packing arrangement of the 360-degree video data when the 360-degree video data corresponds to stereoscopic video.

8. The method according to claim 1 further comprising:
  stitching source images included in the 360-degree video data.

9. A method of receiving 360-degree video by an apparatus, the method comprising:
  receiving a projected picture and signaling information, wherein the projected picture is derived from 360-degree video data, and the signaling information is used to support a range of the 360-degree video data;
  parsing the signaling information,
wherein the signaling information includes first range information for representing a first range, 0 to 360 degree of a sphere region based on a z-axis and second range information for representing a second range, 0 to 180 degree of the sphere region based on another axis which is different from the z-axis, and wherein the first range information and the second range information are present within the signaling information depending on information included in the signaling information; and decoding the projected picture.

10. The method according to claim 9, wherein the signaling information further includes initial view information that includes a set of elements for indicating a center of viewport.

11. The method according to claim 9, wherein the signaling information further includes pitch degree information for indicating a pitch range of the 360-degree video data and yaw degree information for indicating a yaw range of the 360-degree video data,
wherein one of the pitch range and the yaw range is in a range of 0 to 360 degree and the rest is in a range of 0 to 180 degree.

12. The method according to claim 9, wherein the signaling information further includes center information for indicating a center of a source image.

13. The method according to claim 9, wherein the signaling information further includes stereo information for indicating whether the 360-degree video data corresponds to stereoscopic video.

14. The method according to claim 13, wherein the stereo information is further used to indicate a type of frame packing arrangement of the 360-degree video data when the 360-degree video data corresponds to stereoscopic video.

15. An apparatus of receiving 360-degree video data, the apparatus comprising:

a receiver configured to receive an encoded picture and signaling information,
wherein the signaling information is used to support a range of the 360-degree video data;

a parser configured to parse the signaling information,
wherein the signaling information includes first range information for representing a first range, 0 to 360 degree of a sphere region based on a z-axis and second range information for representing a second rage, 0 to 180 degree of the sphere region based on another axis which is different from the z-axis, and
wherein the first range information and the second range information are present within the signaling information depending on information included in the signaling information; and a decoder configured to decode the encoded picture.

* * * * *